US012489135B2

(12) United States Patent
Hackner et al.

(10) Patent No.: US 12,489,135 B2
(45) Date of Patent: Dec. 2, 2025

(54) NETWORK OF METAL FIBERS, METHOD FOR PRODUCING A NETWORK OF METAL FIBERS, ELECTRODE AND BATTERY

(71) Applicants: Max-Planck-Gessellschaft zur Förderung der Wissenchaften E.V., Munich (DE); Universität Stuttgart, Stuttgart (DE)

(72) Inventors: Maximilian Hackner, Uhingen (DE); Timotheus Jahnke, Bad Waldsee (DE); Zaklina Burghard, Weil der Stadt (DE); Alexandre Micoulet, Mannheim (DE); Joachim P. Spatz, Stuttgart (DE); Martin Möller, Aachen (DE)

(73) Assignees: Max-Planck-Gesellschaft zur Förderung der Wissenschaften e. V., Munich (DE); Universität Stuttgart, Stuttgart (DE)

( * ) Notice: Subject to any disclaimer, the term of this patent is extended or adjusted under 35 U.S.C. 154(b) by 702 days.

(21) Appl. No.: 17/260,420

(22) PCT Filed: Jul. 16, 2019

(86) PCT No.: PCT/EP2019/069144
§ 371 (c)(1),
(2) Date: Jan. 14, 2021

(87) PCT Pub. No.: WO2020/016240
PCT Pub. Date: Jan. 23, 2020

(65) Prior Publication Data
US 2021/0265636 A1   Aug. 26, 2021

(30) Foreign Application Priority Data
Jul. 17, 2018   (EP) .................................... 18183945

(51) Int. Cl.
*H01M 10/052*   (2010.01)
*B22F 1/062*   (2022.01)
(Continued)

(52) U.S. Cl.
CPC ........... *H01M 10/052* (2013.01); *B22F 1/062* (2022.01); *B22F 1/08* (2022.01); *B22F 1/16* (2022.01);
(Continued)

(58) Field of Classification Search
CPC .... H01M 10/052; H01M 4/04; H01M 4/0471; H01M 4/662; B22F 1/16; B22F 1/062; B22F 1/08; B22F 3/14
See application file for complete search history.

(56) References Cited

U.S. PATENT DOCUMENTS

| 5,518,833 A | 5/1996 | Repplinger et al. |
| 9,680,147 B2 | 6/2017 | Kim |

(Continued)

FOREIGN PATENT DOCUMENTS

| CN | 105493322 A | 4/2016 |
| CN | 105642019 A | 6/2016 |

(Continued)

OTHER PUBLICATIONS

Song et al., "The effects of high temperature and fiber diameter on the quasi static compressive behavior of metal fiber sintered sheets," Materials Science & Engineering A, vol. 690 (Apr. 1, 2017), pp. 71-79.

*Primary Examiner* — Kenneth J Douyette
(74) *Attorney, Agent, or Firm* — Dickinson Wright PLLC

(57) ABSTRACT

A network of metal fibers includes a plurality of metal fibers fixed to one another; wherein at least some of the plurality of metal fibers have a length of 1.0 mm or more, a width of 100 μm or less and a thickness of 50 μm or less. A method
(Continued)

Figure 1A:
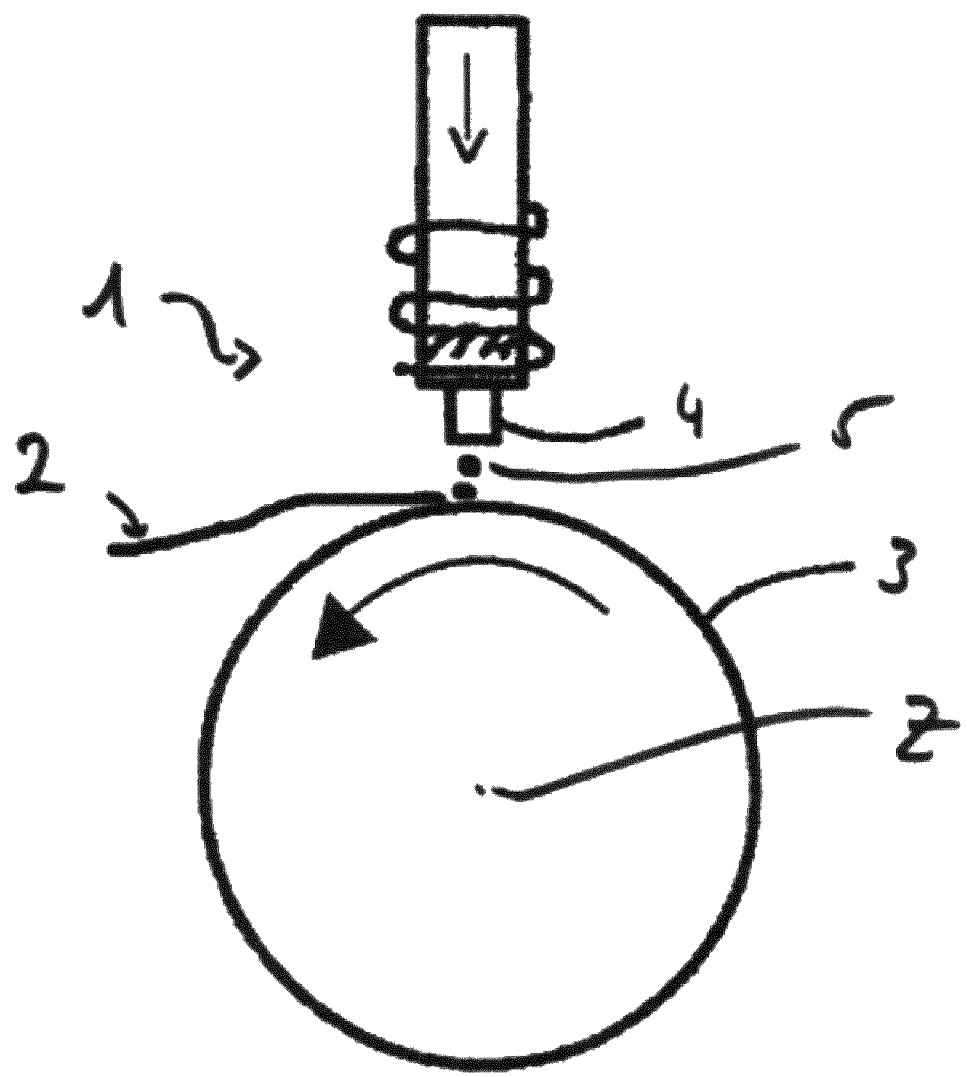

includes producing a plurality of metal fibers by melt spinning; providing a loose network of metal fibers; and fixating the plurality of metal fibers to one another.

12 Claims, 27 Drawing Sheets

(51) Int. Cl.

| | |
|---|---|
| *B22F 1/08* | (2022.01) |
| *B22F 1/16* | (2022.01) |
| *B22F 3/14* | (2006.01) |
| *B22F 9/10* | (2006.01) |
| *C22C 9/02* | (2006.01) |
| *C22C 19/07* | (2006.01) |
| *H01M 4/04* | (2006.01) |
| *H01M 4/66* | (2006.01) |
| *H01M 4/80* | (2006.01) |
| *H01M 10/0525* | (2010.01) |

(52) U.S. Cl.
CPC .................. *B22F 3/14* (2013.01); *B22F 9/10* (2013.01); *C22C 9/02* (2013.01); *C22C 19/07* (2013.01); *H01M 4/0471* (2013.01); *H01M 4/662* (2013.01); *H01M 4/806* (2013.01); *H01M 10/0525* (2013.01); *B22F 2301/10* (2013.01); *B22F 2301/15* (2013.01)

(56) References Cited

U.S. PATENT DOCUMENTS

| | | | |
|---|---|---|---|
| 2002/0168574 A1* | 11/2002 | Ahn | ........................ H01M 4/139 29/623.5 |
| 2013/0202960 A1 | 8/2013 | Kim | |
| 2016/0190599 A1 | 6/2016 | Kim et al. | |
| 2016/0248118 A1* | 8/2016 | Chan | ..................... D01D 5/0015 |
| 2017/0179517 A1* | 6/2017 | Stalder | ................. H01M 50/193 |

FOREIGN PATENT DOCUMENTS

| | | |
|---|---|---|
| DE | 35 87 247 T2 | 9/1993 |
| EP | 2 527 503 A1 | 11/2012 |
| EP | 2 628 813 A1 | 8/2013 |
| EP | 2 770 558 A2 | 8/2014 |
| EP | 2 784 865 A1 | 10/2014 |
| EP | 3 016 188 A1 | 5/2016 |
| JP | 2013-543231 A | 11/2013 |
| JP | 2016-525263 A | 8/2016 |
| KR | 10-2015-0000202 A | 1/2015 |
| KR | 20190008689 A | 1/2019 |
| WO | 2017/222895 A1 | 12/2017 |
| WO | 2018/048166 A1 | 3/2018 |

* cited by examiner

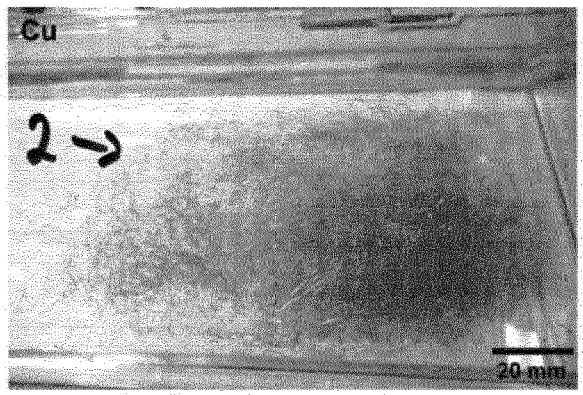
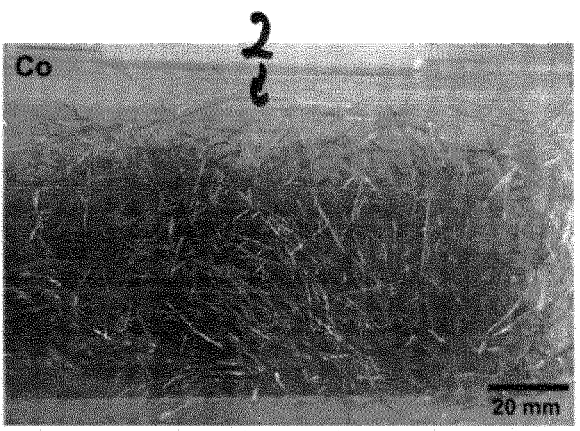
*Figure 2a)*  *Figure 2b)*
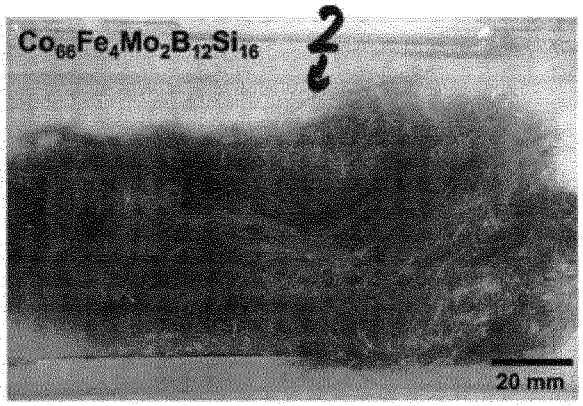
*Figure 2c)*  *Figure 2d)*

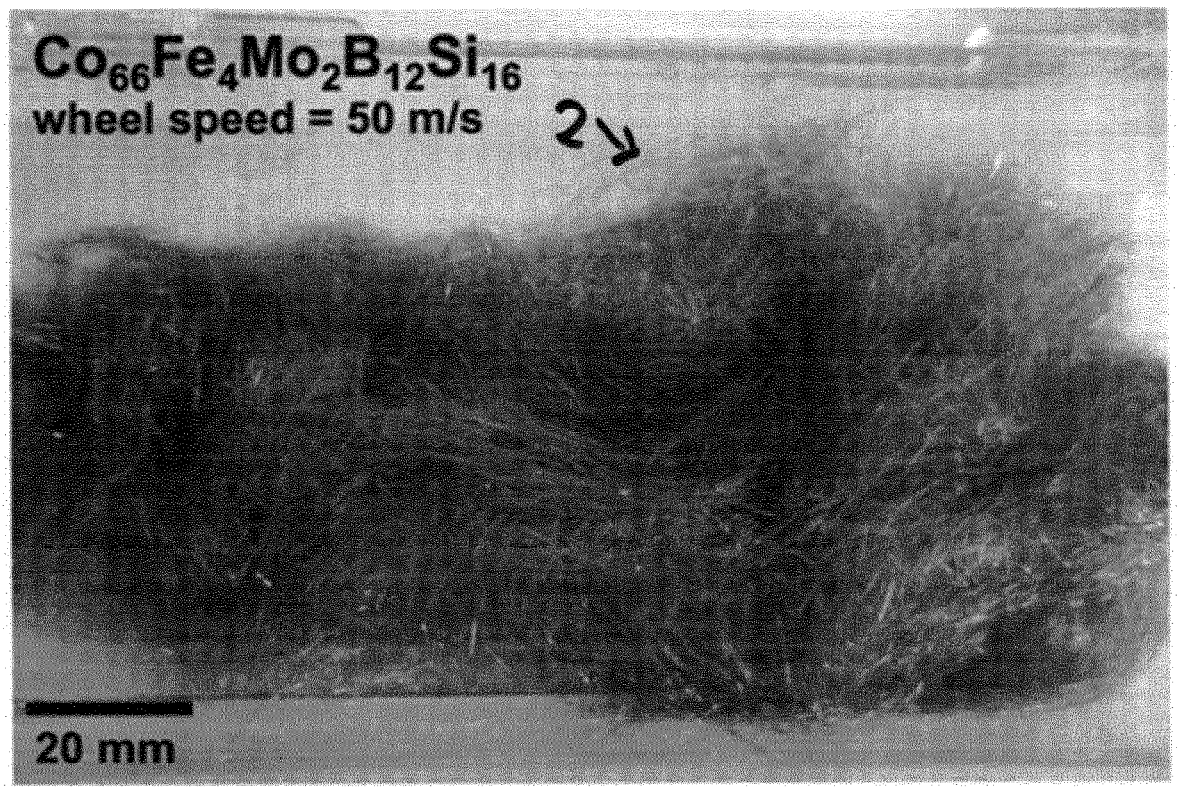
*Figure 3a) i)*
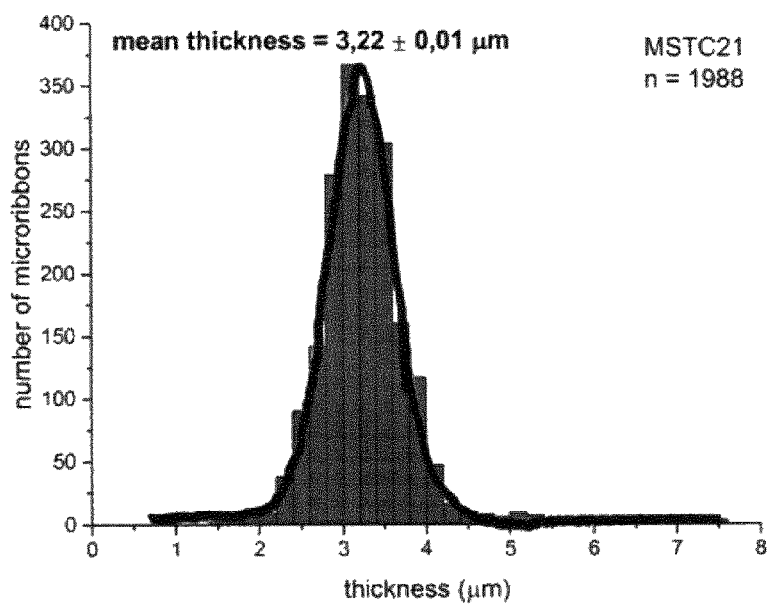
*Figure 3a) ii)*

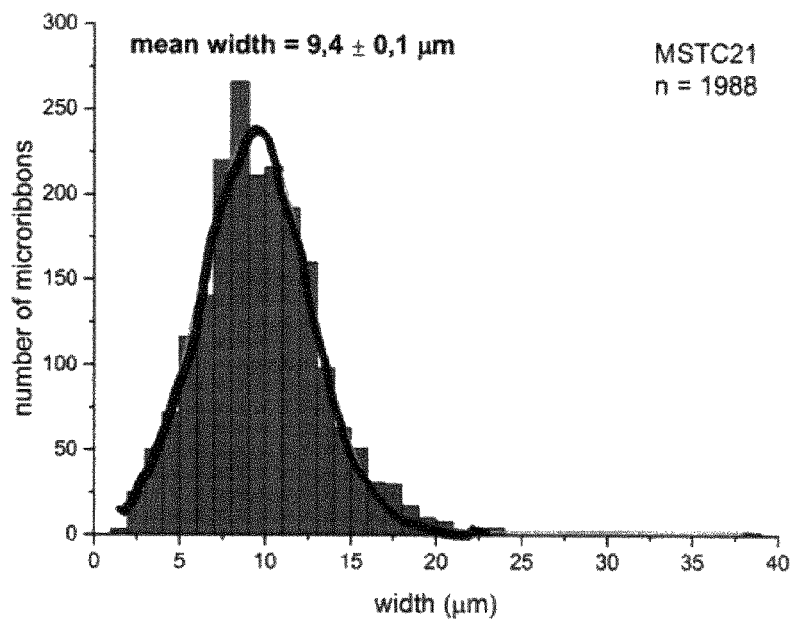
*Figure 3a) iii)*
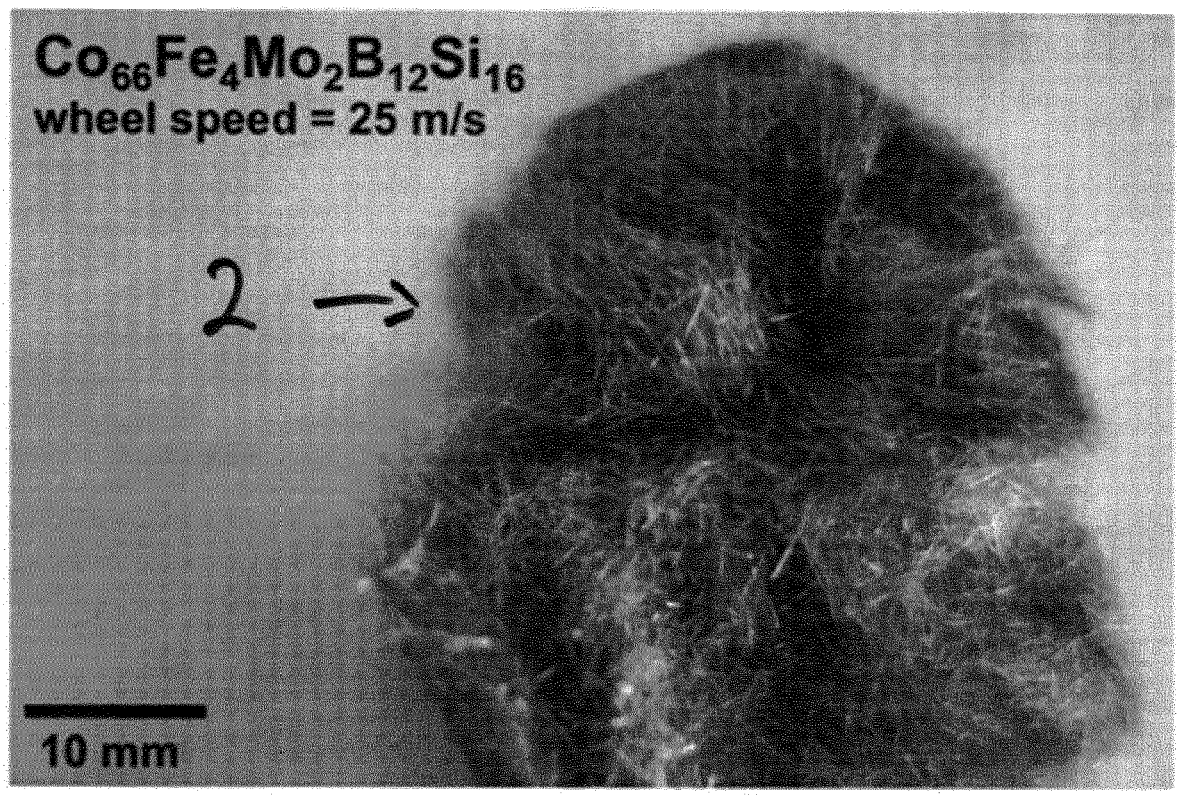
*Figure 3b) i)*

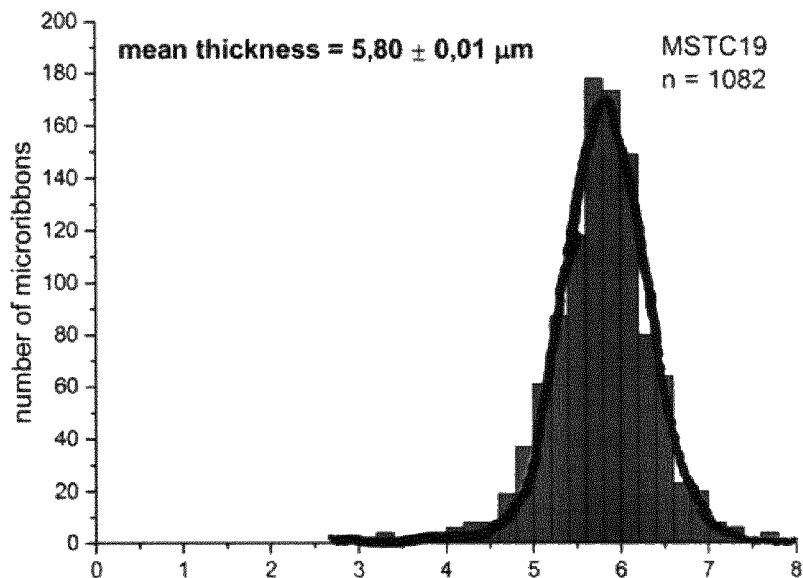
*Figure 3b) ii)*
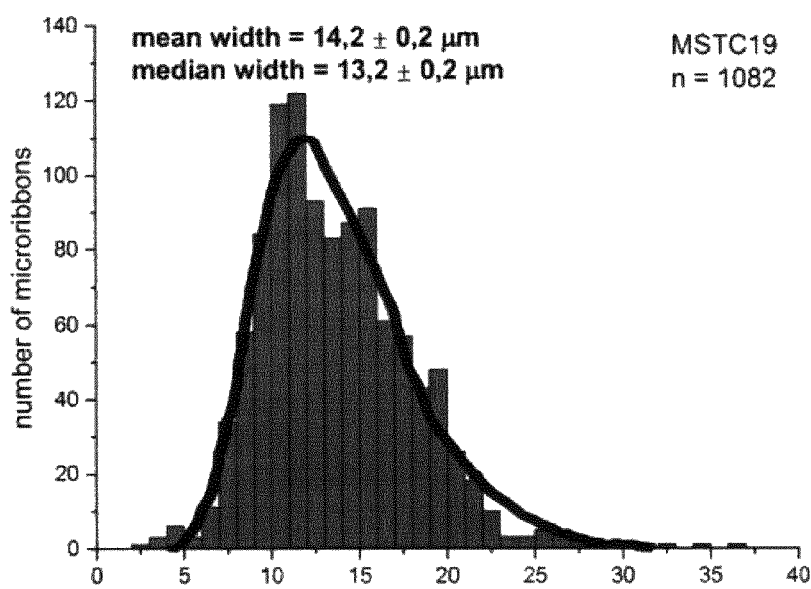
*Figure 3b) iii)*

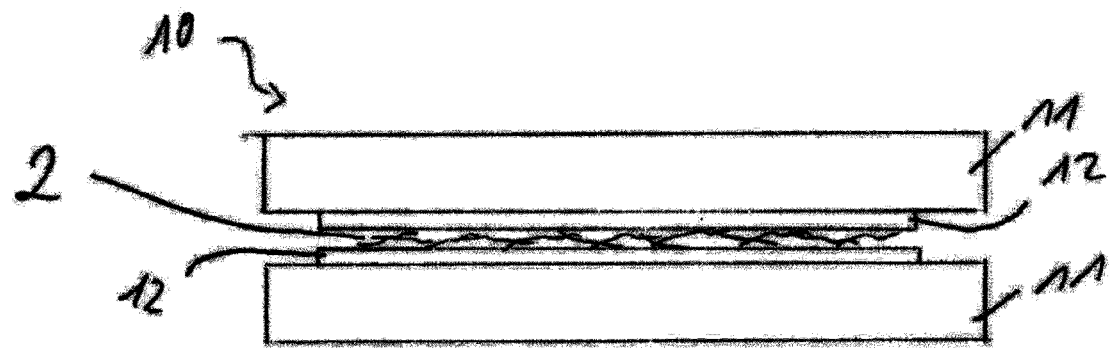
*Figure 15*
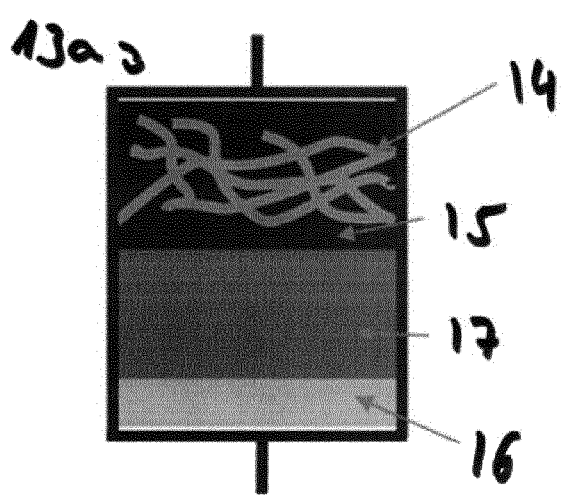 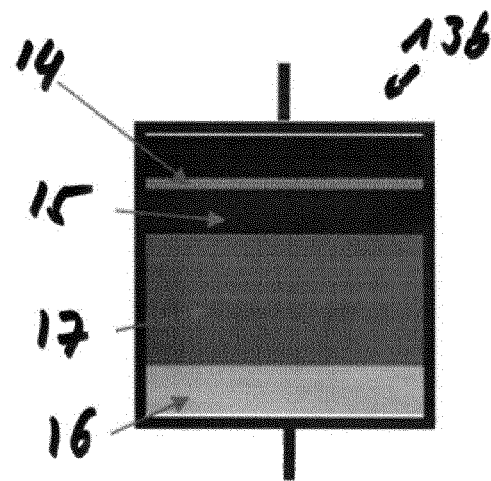
*Figure 16a)*  *Figure. 16b)*

NETWORK OF METAL FIBERS, METHOD FOR PRODUCING A NETWORK OF METAL FIBERS, ELECTRODE AND BATTERY

The invention relates to a network of metal fibers, a method for producing a network of metal fibers, an electrode containing a network of metal fibers, and a battery comprising such an electrode.

Networks of metal fibers can improve the performance of secondary electrodes as described below. Such network of metal fibers can also contribute to the performance in catalytic materials, in fuel cells, in hydrolysis, as component in electromagnetic shielding materials, as filters, in polymer composites or as tissue material and tissue hybrid material which may also include as additives, e.g. cotton, silk or wool.

In lithium ion batteries, active electrode materials are deposited on a metal foil that serves as a current collector. Typically, the negative electrode consists of a $Li_xC_n$ graphite-intercalation compound on a copper foil, while the positive electrode consists of Co-, Ni-, Mn-, or Fe compounds which can incorporate Li-cations and for which an aluminum foil is used as the collector. Upon discharge electrons are transferred to the copper collector and Li-cations travel from the graphite intercalation compound to the cathode. Mobility of the Li cations is facilitated by an aprotic electrolyte. Currently many research and development attempts focus on the development of new anode and cathode materials.

Since the above mentioned reaction occurs in the active electrode material, the electrons have to travel through the active electrode material to reach the current collector. A low electrical conductivity of the active electrode material poses a limitation to the capacity of lithium ion batteries. Therefore, also long distances or path lengths for the electrons from the place they were set free in the active material to the collector are detrimental to an efficient charge and discharge process.

It has therefore been tried to reduce the electrical resistance of the active electrode material by incorporating conductive materials, such as carbon nanotubes. These additives are loosely dispersed in the active electrode material and there is a risk that these materials do not sufficiently connect the active electrode material with the current collector. As a result, there is a risk that the capacity of batteries having carbon nanotubes blended in the active electrode material is not sufficiently improved.

In order to enhance connectivity between such conductive additives, the composite of the active material and copper or aluminum foils is pressed together with high mechanical force. This increases the conductivity of the composite and its mass density. However, the mass density is critical for the diffusion of Li-ions from the anode to the cathode and back. A too dense composite limits the diffusion of Li-ions and compromises the performance of the battery.

Furthermore, due to the use of conductive additives and binder in the active electrode material, the active electrode material, i.e. the material where the electrochemical reaction occurs, is reduced which is detrimental for the performance of batteries.

It is also well known, that charge/discharge processes are accompanied by volume changes of the active material which results in structural ageing and loss of the capacity of the batteries during use. Similarly, mechanical deformation can jeopardize the performance of such batteries, thus the fabrication of flexible Lithium ion battery assemblies remains a challenge. Improvement of the flexibility of the electrodes without impeding their performance will open new applications but also be beneficial for the fabrication processes itself.

It is a main objective of the invention to provide a collector material which is suited to improve the battery performance. It is yet a further objective of the invention to provide an electrode material that is suitable for providing flexible electrodes and the battery which make use of the material suitable of improving battery capacity while showing high resistance to degradation due to flexible deformation and having improved battery charging kinetics and lifetime.

These objectives are satisfied by a network in accordance with claim 1, by a method for producing a network of metal fibers, an electrode and a battery according to the independent claim.

It is described in WO 2017/222895 A1 that a drawback of using metal foils, such as a copper foil, as current collector is that this kind of current collector makes batteries rigid and susceptible to damages due to flexing and folding. For providing flexible battery components, WO 2017/222895 A1 discloses a porous substrate onto which a suitable electrode material slurry may then be coated. The suitable electrode material slurry comprises an active material, such as lithium iron phosphate for producing a lithium ion cathode or lithium titanate for producing a lithium ion anode, and a conductive additive and a binder in an organic solvent.

A further electrode for a secondary battery is disclosed in WO 2018/048166 A1. The electrode is produced by introducing an electrode mixture containing an active electrode material into pores of a current collector having a three-dimensional network structure. As an example for this three-dimensional structure, conductive metal felts are mentioned in WO 2018/048166 A1 as suitable for use in flexible batteries.

In the invention described here, a metallic collector material presenting a superfine electron conducting network of metal fibers is utilized in accordance with claim 1. The present invention further relates to a method for producing a network of metal fibers, an electrode and a battery according to the independent claims. Surprisingly the invention also allows increasing the charge/discharge currents significantly without destroying the battery.

Description of a network of metal fibers and preferred embodiments:

According to a first aspect of the invention, a network of metal fibers is provided, wherein a plurality of metal fibers are fixed to one another and wherein the metal fibers have a length of 1.0 mm or more, a width of 100 µm or less and a thickness of 50 µm or less. The fiber may optionally have a circular or oval cross section area with a diameter less than 100 µm, preferably less than 10 µm. In case of an oval cross section, the mentioned diameter is the average diameter. For example, the oval cross section has the shape of an ellipse.

The network according to the invention is flexible and can be deformed repeatedly without causing degradation of the network, i.e. without separating single metal fibers out of the network of metal fibers due to deformation. The metal fibers are fixed to one another, so that the metal fibers contact each other, i.e. the point of contact is not movable relative to the metal fibers as it is the case for example in a nonwoven agglomeration of entangled metal fibers such as a metal felt. As a consequence, the network of metal fibers according to the invention is mechanically stable yet flexible. Mechanically stable in this context means that the network of metal fibers is not a loose agglomeration of metal fibers, i.e. the network does not disintegrate into isolated metal fibers as soon as a small force acts on the network. Accordingly, such a network of metal fibers can be flexibly deformed without breaking. It is possible that the network of metal fibers recovers its form after deformation. However, if the network of metal fibers is folded, it is also possible to reshape it permanently.

With the metal fibers having a length of 1.0 mm or more, a width of 100 µm or less and a thickness of 50 µm or less, it is possible to produce the network with metal fibers that are fixed to one another, without needing to heat the metal fibers to temperatures close to their melting point. Traditionally, higher temperatures are required for the manufacturing of the network of metal fibers. Such higher temperatures typically lie close or above the melting temperature of the metal and hence could melt or at least soften the material of the metal fibers to a certain degree, so that the metal fibers could form a metal foil rather than the claimed network. Since the network of metal fibers is not a metal foil, i.e. the structure of the metal fibers used for producing the network of metal fibers can still be recognized in the network of metal fibers. Accordingly, in a cross-sectional view of network of metal fibers, there are voids which are not part of the metal fibers but are in between the metal fibers of the network fibers.

It is preferable when before and/or after fixing the metal fibers to one another, the metal fibers show an exothermic event when being heated in a DSC measurement. An example for such an exothermic event is shown in FIG. 6d. In other words, the metal fibers are not in their thermodynamic equilibrium at ambient temperatures. During heating in a DSC measurement, the metal fibers can transit from a metastable to a thermodynamically more stable condition, e.g. by crystallization, recrystallization or other relaxation processes reducing defects in the lattice of metal atoms. An exothermic event observed for the metal fibers when being heated, e.g. during a DSC measurement (FIG. 6d), indicates that the metal fibers are not in their thermodynamic equilibrium, e.g. the metal fibers can be in an amorphous or nanocrystalline state containing defective energy and/or crystallization energy which is released during heating of the metal fibers due to occurrence of crystallization or recrystallization. Such events can be recognized e.g. using DSC measurement (FIG. 6d). Surprisingly it was found that networks of metal fibers wherein the metal fibers show such an exothermic event have an improved strength and electrical conductivity after the metal fibers are fixed to one another, e.g. by sintering or welding. In the context of the present disclosure, the terms "sintering" and "welding" can be used interchangeably, i.e. these terms have the same meaning.

It is to be understood that the network according to the invention can be obtained by the method as described in the following.

To ensure that the electrical conductivity throughout the network is high, even if the network is deformed, it is preferred that the metal fibers are in electrical contact with one another at the sites where they are fixed to one another (i.e. contact points). To achieve an electrically conductive yet mechanically stable fixation of the metal fibers to one another, it is further preferred that in the network of the invention at least some of the metal fibers of the plurality of metal fibers are sintered to one another, i.e. the connection between the metal fibers is formed from the material of the metal fibers. This provides a strong connection between the metal fibers as a result of bonds formed between metal atoms from two contacting metal fibers and as a consequence resulting in a durable yet flexible network having a good electrical conductivity. In this regard it is particularly preferable that the metal fibers are sintered to other metal fibers, most preferable directly to other metal fibers without the need of an additional binder, e.g. a polymeric binder. Most preferably, the fixation of one metal fiber to another metal fiber is realized by the material of the metal fibers. It is therefore further preferred that the metal fibers are fixed to one another without a polymeric binder, since such polymeric binders often have a poor electrical conductivity and high temperature performance. With the metal fibers being directly sintered to one another, it is also possible to omit solder materials or the like in the network according to the invention.

It is also preferable to fix the metal fibers to one another using ultrasound welding or hammering. Ultrasound welding and hammering are simple processes which can be used to rapidly fixate the metal fibers to one another. When using ultrasound welding or hammering for fixating the metal fibers to one another it is possible to produce networks of metal fibers in which the fixation of the metal fibers is not uniform over the complete surface of the network but is restricted to areas which are separated from each other and distributed over the network of metal fibers. To do so it is particularly preferred that a compacting tool for ultrasound welding or hammering is structured. For example, the compacting tool for ultrasound welding or hammering can have a plurality of protrusions, such as for example needle like pinnacles or rims. With such a plurality of protrusions it is possible to produce separate areas at which the metal fibers are fixed to one another with one action. Between such separated areas, the metal fibers may have points of contact but are not fixed to one another. As mentioned above, this can improve overall flexibility of the network of metal fibers. Accordingly, it is preferred that the network comprises areas in which the metal fibers have points of contact but are not fixed to one another and that the network comprises areas in which the metal fibers have points of contact at which the metal fibers are fixed to one another.

According to one embodiment, at least some of the metal fibers of the plurality of metal fibers are amorphous. According to another embodiment at least some of the metal fibers of the plurality of metal fibers are nanocrystalline. It is also possible to combine amorphous and nanocrystalline metal fibers in the network of metal fibers. Nanocrystalline metal fibers contain crystalline domains. Upon heating to a temperature of around 20-60% of the melting temperature of the nanocrystalline metal fibers, these domains undergo recrystallization resulting in an increase of the average size of crystalline domains compared to the average size of the initial crystalline domains in the nanocrystalline metal fibers before heating. It is also possible to mix non-equilibrated (e.g. nanocrystalline or amorphous fibers) with equilibrated (e.g. annealed) fibers.

As mentioned above, it is preferable that the metal fibers before and/or after fixing the metal fibers to one another show an exothermic event when being heated in a DSC measurement. The extent of the exothermic event observed when heating the metal fibers is not particularly limited. Preferably, the exothermic event releases energy in an amount of 0.1 KJ/g or more, more preferably in an amount of 0.5 KJ/g or more, even more preferably in an amount of 1.0 KJ/g or more and most preferably in an amount of 1.5 KJ/g or more. The absolute amounts depend very much on the used metal or metal alloy. The extent of the exothermic event can be determined by comparing DSC measurements of the metal fibers before and after thermal equilibration.

Amorphous and nanocrystalline metal fibers can be produced by melt spinning using an apparatus and a method for manufacturing metallic strands by melt spinning, such as described in the examples disclosed in European patent application with application number EP19175749.1, WO2016/020493 A1 and in WO2017/042155 A1, the contents of which are herewith incorporated by reference with respect to the method of forming and consequently obtaining the metal fibers. Accordingly, the metal fibers can be metal fibers of, e.g. Cu, $Cu_{99}Si_1$, $Cu_{96}Si_4$, Al, $Al_{99}Si_1$, $Fe_{40}Ni_{40}B_{20}$, Au, Ag, Pb, Si or of stainless steel V2A.

It is preferred if the metal fibers are produced by melt spinning. Such metal fibers produced by melt spinning can contain spatially confined domains in a high-energy state, due to the fast cooling applied during the melt spinning process. Therefore, it is possible to sinter such metal fibers together, while keeping the temperature well below the melting temperature of the metal fibers upon activating structural transitions of this high-energy domains by which the domains loose energy which are used for activating sintering processes. Therefore, it is even possible to sinter such metal fibers together at temperatures below their crystallization temperature of the material of the metal fibers and well below their melting temperature. This is in particular advantageous, if the metal fibers are coated with a coating layer sensitive to high temperatures. Since higher temperatures will result in crystallization of fibers destroying the amorphous or nanocrystalline state of such fibers, there is a risk that these fibers lose their special mechanical properties of high elasticity and low brittleness. The above mentioned domains in a high-energy state can release energy when being heated or are mechanically pressed by a press, a hammer or an ultrasound welding device. Release of energy from such domains can be observed in form of an exothermic event.

The metal fibers are made of metal or contain at least a metal. In the invention it is not particularly limited which metal is contained in the metal fibers or from which metal the metal fibers are made of. Nevertheless, it is preferred that the metal fibers of the plurality of metal fibers in the network contain one of the elements selected from the group consisting of copper, silver, gold, nickel, palladium, platinum, cobalt, iron, chromium, vanadium, titanium, aluminum, silicon, lithium, combinations of the foregoing and alloys containing one or more of the foregoing. It is further preferred that the metal fibers of the plurality of metal fibers in the network contain one of the elements selected from the group consisting of copper, silver, gold, nickel, palladium, platinum, iron, vanadium, aluminum, silicon, lithium, combinations of the foregoing and alloys containing one or more of the foregoing.

It is particularly preferred if the metal fibers are made of copper or of aluminum or of a stainless steel alloy. Different types of metal fibers can be combined with each other, so that the network can contain for example metal fibers made of copper, one or more stainless steel alloys and/or aluminum. Networks of metal fibers, wherein the metal fibers are of copper, aluminum, cobalt, alloys containing copper, aluminum, silicon and/or cobalt are particularly preferred. Examples for aluminum and cobalt alloys are $Al_{99}Si_1$ and $Co_{66}Fe_4Mo_2B_{12}Si_{16}$. Examples for copper alloys are $CuSi_1$, $CuSi_4$ or $CuSi_{12}$.

It is preferable if the metal fibers have a length of 2.0 mm or more, more preferable of 10 mm or more and even more preferable of 20 mm or more and even more preferably of 70 mm or more. With the length of the metal fibers fulfilling the above length specification, mechanical stability of the network of metal fibers is improved, since due to the increased length of the metal fibers, each metal fiber can have several points of contact to other metal fibers of the network where it is fixed to the respective other metal fibers to form a mechanically strong and electrically conductive connection there between. Therefore, when one connection between metal fibers breaks, this does not compromise the overall structural integrity of the network or separate a metal fiber from the network, since several other connections between the fibers are available, to hold the network together and provide the desired electrical conductivity. Preferably, fiber length should be in the range of 1 to 20 cm, more preferably in a range of 3 to 15 cm and even more preferably in a range of 4 to 8 cm, since then arranging the fibers by carding is easily possible.

It is also preferable if the metal fibers have a width of 80 µm or less, more preferable of 70 µm or less, even more preferable of 40 µm or less and most preferably of 5 µm or less. In addition, it is preferable that the metal fibers have a thickness of 50 µm or less, more preferably of 30 µm or less, even more preferably of 10 µm or less and most preferably of 5 µm or less. Instead of a rectangular cross section of the fiber also a circular or elliptical cross section with dimensions as stated above is possible. With metal fibers showing an exothermic event when being heated or mechanically pressed, it is possible to produce the network with metal fibers that are fixed to one another, without needing to heat the metal fibers to temperatures close to the melting point, i.e. it is possible to conserve a temperature sensitive coating on top of the metal fibers when the fibers are fixed to one another for example by sintering. In addition, since high temperatures for fixing the fibers to one another can be avoided, the risk that the metal fibers are turned into a metal foil during production of the network can be reduced.

There is no particular lower limit for the width and for the thickness of the metal fibers. However, the metal fibers may have a width of not less than 1 µm, preferably of not less than 3 µm and a thickness of not less than 1 µm.

In the network of metal fibers according to the invention it is also preferred that in the network a majority of the metal fibers is in contact with one or more of the other metal fibers. This ensures that a high electrical conductivity is provided throughout the network. It is further preferred, that the network is an unordered network. Such an unordered network has a good electrical conductivity in every direction. Moreover, it is easier to produce an unordered network of metal fibers, compared to an order network of fibers. It is further preferred, that the fibers in the network are combed in different directions to provide directionality of individual fibers but still allowing conductivity through the network being equally in all possible directions. Accordingly, it is preferred that in the network some or all of the fibers have an orientation, i.e. the lengths of the fibers are not oriented randomly but have a predominant orientation in one or more spatial direction.

It is particularly preferable if the network of metal fibers according to the invention the metal fibers are fixed to one another at points of contact which are randomly distributed throughout the network of metal fibers. According to another inventive aspect, it is preferred that the points of contact are not randomly distributed but are provided e.g. in a peripheral region of the network of metal fibers or that the metal fibers are ordered so that also the point of contacts are ordered. It is further preferred that the points of contact at which the metal fibers are fixed to one another are localized in specific areas and not provided evenly over the complete network of metal fibers. With the points of contact at which the metal fibers are fixed to one another being present only in separated areas, it is possible that the fibers inbetween these areas have a high flexibility while at the same time the mechanical stability and good electrical conductivity is ensured.

It is further preferable if in the network of metal fibers according to the invention the metal fibers are fixed to one another at points of contact, where the metal fibers are in contact with each other. Preferably, each of the metal fibers has at least two points of contact with other metal fibers, more preferably at least three points of contact, even more preferably at least four points of contact.

It is particularly preferred if in the network of metal fibers according to the invention the metal fibers are fixed to one another at points of contact, wherein the points of contact are distributed throughout the network, so that throughout the 3-dimensional structure of the network of metal fibers points of contact are present. Accordingly, the points of contact are not only provided in a certain area of the network of metal fibers such as in the center or in the circumference of the network. It is possible that the points of contact are evenly distributed throughout the network. It is also possible that the density of points of contact has a gradient throughout the network, i.e. that the network has areas with a higher density of points of contact and areas with a lower density of points of contact. It is also possible to have ordered or random spatial distributions of points of contact.

The network according to the invention preferably has open pores between the metal fibers. The porosity of the network is preferably up to 95 vol %. It is also preferable that the porosity of the network is more than 80 vol %. It is even more preferable when the porosity is in the range of 80 vol % to 95 vol %. It is possible to incorporate active materials into the open pores, such as active electrode materials or active catalyst materials. It is further preferable that in the network according to the invention at least some of the metal fibers of the plurality of metal fibers are at least partially coated. The coating can for example be an active material, such as an electrode active material which interacts with Li-ions in batteries or a catalytically active material which coverts CO to $CO_2$ or is active in hydrolysis. It is also possible to apply a coating onto the metal fibers which improves the fixation of the metal fibers to one another, and thereby increases the mechanical strength of the network.

By way of example, such active electrode materials for batteries are: for the anode: Graphite, Silicon, Silicon-Carbide (SiC) and Tin-Oxide (SnO), Tin-Dioxide ($SnO_2$) and Lithium-Titanoxide ($Li_4Ti_5O_{12}$); and for the cathode: Lithium-Nickel-Manganese-Cobalt-Oxide (NMC), Lithium-Nickel-Cobalt-Aluminium-Oxide (NCA), Lithium-Cobalt-Oxide ($LiCoO_2$) and Lithium-Iron-Phosphate (LFP).

It is in particular preferable if the coating contains an active material for an electrode of a secondary battery. Such a network of metal fibers which is provided with a coating containing an active material for the electrode of a secondary battery can be used to provide a flexible secondary battery which has an increased capacity. Moreover, it is possible to omit the use of a metal foil as current collector which not only improves the flexibility of the battery, but also reduces the battery's weight.

In a further preferred embodiment of the invention, the network of metal fibers has metal fibers which are coated with a coating comprising at least one catalytically active material. Such a network can be used as a catalyst. In particular, if the network has open pores and has the metal fibers coated with a coating comprising at least one transition metal it is possible that a gaseous or liquid fluid can flow through the network, so that compounds contained in the fluid can come into contact with the coating provided on the metal fibers, so that a catalytic reaction can occur. Suitable metal alloys may also function as catalytic materials themselves such as nickel fibers.

Catalytically active materials can be any materials capable of catalyzing a chemical reaction. It is particularly preferred that the catalyst material comprises one or more transition metals.

It is further preferred if in the network according to the invention the plurality of metal fibers form a network of interconnected pores.

It is further preferred if a coating which is provided on the plurality of metal fibers is in electrical contact with the plurality of metal fibers. This is in particularly beneficial, if the network is used as an electrode material for fuel cells, in hydrolysis or batteries. A network containing the metal fibers coated with the coating comprising an element suitable for catalyzing electrochemical reactions that occur at the electrodes of a fuel cell or a battery is capable of transporting electrons to or from the reaction site. Accordingly, such a network can be used to improve the performance of a fuel cell or of a battery.

The thickness of the network of the invention is not particularly limited. However, it is preferred if the network has a thickness of 0.01 mm or more. It is more preferred that the thickness of the network is 0.03 mm or more, even more preferred 0.05 mm or more, even more preferred 0.07 mm or more and most preferred 0.1 mm or more. If the thickness of the network is less than 0.01 mm, there is a risk that the mechanical stability of the network is not sufficient. The upper limit for the thickness of the network is not particularly limited. However, depending on the application, the upper limit may be 3.0 mm or less, or 2.5 mm or less. For battery applications, the most preferred thickness of the network is in the range from 0.1 mm to 0.5 mm. A network with a thickness in this range is advantageous concerning the stacking and rolling of the active material coated network for producing batteries. It is also favorable for the diffusion of Li-ions in a reasonable time.

The present invention concerns also a network of metal fibers comprising a plurality of metal fibers fixed to one another; wherein the network of metal fibers is obtainable by a process comprising the following steps: step 1 of producing the plurality of metal fibers having a length of 1.0 mm or more, a width of 100 µm or less and a thickness of 50 µm or less by subjecting molten material from which the metal fibers are to be made to a cooling rate of $10^2$ K·min$^{-1}$ or higher; step 2 of arranging the metal fibers obtained in step to form a network of loose metal fibers; step 3 of sintering the metal fibers to one another by one of the following processes c1 to c4: c1: placing the plurality of metal fibers in a hot press and subjecting the plurality of metal fibers present in the hot press to a predetermined pressure and temperature for a predetermined period of time to produce the network by sintering the plurality of metal fibers one to another forming points of contact at which the metal fibers are fixed to one another between the metal fibers, wherein in process c1 the pressure is between 0 and 20 GPa, preferably at least 20 MPa, and the temperature is between 10 to 95% of the melting temperature of the material of the metal fibers, wherein the melting temperature is determined by DSC measurement; c2: placing the loose network of metal fibers between two heating plates and adjusting the distance between the two heating plates to 0.1-1 mm and heating the heating plates to a temperature of 10 to 95% of the melting temperature of the material of the metal fibers, wherein the melting temperature is determined by DSC measurement; c3: ultrasound welding; c4: hammering.

In step 1 the metal fibers are produced from the melt with controlled length of 1 mm or more. In the case of entangled fibers or of fiber lengths that are not sufficiently uniform, they are processed further by technologies developed for the recycling of carbon fibers (Henrik Dommes, "Vom Faserabfall zum hochwertigen Leichtbau Halbzeug", Light weight Design 2010, 3, 23-27; doi: 10.1007/BF03223621). Thus, they can be cut to the desired length either by means of a mechanical cutter or by means of a laser, disentangled and partially oriented.

Figure 27:
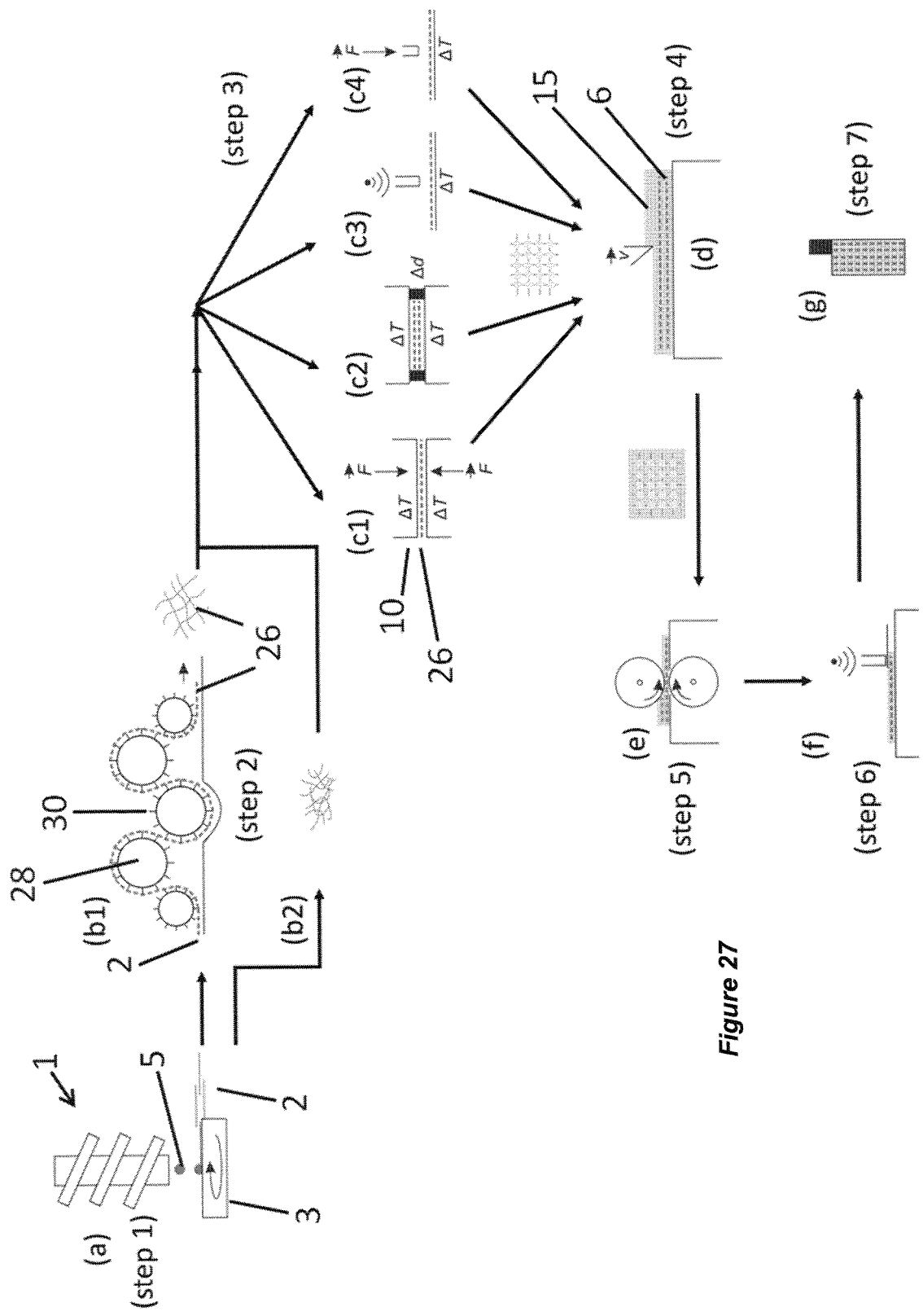

In step 2, metal fibers produced in step 1 are arranged in a disordered array either by sedimentation form a liquid dispersion or by means of an air stream ((FIG. 27, step 2, b2)). Ordered array of metal fibers are formed by carding (FIG. 27, step 2, b1). This way a felt like structure is generated like it is standard in textile processing of non-wovens, e.g. by carding.

Hence as a further aspect, the invention relates to a method for producing a network of metal fibers with welded or sintered contacts between the fibers. The invention comprises step 1 and 2 of providing a plurality of metal fibers and nets and step 3 for the interlinking of the filaments in order to form a consolidated porous nonwoven felt like structure.

In step 3 (FIG. 27, step 3) the loose felt of disordered metal filaments, also referred to as loose network of metal fibers, obtained by steps 1 and 2 is subjected to one of processes c1 to c4. For example it is placed in a hot press (FIG. 27, step 3, c1, c2) and subjected to a predetermined pressure and temperature for a predetermined period of time to produce the network by welding metal fibers at their contact points forming a network of crosslinked metal fibers. Subjecting the plurality of metal fibers present in a hot press to a predetermined pressure and temperature for a predetermined period of time to produce the network by sintering the plurality of metal fibers one to another forming points of contact between the metal fibers, wherein the pressure is between 0 and 2 GPa, preferable at least 20 MPa, and the temperature is between 10 to 95% of the melting temperature of the material of the metal fibers, wherein the melting temperature is determined by DSC measurement, e.g. through monitoring the re-crystallization temperature.

Based on the DSC measurement, the skilled person is able to determine the appropriate temperature for sintering the metal fibers in step 3 to one another. The skilled person understands that features related to steps 1 to 3 can be combined with features described in the following and in the claims related to steps 1-3 and with all features described above, in the following and in the claims related to the network of metal fibers.

In process c2 of step 3, when adjusting the distance between the heating plates, it is preferable that the loose network of metal fibers 2 is compacted to generate points of contact between the metal fibers.

In a further embodiment of step 3, the network structure can be tailored at different length scales if the compression tool is equipped with a structured contact surface, e.g. protrusions such as needle like pinnacles opposite to a flat surface or a rim pattern (FIG. 27, step 3, c3, c4; protrusions are not shown in FIG. 27). In this case, the distance between fiber links are controlled by the density of the fibers in the areas where the tool or the protrusions thereof compresses the felt, but no welding points will be formed at contact points of metal fibers where the compressing tool is not applied to the network or where the compressing tool does not have protrusions. With the tool structured, it is possible to improved average porosity and flexibility of the network of metal fibers.

Preferably, fiber length should be in the range of 1 to 20 cm, more preferably in a range of 3 to 15 cm and even more preferably in a range of 4 to 8 cm. With the fibers having a length such as indicated above, arranging the fibers by carding is easily possible.

In a modified procedure, the temperature for welding the filaments to a consolidated felt, i.e. a network according to the invention, can be lowered if instead of continuous compression of the filaments the filaments are welded by hammer strokes where the shock wave can reach significantly higher peak pressures connected with local heating (FIG. 27, step 3, c4). Such hammer strokes can be applied in the form of ultrasound, i.e. ultrasound welding, where the oscillation is in the direction normal to the felt (FIG. 27, step 3, c3). In case of welding by hammer strokes or by ultrasound it is—as mentioned above—preferable that the compacting tool is equipped with a structured surface with a plurality of protrusions, such as needle like pinnacles or rims. As mentioned above, such a structured compacting tool can be used for producing a network according to the invention in which the contacting points at which metal fibers are fixed to one another in a plurality of separated areas only, so that between such separated areas the metal fibers may have points of contact, however, are not fixed to one another. Areas in which the metal fibers are not fixed to one another may improve porosity and may also increase flexibility of the network of metal fibers.

It is further preferred that each of the areas in which the metal fibers are fixed to one another and/or each of the areas at which the metal fibers are not fixed to one another have a size of at least 1 mm$^2$, more preferably of at least 2 mm$^2$ and even more preferably of at least 5 mm$^2$. It is further preferable, in particular with each of the areas in which the metal fibers are fixed to one another and/or each of the areas at which the metal fibers are not fixed to one another having a size of at least 1 mm$^2$, that the areas in which the metal fibers are fixed to one another form island like structures surrounded by sea like areas in which the metal fibers are not fixed to one another. Alternatively, it is also preferable, in particular when each of the areas in which the metal fibers are not fixed to one another and/or each of the areas at which the metal fibers are fixed to one another having a size of at least 1 mm$^2$, that the areas in which the metal fibers are not fixed to one another form island like structures surrounded by sea like areas in which the metal fibers are fixed to one another.

It is common to all processes c1 to c4 that the fibers as a whole are kept significantly below the melting temperature and sintering takes place only at the points of contact between them. This way it is ensured that the fibrous structure does not collapse. In all cases welding of the contacts between different filaments is improved and eased by the fact that the rapidly cooled fibers, obtained e.g. by melt spinning, are not in their thermal equilibrium and contain amorphous and/or nanocrystalline domains where the atoms can be more easily rearranged than in equilibrated crystal domains.

In the method according to the invention the pressure applied in process c1 allows to keep the temperature significantly below the melting temperature of the metal fiber's material while at the same time a strong bond between the metal fibers is produced to yield a stable network of metal fibers. In all processes c1 to c4 of the method according to the invention, the atom diffusion due to thermal energy is kept low, while mechanical pressure induced atom diffusion is increased. This mechanism allows it to produce stable networks of metal fibers that are permanently sintered together at low costs and without the need of elaborately controlling the temperatures applied. If the temperature is above 95% of the melting temperature of the material of the metal fibers, there is a risk that the metal fibers are transformed into a metal foil. On the other hand, if the temperature is less than 10% of the melting temperature of the material of the metal fibers, the mobility of the atoms is so low that in the method the metal fibers are not sufficiently sintered together to provide a stable network of metal fibers or takes too much time.

In the context of the description of the invention "% of the melting point" refers to the melting point in ° C. Accordingly, if the melting point is 1000° C., in the context of the description of the invention 20% of the melting point is 200° C., 50% of the melting point is 500° C. and 95% of the melting point is 950° C.

It is to be understood that all aspects of the network of metal fibers, in particular those related to the metal fibers, which are described above constitute preferred embodiments also having regard to the method according to the invention.

In the method according to the invention it is preferred if the metal fibers provided have a length in the range of 1 to 20 cm, more preferably in a range of 3 to 15 cm and even more preferably in a range of 4 to 8 cm, a width of 100 µm or less and a thickness of 50 µm or less or a circular or elliptical cross section. Concerning the length, width and thickness of the metal fibers, it is to be understood that the same dimensions indicated above for describing the network are also preferred in the method according to the invention. It was observed that such fibers can be used to produce a stable network of metal fibers without the need of heating the metal fibers to their melting temperature.

In the method according to the present invention, the temperature applied depends on the material of the metal fibers. To avoid amorphous metal fibers from crystallizing during the welding process, it is preferable to keep the temperature applied below the crystallization temperature of these fibers. The crystallization temperature can be determined by differential scanning calorimetry (DSC) measurement for the metal fiber in question. DSC measurement were performed using the following conditions: Starting temperature 30° C. with a heating rate of 10 K min$^{-1}$ until 1200° C., continued with a cooling rate of 10 K min$^{-1}$ until room temperature. DSC measurements are performed in an argon atmosphere with a constant argon flow of 100 ml min$^{-1}$ and a zirconium-oxygen-trap system for a complete oxygen free atmosphere (STA 449 F3 Jupiter, Netzsch Bj. 2017).

In the method according to the invention, the time for which the metal fibers are subjected to the predetermined temperature and pressure is not particularly limited and depends on the material of the metal fibers, on the applied pressure and on the temperature. However, to ensure that the metal fibers are sufficiently sintered together it is preferable that the predetermined time in process c1 and c2 is 10 seconds or longer, more preferable 1 minute or longer, even more preferable 2 minutes or longer, even more preferable 3 minutes or longer and most preferable 5 minutes or longer. The upper limit for which the metal fibers in step b) are subjected to the predetermined temperature and pressure is not particularly limited. From an economic point of view it is however preferable if the time is 60 minutes or less, even more preferable 45 minutes or less and most preferable 30 minutes or less.

To ensure a stable connection between metal fibers throughout the complete network, it is preferable if the pressure and heat in process c1 is applied for at least 1 minute.

It is preferable that the pressure applied in process c1 and c2 is 20 MPa or higher, more preferable 30 MPa or higher, even more preferable 100 MPa or higher and most preferably 120 MPa or higher. Depending on the metal alloy and melt spinning process also lower applied pressures might be possible. The upper limit for the pressure is not particularly limited. However, to avoid transforming the metal fibers into a metal foil, it is preferable that the pressure is 1,000 MPa or less, more preferably 750 MPa or less, even more preferably 500 MPa or less and most preferably 300 MPa or less.

For producing a network which contains coated metal fibers, it is in principle possible to provide coated metal fibers after step 1 or 2 or to conduct a step 4 of coating the metal fibers, wherein step 4 is preferably carried out after step 3. Carrying out step 4 after the sintering in step 3 allows for producing a basic network for many applications. In the subsequent step 4 the network can then be modified for the intended applications by providing a suitable coating onto the metal fibers. Moreover, performing step 4 after step 3 allows for providing a coating on the metal fibers which would be susceptible to the conditions applied during the sintering and/or welding in step 3. This is for example the case if the coating has a low melting point so that subjecting the coating to the conditions in step 3 would melt the coating.

In the method according to the invention it is further preferred if the metal fibers are produced by melt spinning. Such metal fibers produced by melt spinning can contain spatially confined domains in a high-energy state, due to the fast cooling applied during the melt spinning process. Fast cooling in this regard refers to a cooling rate of $10^2$ K·min$^{-1}$ or higher, preferably of $10^4$ K·min$^{-1}$ or higher, more preferably to a cooling rate of $10^5$ K·min$^{-1}$ or higher. Therefore, it is possible to sinter such metal fibers together, while keeping the temperature in step 3 well below the melting temperature of the metal fibers. It is even possible to sinter such metal fibers together at temperatures below their crystallization temperature of the material of the metal fibers. This is in particular advantageous if the metal fibers are coated with a coating layer sensitive to high temperatures. In view of the above, it is preferred that the metal fibers of the network of metal fibers according to the invention are obtainable by subjecting molten material of the metal fibers to a cooling rate of $10^2$ K·min$^{-1}$ or higher by melt spinning.

It is preferred if in the method according to the invention the temperature applied in step 3 is 80% or less, more preferably 70% or less, even more preferably 60% or less and most preferably 50% or less of the melting temperature of the material of the metal fibers. It is even possible that the temperature applied in step 3 is 25% or less of the melting temperature of the material of the metal fibers. By keeping the temperature in step 3 below these limits, the risk of transforming the metal fibers into a metal foil is reduced. The temperature is preferably 10% or more, more preferably 20% or more and even more preferably 25% or more and most preferably 30% or more of the melting temperature of the material of the metal fibers. If the temperature in step 3 is below these limits, the risk of not sufficiently sintering the metal fibers together to provide a stable network of metal fibers is increased due to a decrease in the movability of the atoms of the metal fibers. However, the lower limit is depending on the metal or metal alloy and therefore might be even lower than 20% of the melting temperature.

In the method of the invention amorphous metal fibers can be used. If amorphous metal fibers are used, it is preferable to keep the temperature in step b) below the crystallization temperature. The crystallization temperature can be determined by differential scanning calorimetry (DSC) measurement. It is further preferable that if amorphous metal fibers are used that the temperature is preferably 50% or less, more preferably 35% or less and even more preferably 30% or less and most preferably 20% or less of the crystallization temperature of the material of the metal fibers. However, it is also possible if amorphous metal fibers are used that the temperature is preferably 95% or less, more preferably 90% or less and even more preferably 85% or less and most preferably 80% or less of the crystallization temperature of the material of the metal fibers.

In the context of the description of the invention "% of the crystallization temperature" refers to the crystallization temperature in ° C., as determined by differential scanning calorimetry (DSC) measurement. Accordingly, if the crystallization temperature is 1000° C., in the context of the description of the invention 20% of the crystallization temperature is 200° C., 50% of the crystallization temperature is 500° C. and 95% of the crystallization temperature is 950° C.

It is further preferred that in the method of producing a network of metal fibers, a step is performed of filling the voids between the metal fibers in the network at least partially with an active material, in particular with an active electrode material or a catalyst material. The step of filling the voids between the metal fibers is schematically illustrated in FIG. 27.

After a network of metal fibers has been produced by the method of the invention, it is particularly preferred to cut the network into a shape suitable for a desired application. The cutting can be performed before or after a coating step and also if no coating step at all is intended. It facilitates the production of networks of metal fibers in desired shapes, if the cutting is performed after a network of metal fibers has been formed.

Description of an electrode containing a network of metal fibers and preferred embodiments:

A further aspect of the invention relates to an electrode containing a network, as described above, preferably produced according to or obtainable by the method described above. It is particularly preferred that the network of metal fibers forming a part of the electrode has been separated, for example by cutting, from a network as described above.

It is particularly preferable if the electrode contains the network as a current collector.

In the electrode according to the invention it is further preferable if the voids between the metal fibers in the network are at least partially filled with an active material, in particular with an active electrode material or a catalyst material.

Description of a battery comprising an electrode containing a network of metal fibers and preferred embodiments:

A further aspect of the invention relates to a battery comprising an electrode, such as described above. At least one electrode in the battery is a cathode (positive electrode) and/or at least one electrode is an anode (negative electrode). Terms anode and cathode refer to the electrodes when the battery is discharging.

The porous structure of the network of metal fibers provides for a comparatively large volume which can be occupied by active electrode material and is not present e.g. in a commonly used metal foil. Accordingly, the amount of electrode active material can be significantly increased without compromising the capacity due to an increase in electrical resistance which is caused by the high amount of active electrode material. Moreover, by using a network of metal fibers as described above, the active material is distributed throughout the current collector. Therefore, the electrons have to overcome only short distances between the active material and the current collector. Diffusion of Li-ions is enhanced since the electrode materials do not need to be pressed as much as in case of metal foils used as electrodes since conductivity and connectivity of active material and electrodes is generally higher. As a result, charging times of the battery can be significantly reduced and the use of additives such as carbon black and binders can also be reduced so that more active material can be incorporated into the battery's electrode further improving the properties of the battery. The flexibility and stability of a network of metal fibers allows for a durable electrode to be fabricated and as a consequence for a battery having an increased lifetime. In addition, the battery which makes use of the electrode according to the invention has improved battery charging kinetics due to the 3-dimensional nature of the metal network which penetrates the active electrode material. This enables short migration distances of electrons and charge carriers from its origin within the active material to a metal current collector from where it is distributed in the circuit.

It is preferred if the battery according to the invention is a secondary battery, more preferably a lithium ion battery. It is also preferable if the network is a network of copper metal fibers or copper-alloy fibers, e.g. $Cu_{99}Si_1$, $Cu_{98}Si_2$, $Cu_{96}Si_4$, $Cu_{88}Si_{12}$, or $Cu_{92}Sn_8$, or a network of aluminum metal fibers or aluminum-alloy fibers, e.g. $Al_{99}Si_1$. Copper-alloys and aluminum-alloys have better manufacturing conditions of the fibers with melt-spinning technique in comparison to their pure metals while they exhibit nearly the equal conductivity.

It is also preferable to provide a network of metal fibers, wherein the metal fibers are made of aluminum for a cathode of a secondary battery or made of copper for the anode of a secondary battery. Such a network can be infiltrated with a lithium active material and used at the electrode. Also in this case the distance between current collector and active material can be reduced which is beneficial for the performance of the battery.

Accordingly, it is in particular preferable if the battery according to the invention contains an electrode comprising a network of metal fibers of copper or copper alloys. It is also in particular preferable if the battery according to the invention contains an electrode comprising a network of metal fibers of aluminum or aluminum alloys. It is also preferable if the battery according to the invention contains a first electrode comprising a network of metal fibers of copper or copper alloy and a second electrode comprising a network of metal fibers of aluminum or aluminum alloy. It may also be possible that two or more electrodes of the same or different metal fiber materials are used.

In the present disclosure the focus is on the network of metal fibers and its use as an electrode material. It is, however, also preferred to use the network of metal fibers as described herein in catalytic materials, in fuel cells, in hydrolysis, as component in electromagnetic shielding materials, as filters, in polymer composites or as tissue material and tissue hybrid material which may also include as additives, e.g. cotton, silk or wool.

The invention will now be described in further detail and by way of example only with reference to the accompanying drawings and figures as well as by various examples of the network and method of the invention. In the drawings there are shown:

FIG. 1a) Schematic drawing of a vertical melt spinning device.

Figure 1B:
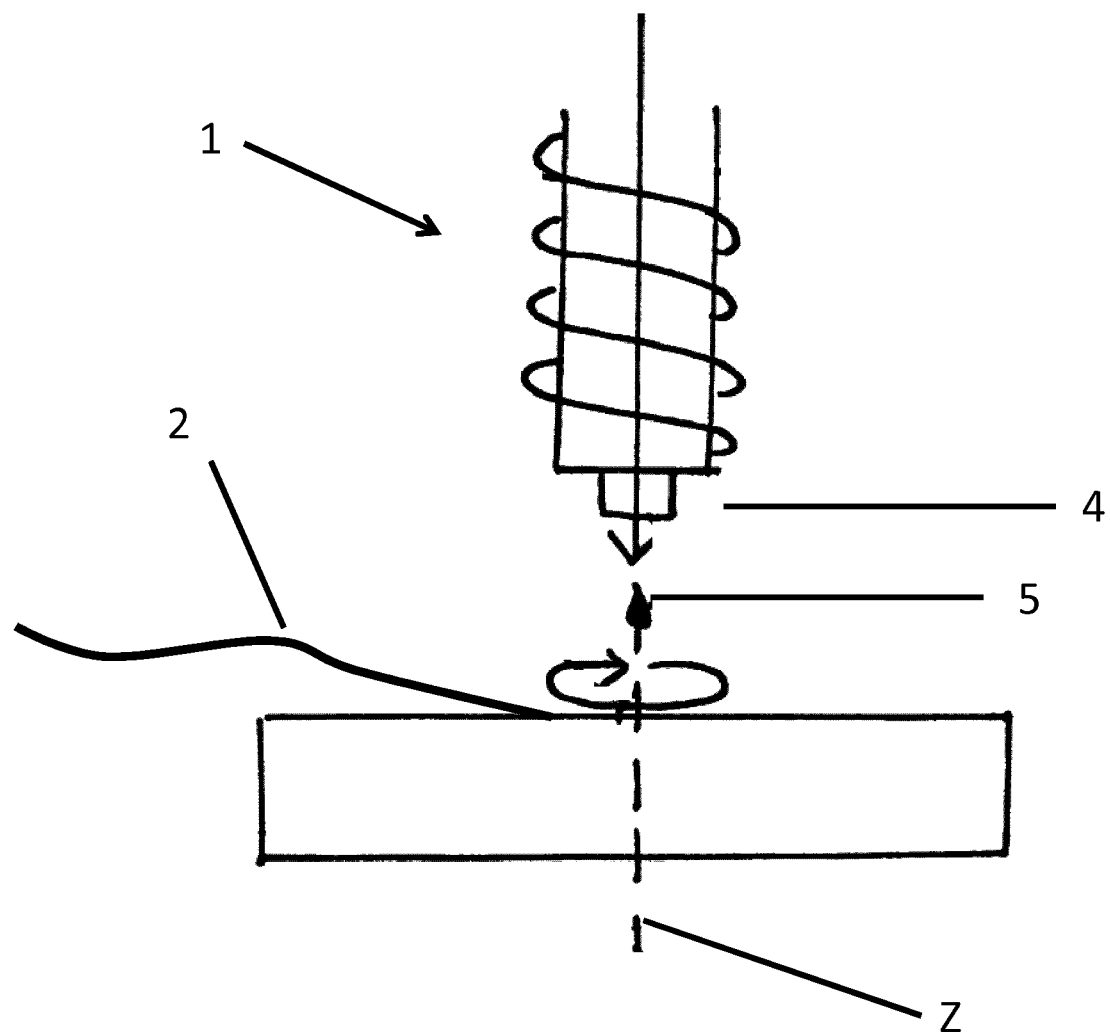

FIG. 1b) Schematic drawing of a horizontal melt spinning device.

Figure 1C:
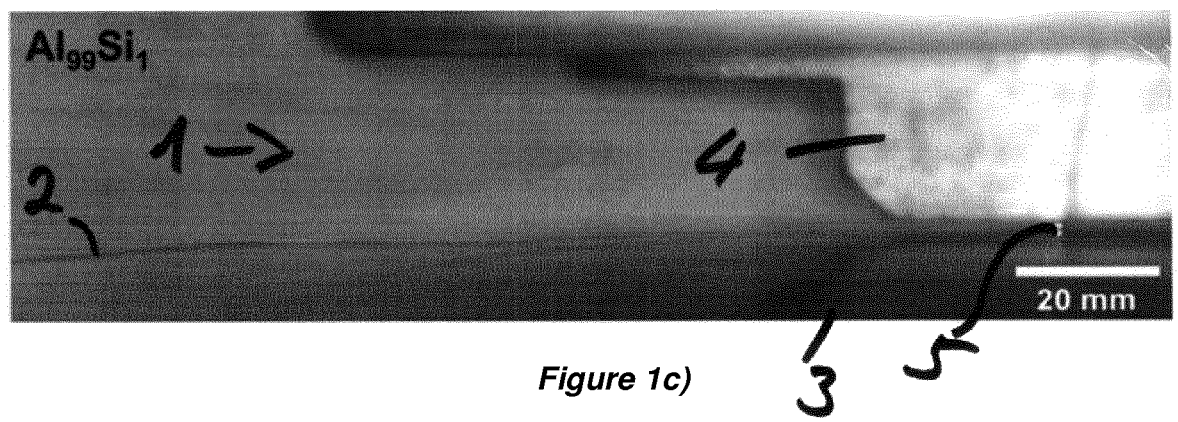

FIG. 1c) Photographic image taken from a movie of the deposition of a melt of an $Al_{99}Si_1$-alloy onto a rotating wheel.

FIG. 2a) Photographic image of copper metal fibers.

FIG. 2b) Photographic image of cobalt metal fibers.

FIG. 2c) Photographic image of metal fibers of an $Al_{99}Si_1$-alloy.

FIG. 2d) Photographic image of metal fibers of a $Co_{66}Fe_4Mo_2B_{12}Si_{16}$-alloy.

FIG. 3a)
i) Photographic image of $Co_{66}Fe_4Mo_2B_{12}Si_{16}$-alloy metal fibers fabricated at a wheel-speed of 50 m/s with ii) showing a mean thickness and iii) showing a mean width of the $Co_{66}Fe_4Mo_2B_{12}Si_{16}$-alloy metal fibers.

FIG. 3b) i) Photographic image of $Co_{66}Fe_4Mo_2B_{12}Si_{16}$-alloy metal fibers fabricated at a wheel-speed of 25 m/s with ii) showing a mean thickness and iii) showing a mean width of the $Co_{66}Fe_4Mo_2B_{12}Si_{16}$-alloy metal fibers.

Figure 4A:
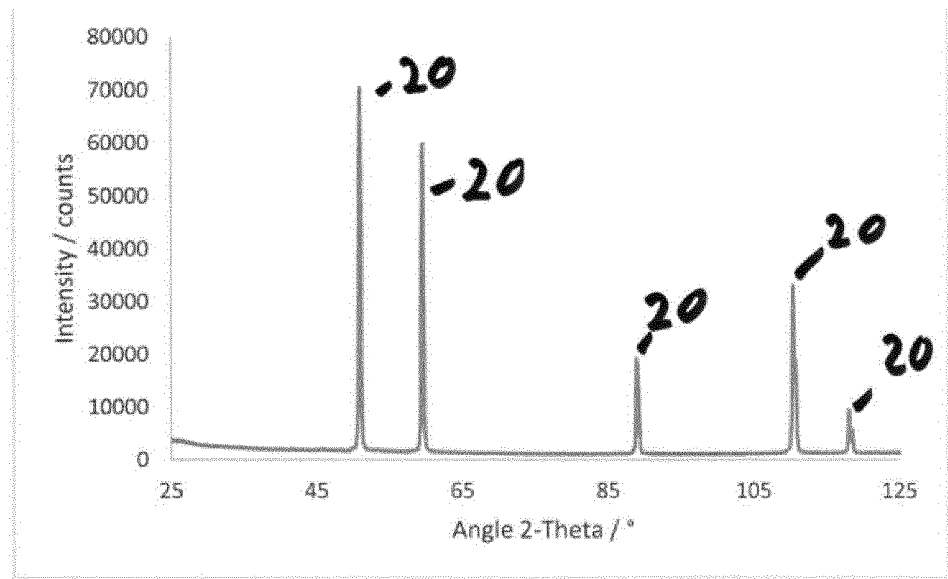

FIG. 4a) X-ray diffraction pattern of copper metal fibers.

Figure 4B:
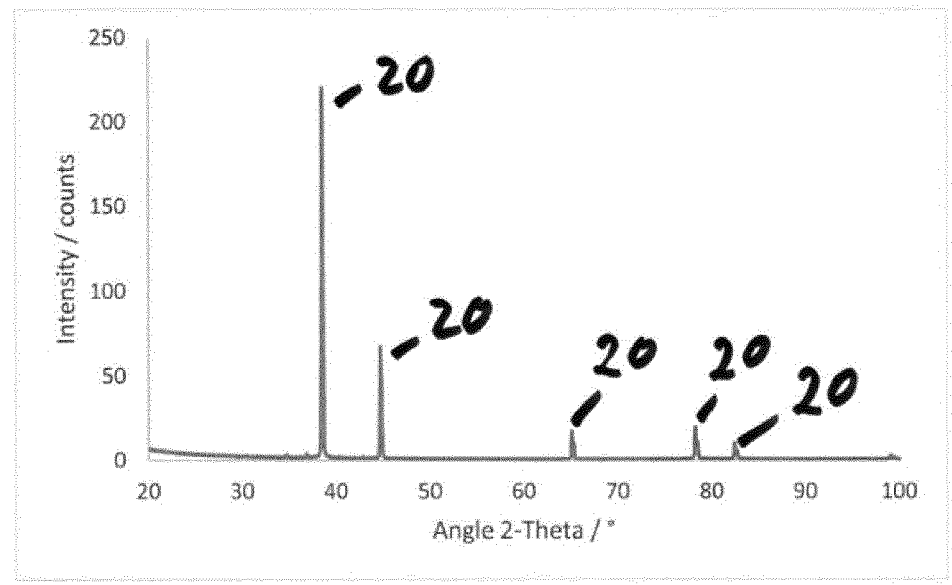

FIG. 4b) X-ray diffraction pattern of $Al_{99}Si_1$-alloy metal fibers.

Figure 4C:
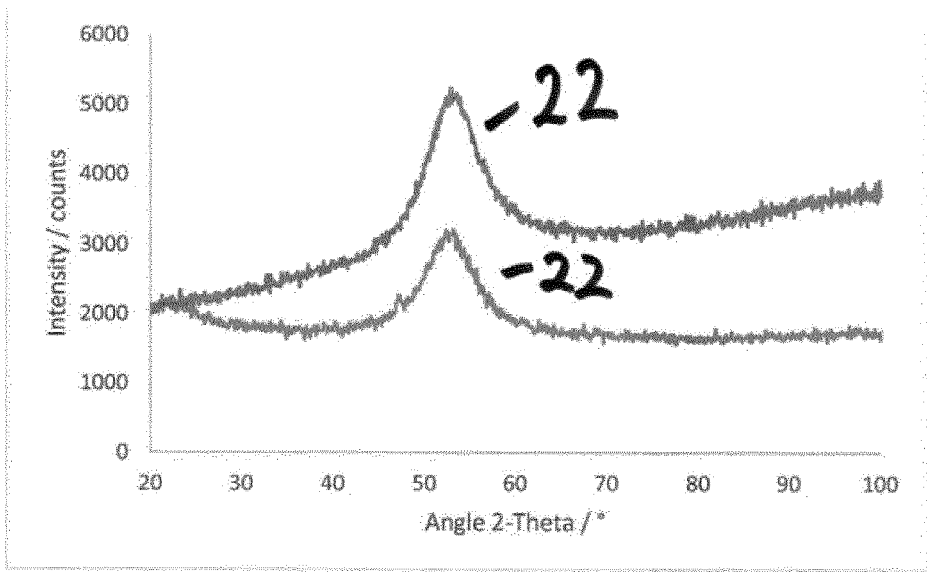

FIG. 4c) X-ray diffraction pattern of $Co_{66}Fe_4Mo_2B_{12}Si_{16}$-alloy metal fibers.

Figure 5A:
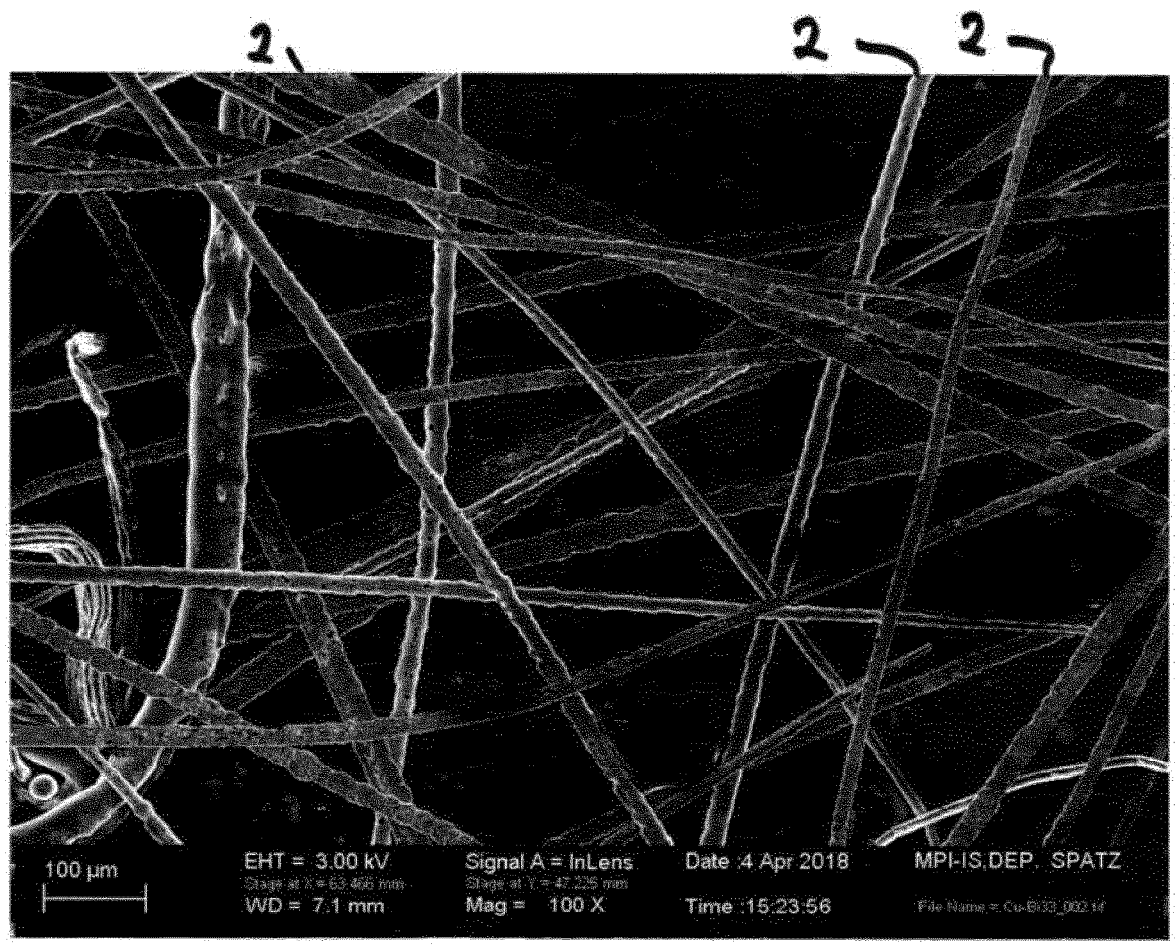

FIG. 5a) Scanning electron micrograph (SEM) of copper metal fibers.

Figure 5B:
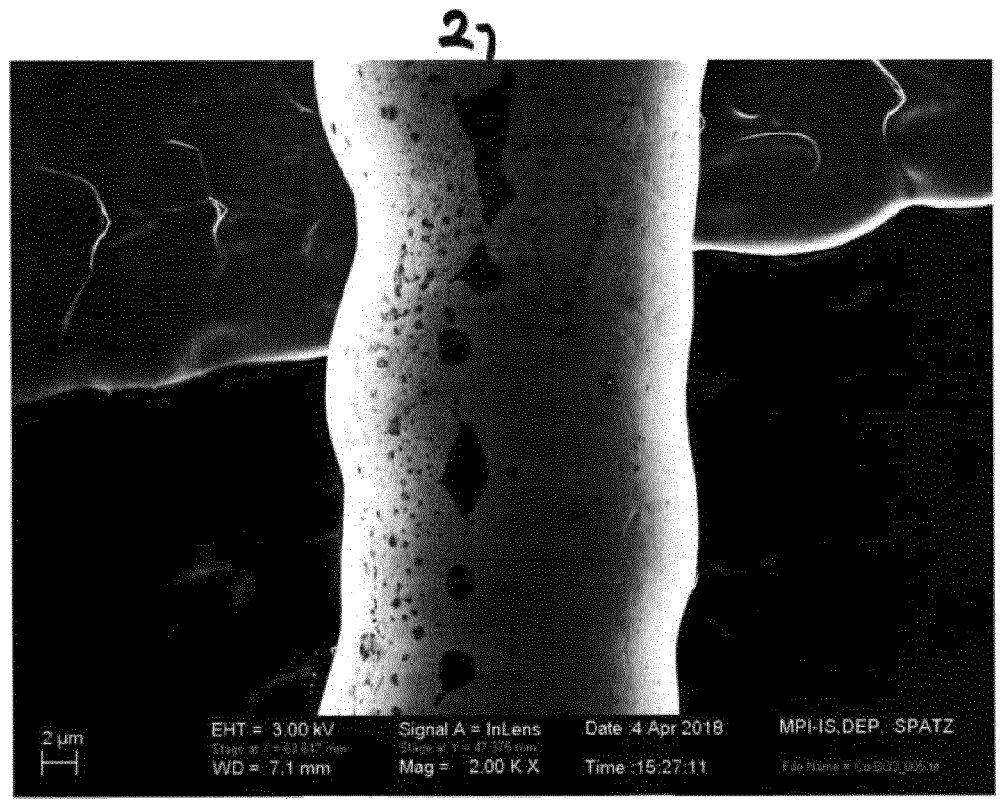

FIG. 5b) Enlarged view of FIG. 5a).

Figure 5C:
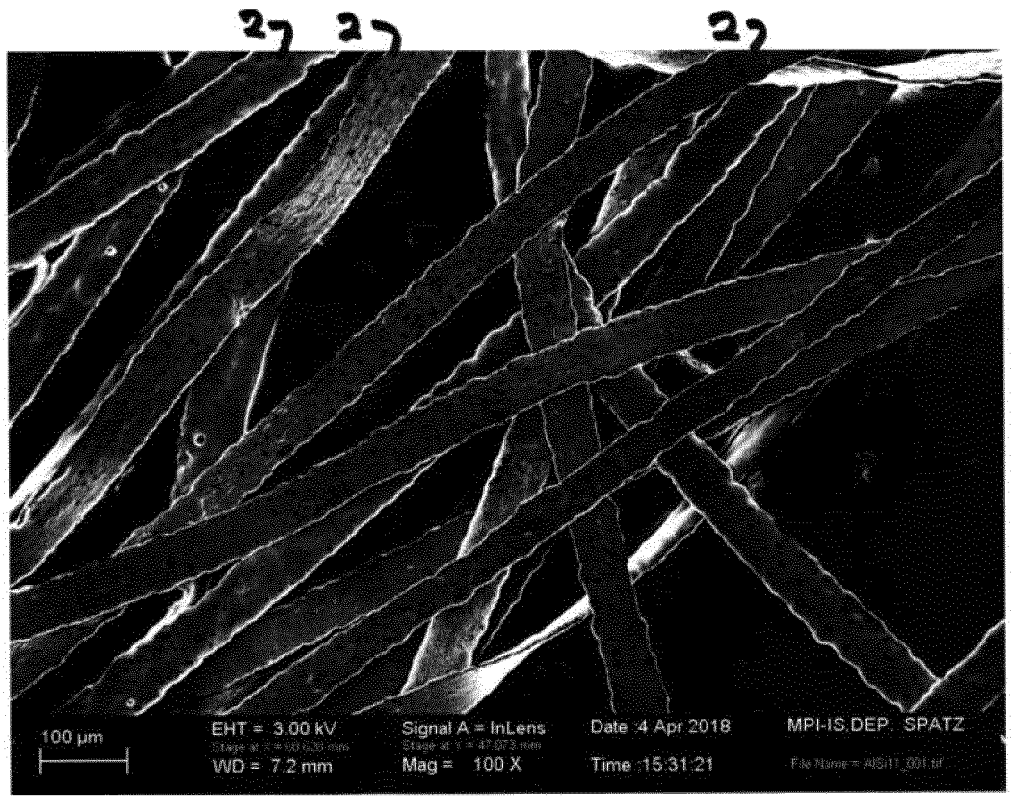

FIG. 5c) Scanning electron micrograph of $Al_{99}Si_1$-alloy metal fibers.

Figure 5D:
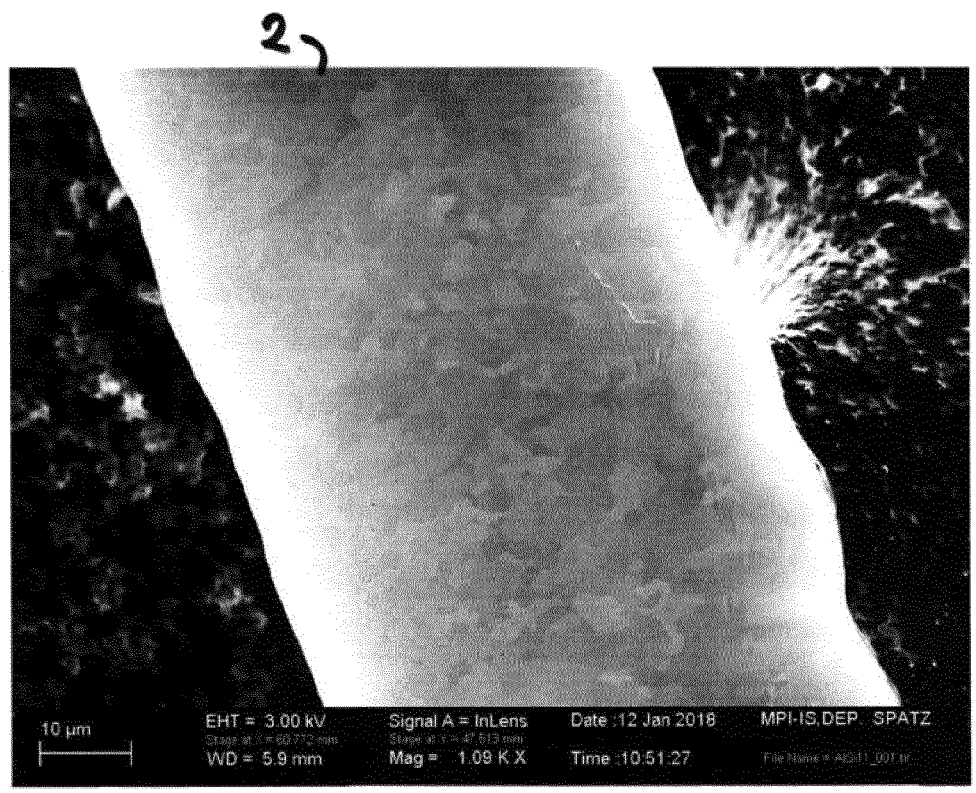

FIG. 5d) Enlarged view of FIG. 5c).

Figure 5E:
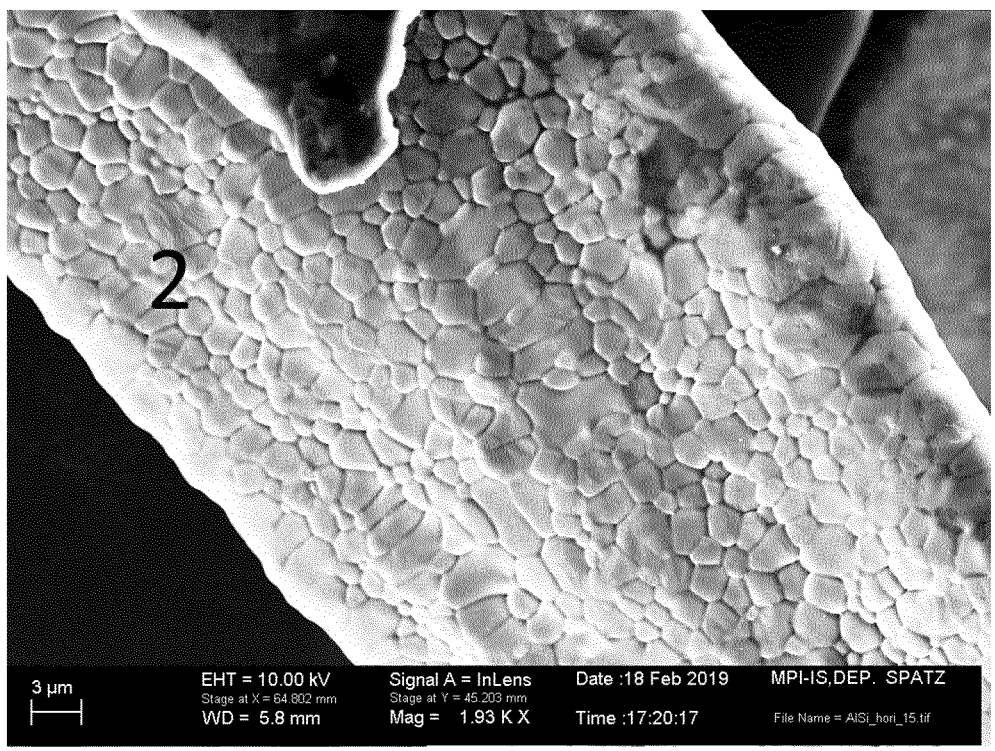

FIG. 5e) Further scanning electron micrograph of $Al_{99}Si_1$-alloy metal fibers.

Figure 5F:
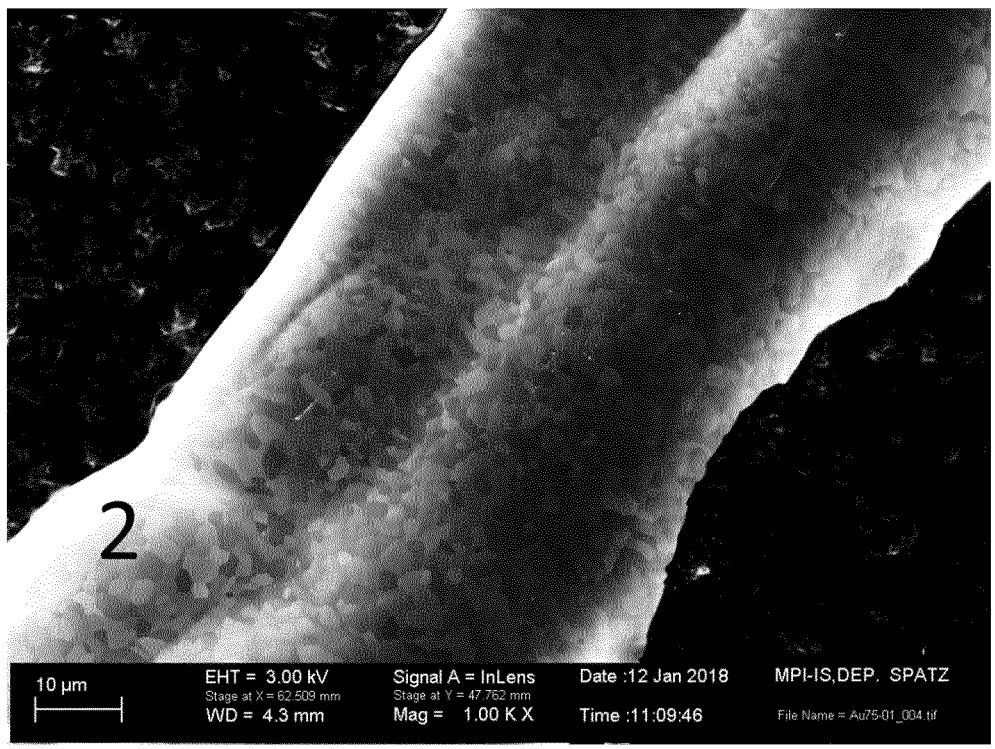

FIG. 5f) Scanning electron micrograph of gold metal fibers

Figure 5G:
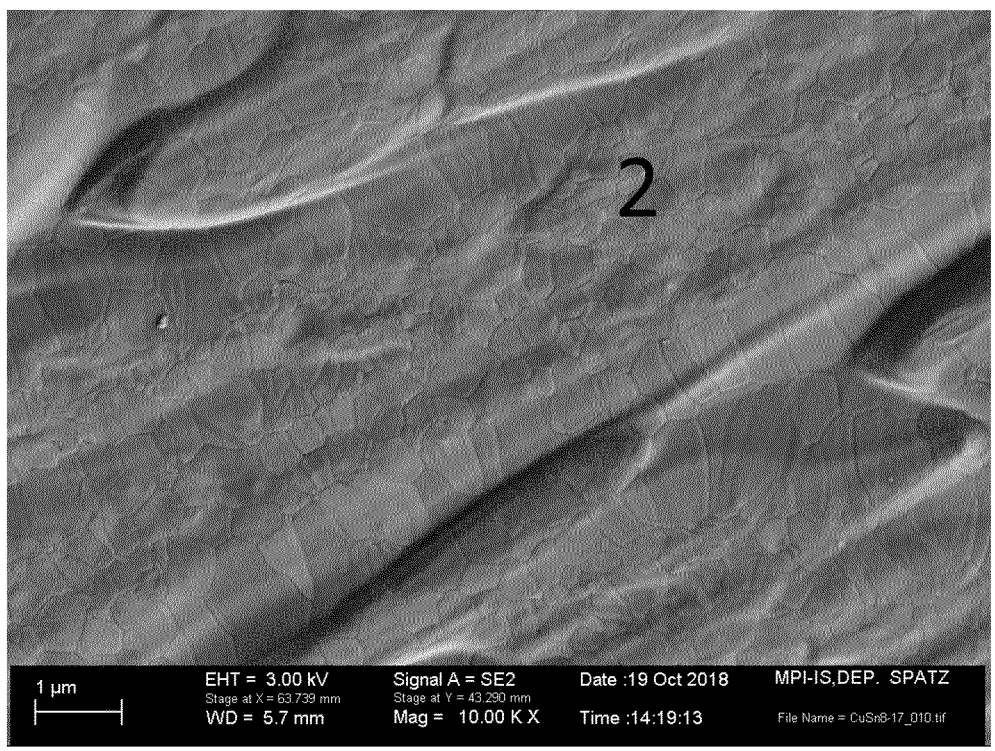

FIG. 5g) Scanning electron micrograph of $Cu_{92}Sn_8$-alloy metal fibers.

Figure 5H:
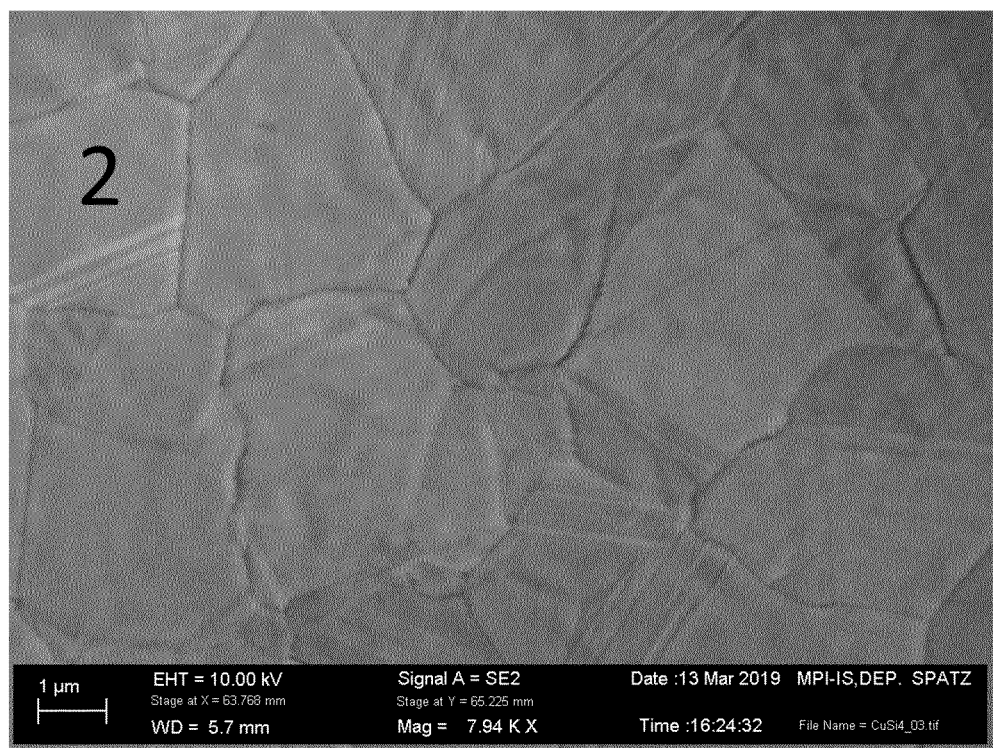

FIG. 5h) Scanning electron micrograph of $Cu_{96}Si_4$-alloy metal fibers.

Figure 6A:
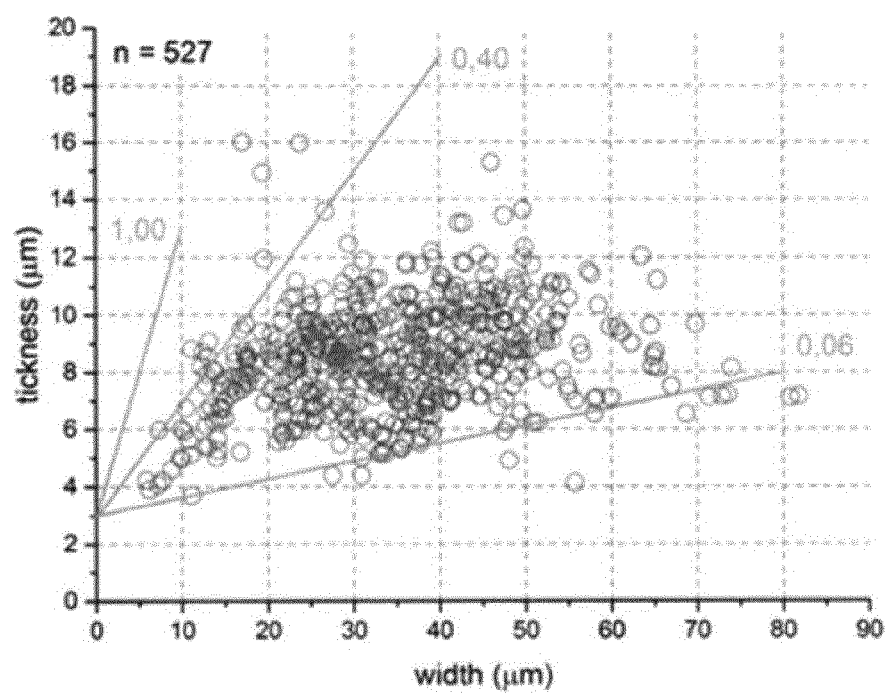

FIG. 6a) Thickness and width of 527 $Al_{99}Si_1$-alloy metal fibers fabricated at a wheel-speed of 25 m/s.

Figure 6B:
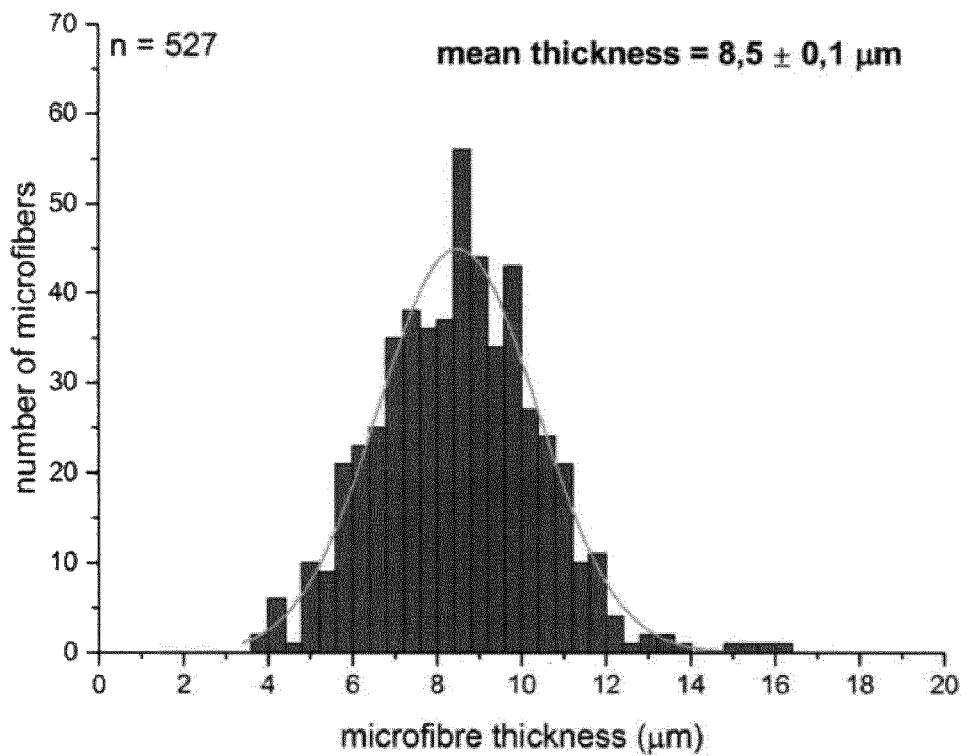

FIG. 6b) Distribution of the thickness of 527 $Al_{99}Si_1$-alloy metal fibers fabricated at a wheel-speed of 25 m/s.

Figure 6C:
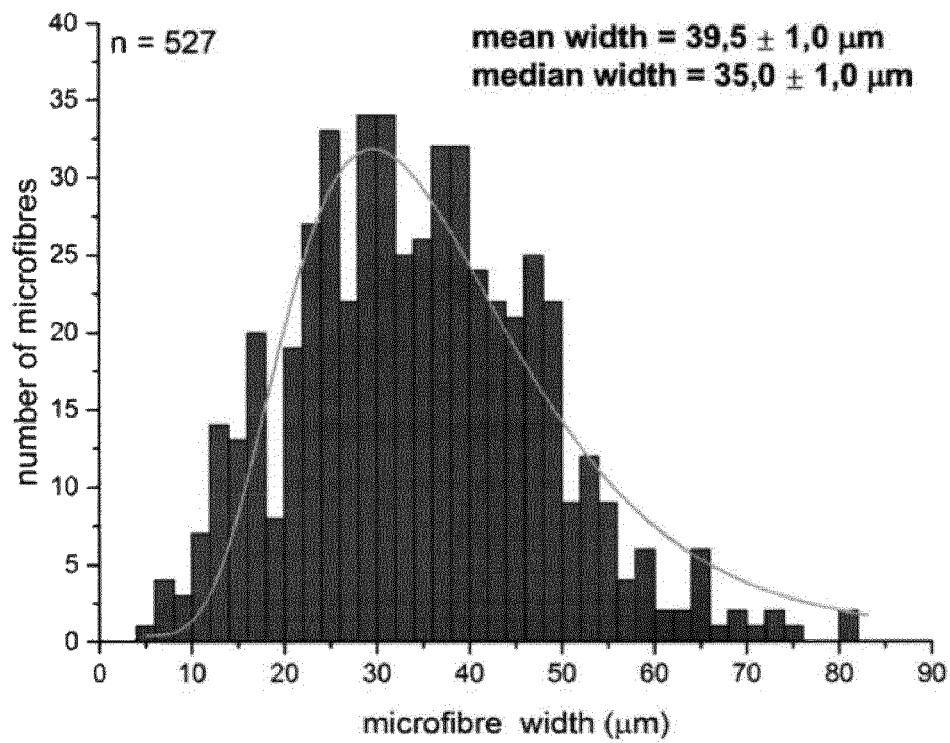
Figure 6D:
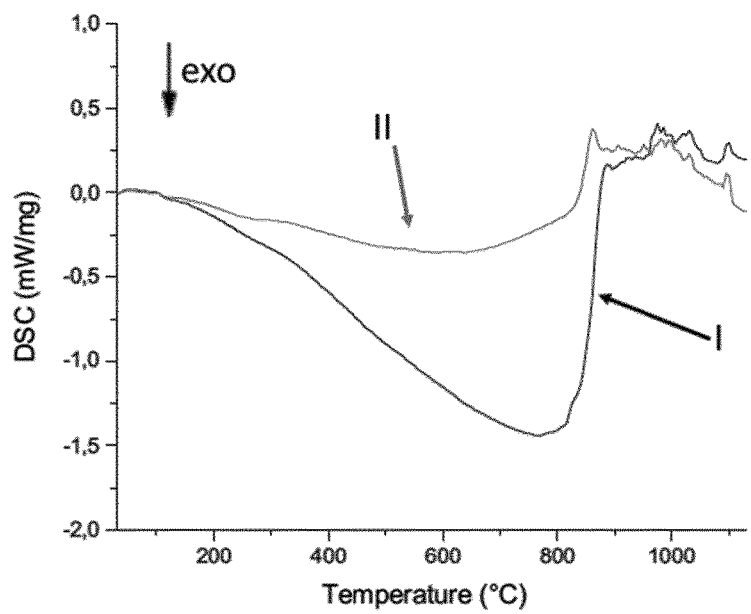

FIG. 6c) Distribution of the width of 527 $Al_{99}Si_1$-alloy metal fibers fabricated at a wheel-speed of 25 m/s.

FIG. 6d) DSC measurements of $CuSn_8$ microfibers after melt spinning (curve I) and after thermal equilibration of the same micro fibers (curve II) which demonstrates the exothermal process in case of heating melt spinned fibers in comparison to the equilibrated metal fibers.

Figure 7:
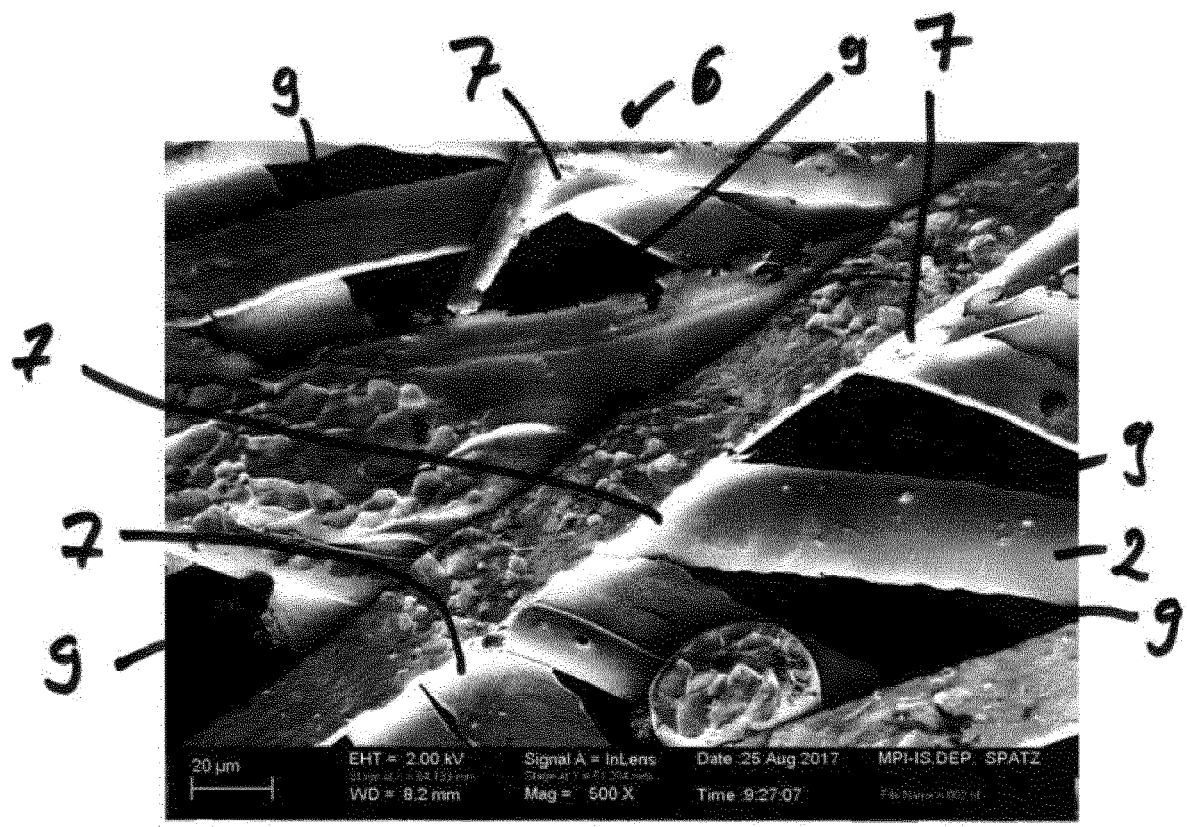

FIG. 7 SEM image of a network according to the invention of $Co_{66}Fe_4Mo_2B_{12}Si_{16}$-alloy metal fibers after sintering (network of Example 2).

Figure 8:
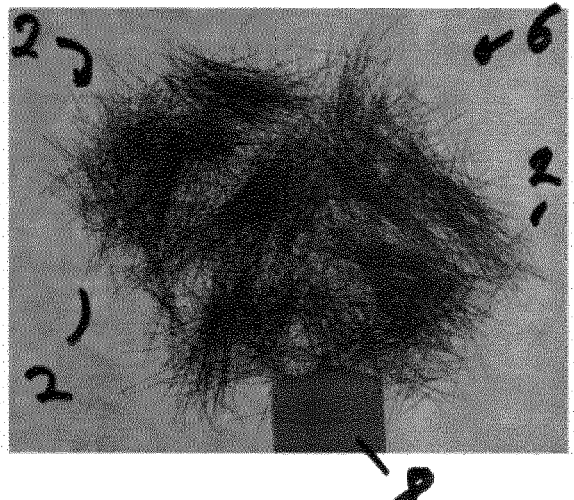

FIG. 8 Photographic image of a network according to the invention of sintered $Co_{66}Fe_4Mo_2B_{12}Si_{16}$-alloy metal fibers before deformation.

Figure 9:
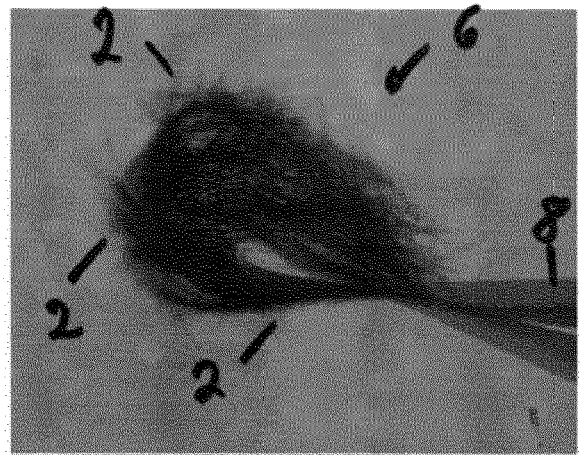

FIG. 9 Photographic image of the network of FIG. 8 in a deformed state.

Figure 10:
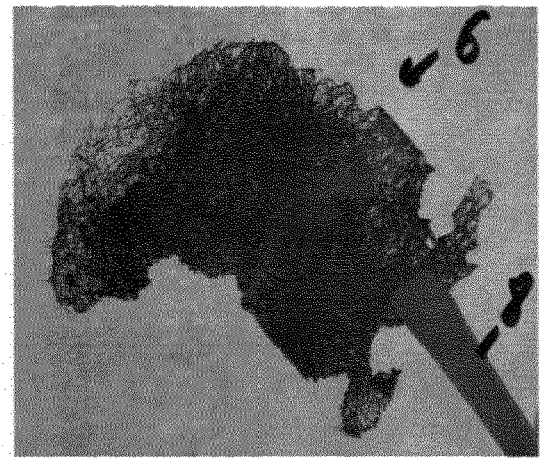

FIG. 10 Photographic image of a network according to the invention of copper metal fibers sintered for 5 minutes at a temperature of 300° C. under a pressure of 177 MPa (network of Example 9).

Figure 11:
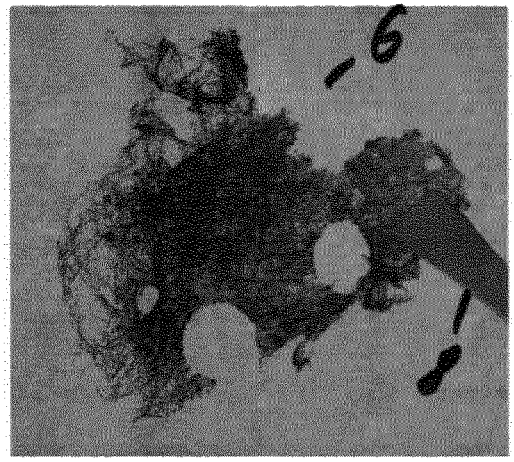

FIG. 11 Photographic image of a network according to the invention of copper metal fibers sintered for 3 minutes at a temperature of 300° C. under a pressure of 177 MPa (network of Example 10).

Figure 12:
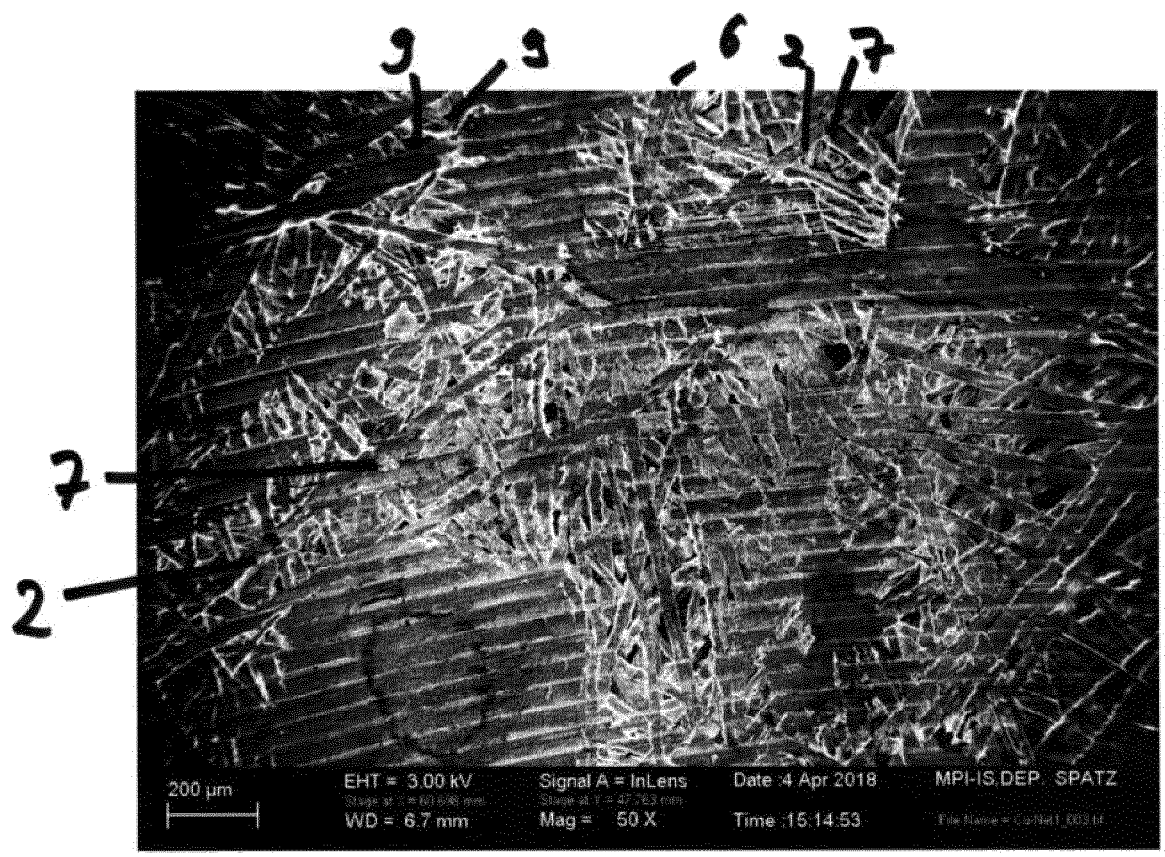

FIG. 12 SEM image of the network shown in FIG. 11.

Figure 13:
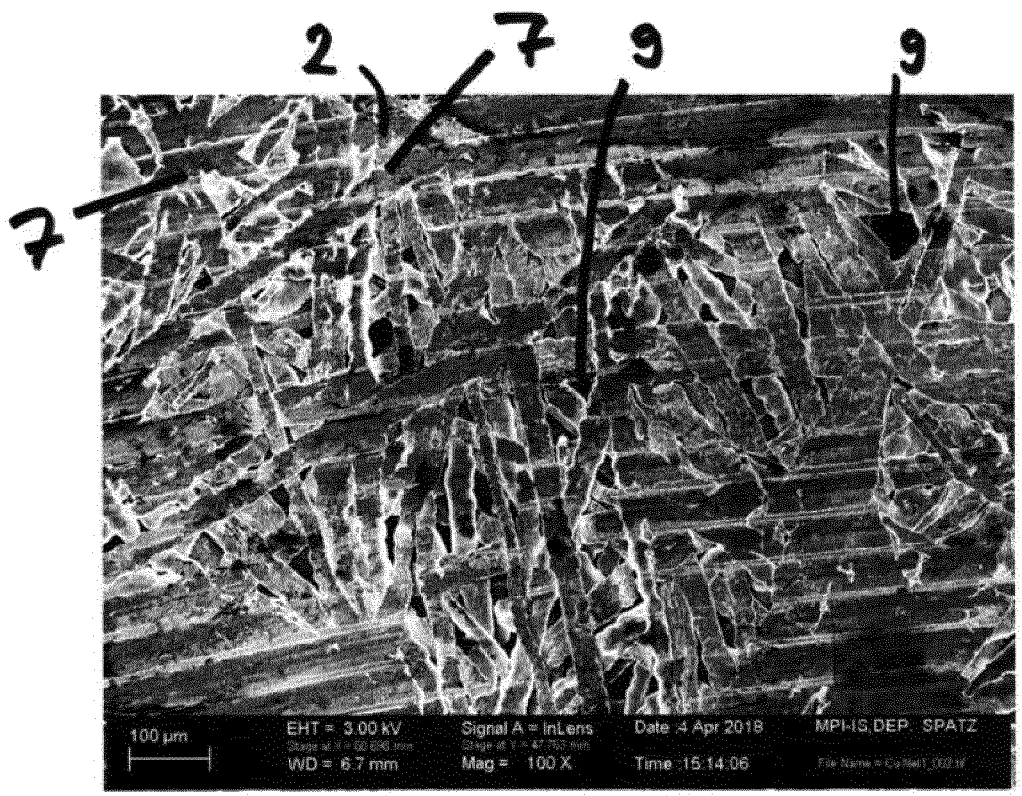

FIG. 13 Enlarged SEM image of the network shown in FIGS. 11 and 12.

Figure 14A:
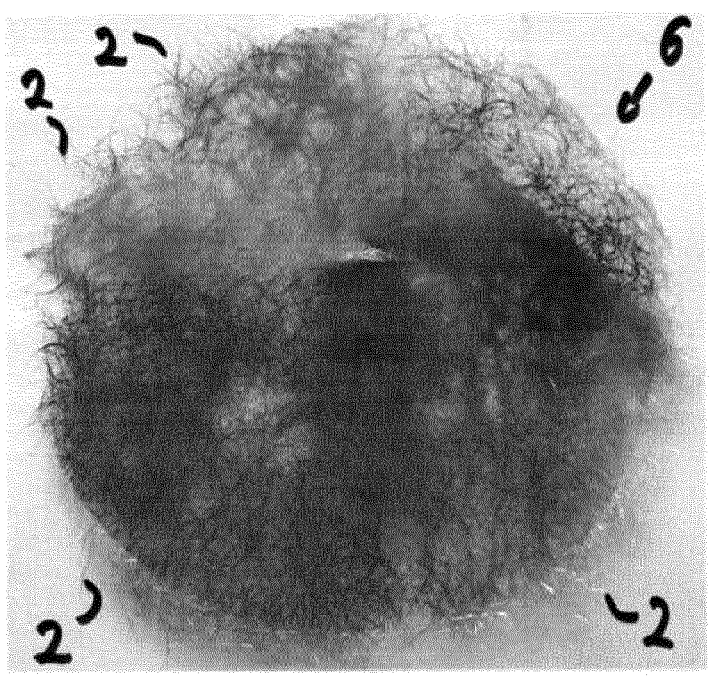

FIG. 14a) Photographic image of a network according to the invention of $Cu_{92}Sn_8$-alloy metal fibers sintered for 3 minutes at a temperature of 300° C. under a pressure of 78 MPa (network of Example 11).

Figure 14B:
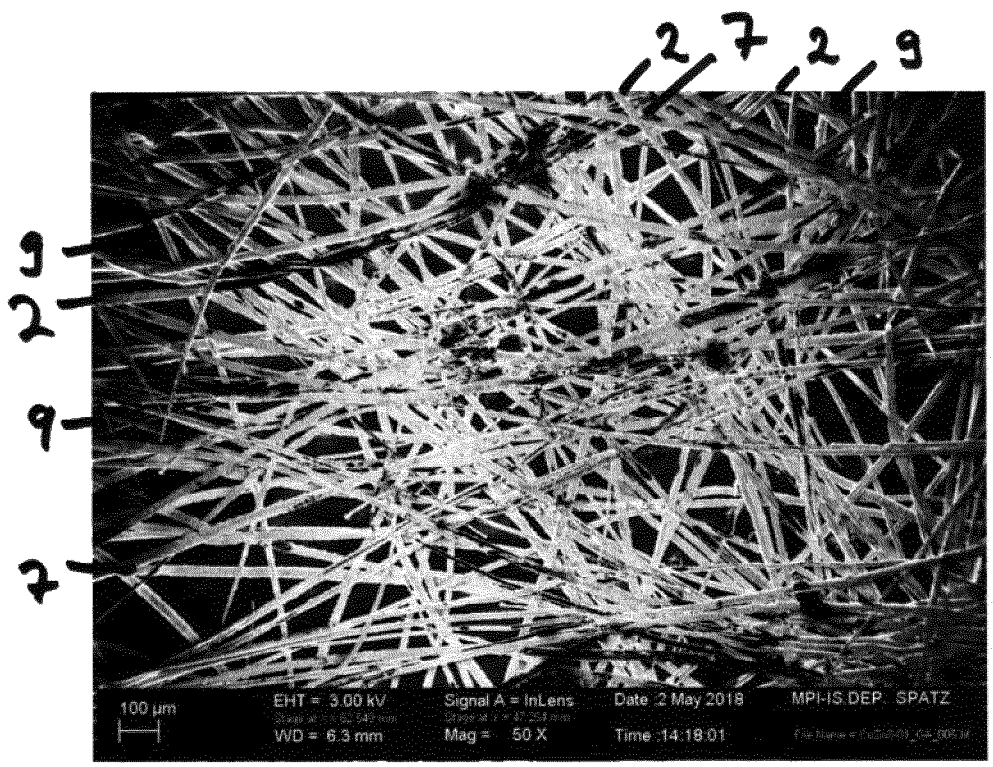

FIG. 14b) SEM image of the network of FIG. 14a).

Figure 14C:
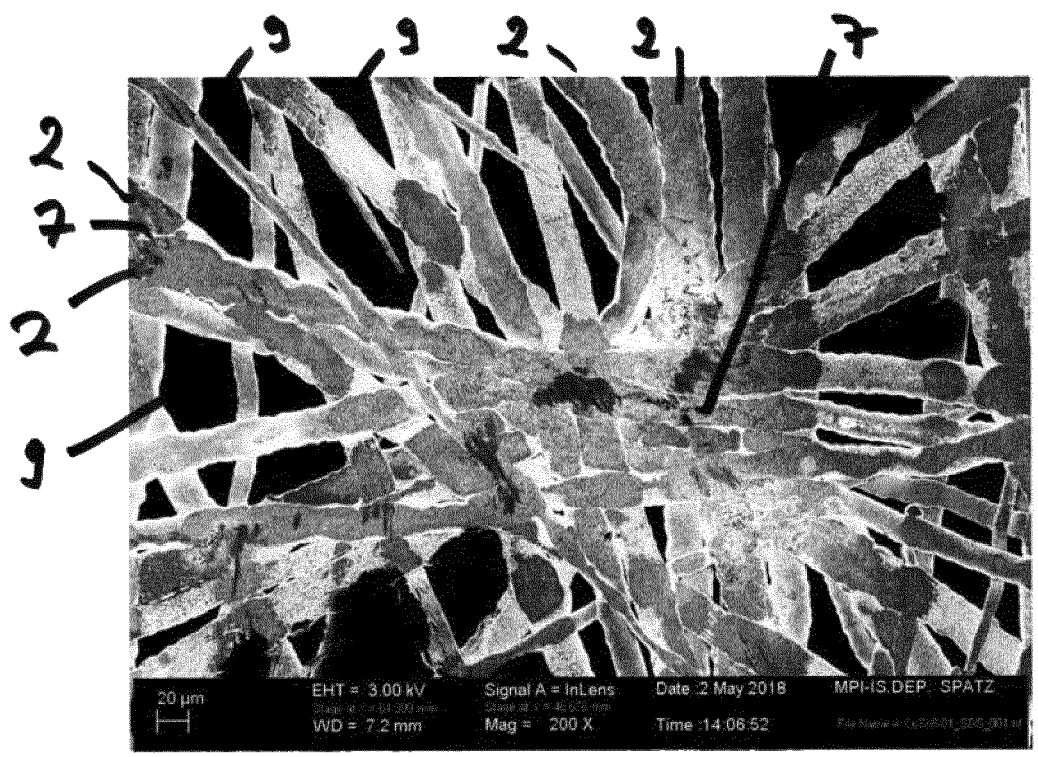

FIG. 14c) Enlarged SEM image of the network shown in FIG. 14b).

FIG. 15 Schematic illustration of a hot press.

FIG. 16a) Schematic drawing of a battery according to the invention.

FIG. 16b) Schematic drawing of a reference battery according to prior art.

Figure 17:
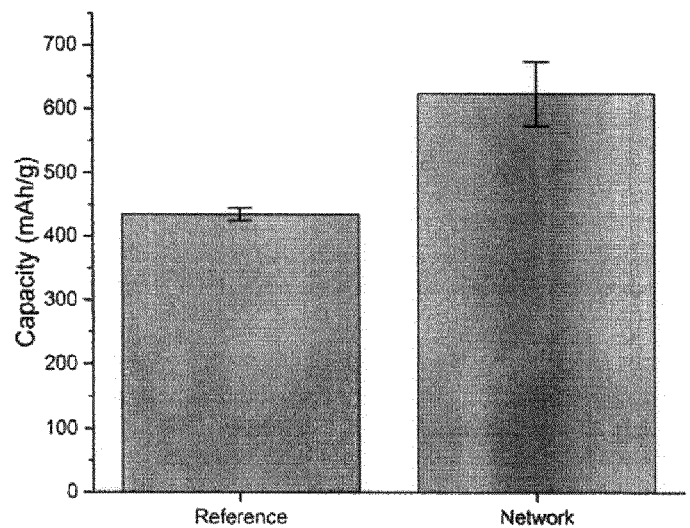

FIG. 17 Comparison of the capacity of a battery according to the invention with a reference battery according to prior art.

Figure 18:
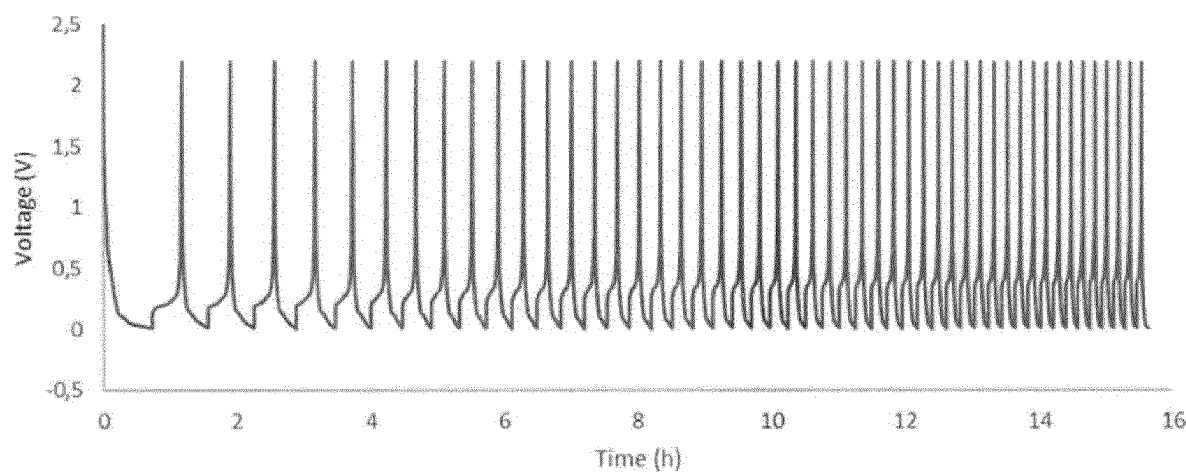

FIG. 18 Plot of charge discharge profile of a reference cell obtained by chronopotentiometry.

Figure 19:
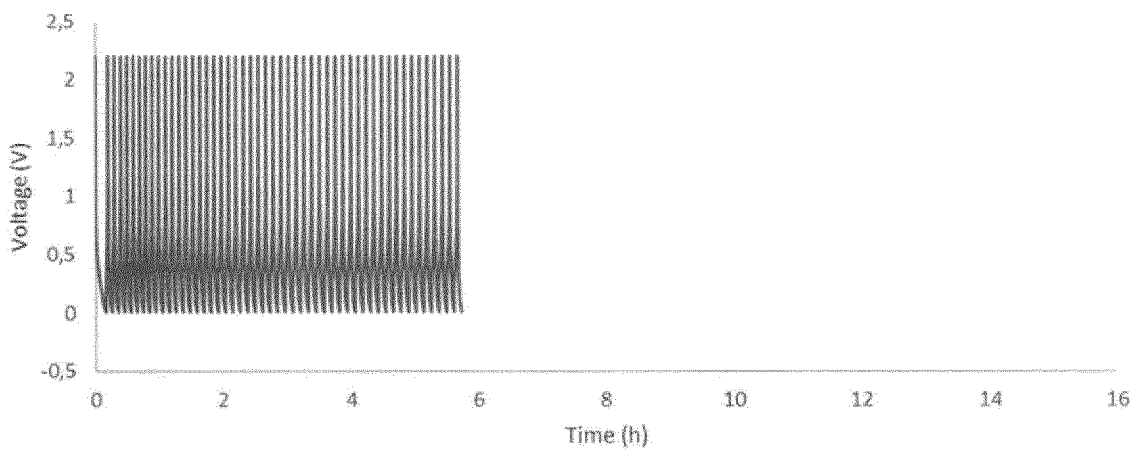

FIG. 19 Plot of charge discharge profile of an inventive network cell obtained by chronopotentiometry.

Figure 20A:
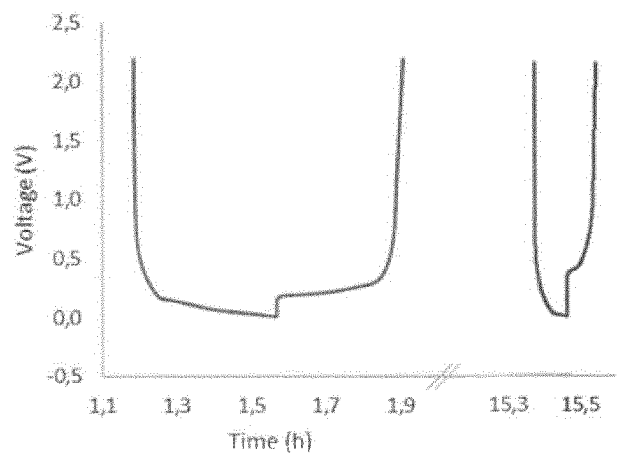

FIG. 20a) Plot of the second and last charge discharge profile of the reference cell obtained by chronopotentiometry as shown in FIG. 18.

Figure 20B:
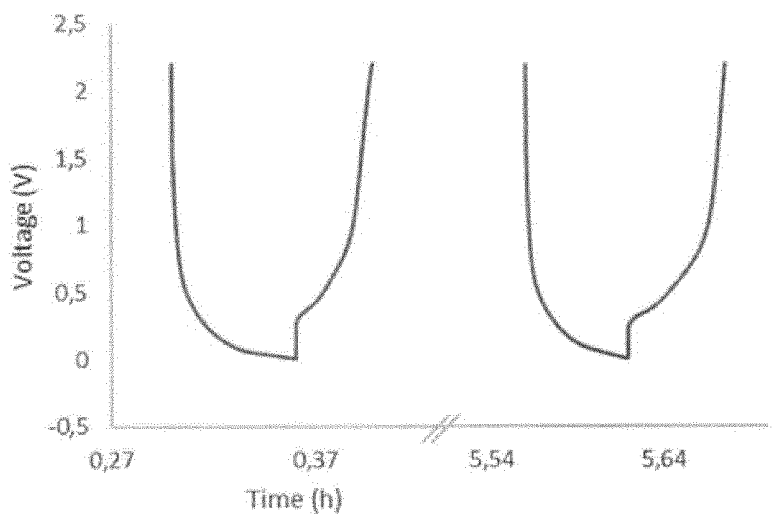

FIG. 20b) Plot of the second and last charge discharge profile of the of the inventive network cell obtained by chronopotentiometry as shown in FIG. 19.

Figure 21A:
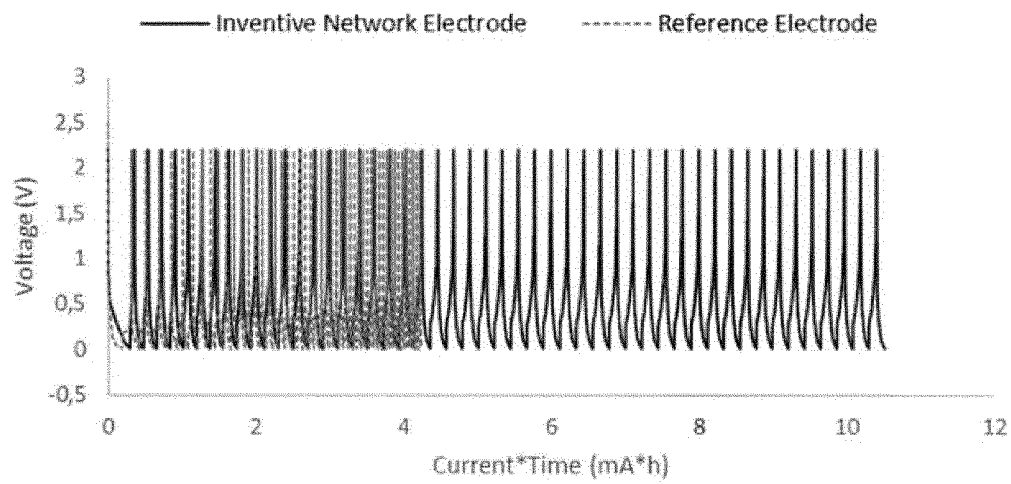

FIG. 21a) Plot of charge discharge profile of an inventive network cell and of a reference cell obtained by chronopotentiometry with current normalized time.

Figure 21B:
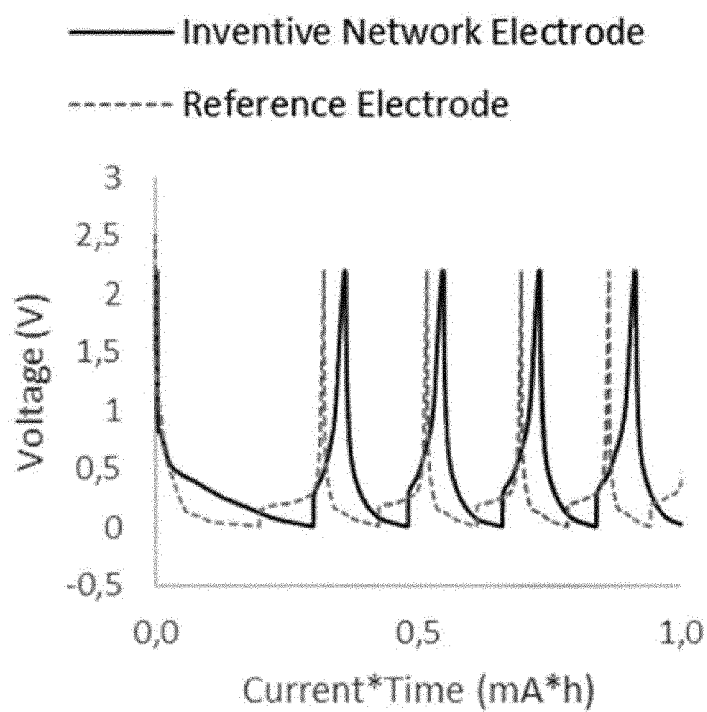

FIG. 21b) Enlarged view of the plot of FIG. 21a showing the first cycles.

Figure 21C:
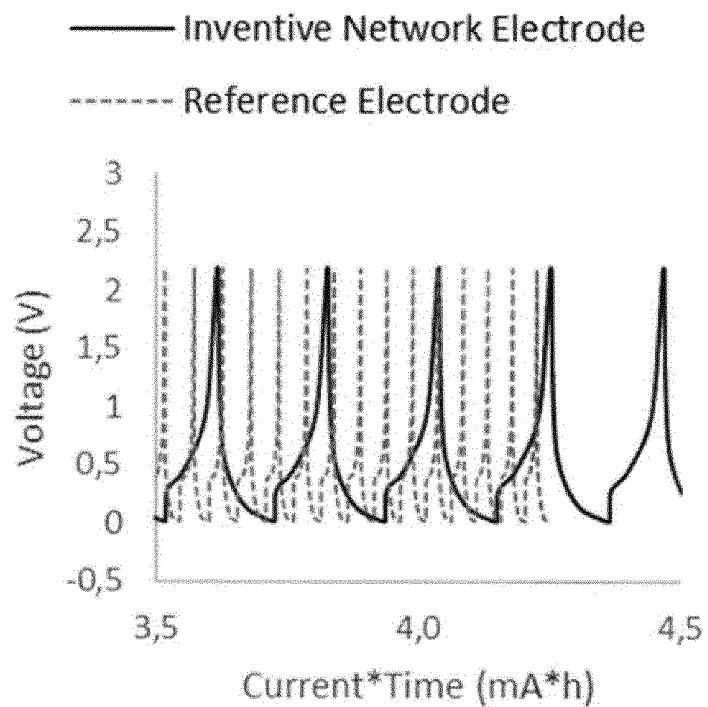

FIG. 21c) Enlarged view of the plot of FIG. 21a showing the area around the last cycles of the reference cell.

FIG. 22

Plot of the capacity over the number of cycles for an inventive network cell and a reference electrode.

Figure 23:

FIG. 23a) SEM image of an inventive electrode showing graphite flakes within the fiber network.

FIG. 23b) EDX mapping of copper for the inventive electrode shown in FIG. 23a).

FIG. 23c) EDX mapping of carbon for the inventive electrode shown in FIG. 23a).

Figure 24:
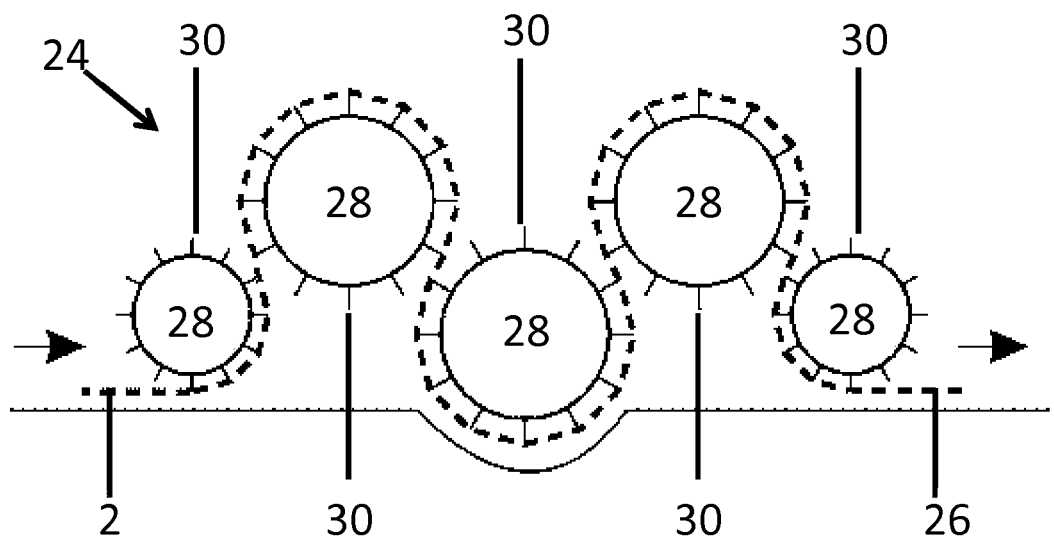

FIG. 24 Scheme of an exemplified carding machine for the formation of metallic fleece.

Figure 25:
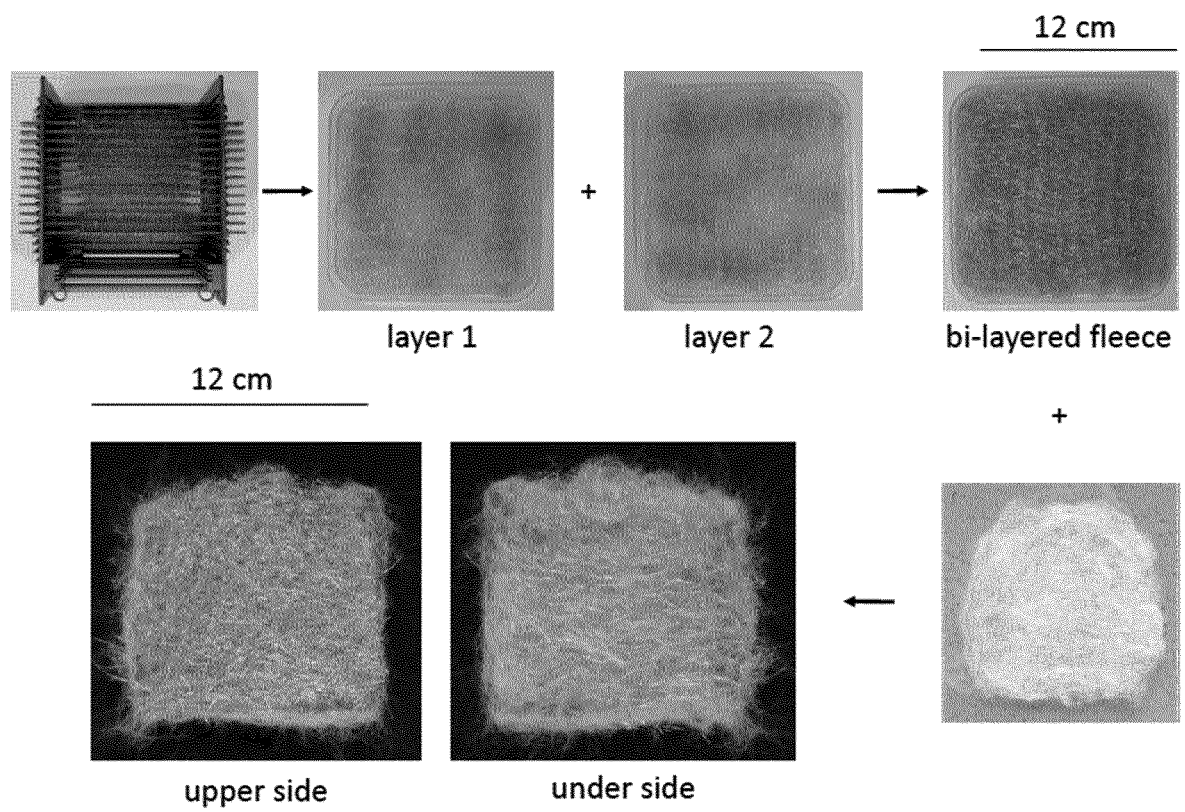

FIG. 25 Photographic images of a manufacturing process according to the present invention in which metallic fibers are formed to fleece and combined with cotton fleece.

Figure 26:
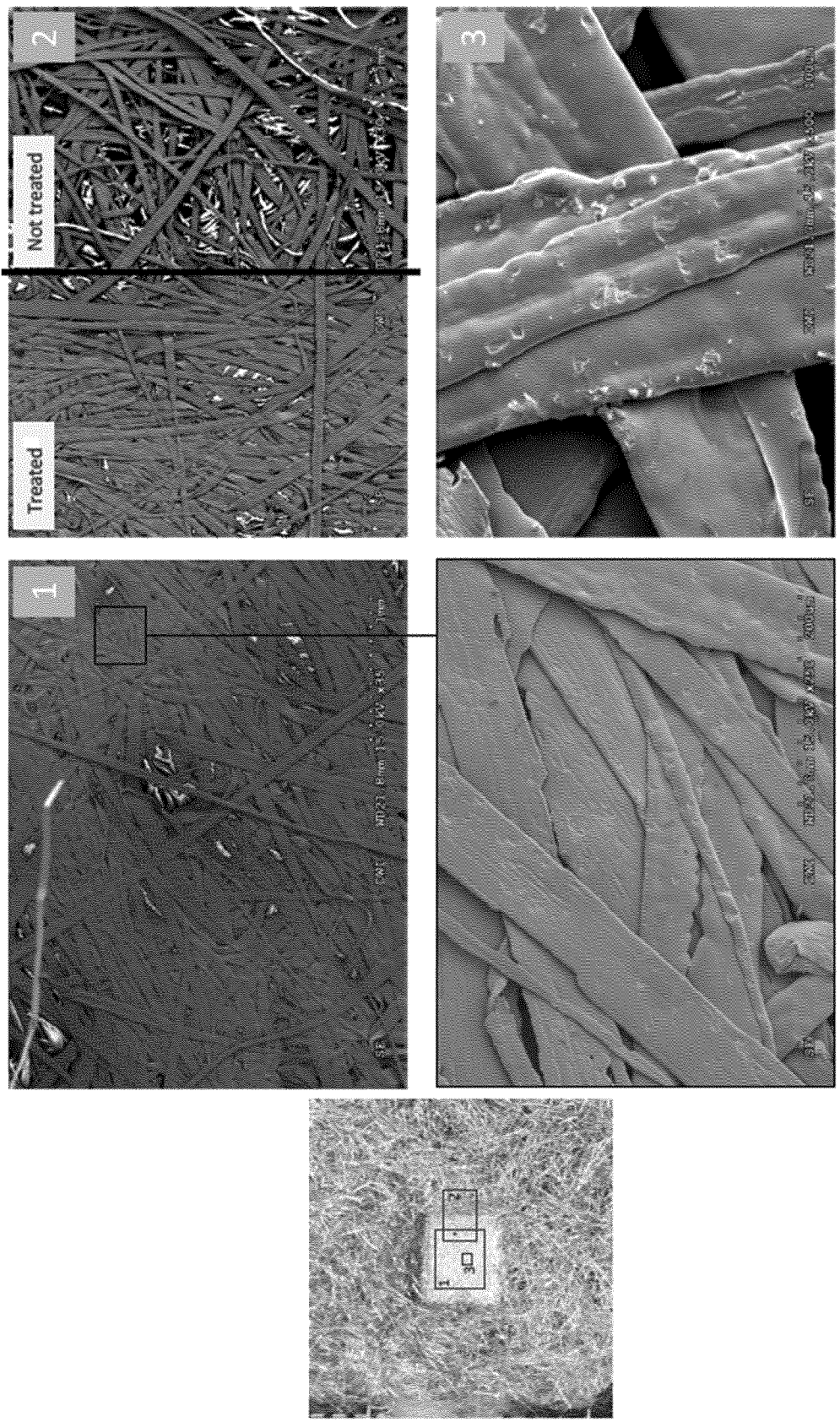

FIG. 26 Copper based fleece, mechanically stabilized by ultrasonic treatment.

FIG. 27 Schematic representation of a process according to the invention.

For reasons of clarity, in some figures not all or no reference signs are shown.

A schematic drawing of a melt spinning device 1 which can be used for producing metal fibers 2 suitable for forming a network according to the invention is shown in FIG. 1a). The melt spinning device 1 has a vertically rotating wheel 3 which can spin around an axis Z. Above the rotating wheel 3 a microstructured nozzle 4 is arranged through which drops 5 of a melt of the material from which the metal fibers 2 are produced can be deposited onto the rotating wheel 3. Alternatively, a horizontal melt spinner can be used (FIG. 1b; a horizontal melt spinner is disclosed in European patent application with application number EP19175749.1, the content of which is herewith incorporated by reference).

FIG. 1b) shows a schematic drawing of a horizontal melt spinning device 1 which can also be used for forming metal fibers 2. In contrast to the melt spinning device 1 shown in FIG. 1a), the melt spinning device 1 shown in FIG. 1b) has a horizontally rotating wheel 3. Similar as in the melt spinning device 1 shown in FIG. 1a), in the melt spinning of FIG. 1b) the wheel 3 can spin around an axis Z. Above the rotating wheel 3 a microstructured nozzle 4 is arranged through which drops 5 of a melt of the material from which the metal fibers 2 are produced can be deposited onto the rotating wheel 3.

FIG. 1c) shows a photographic image of the production of $Al_{99}Si_1$-alloy metal fibers. The photographic image shows the deposition of a melt of $Al_{99}Si_1$-alloy onto a rotating wheel 3 and are isolated from a movie taken at 40000 fps of depositing metal melts onto a rotating wheel 3 of a melt spinning device 1. The rotating wheel 3 is in the lower part and the microstructured nozzle 4 is in the upper part of the photographic image shown in FIG. 1c). The temperature of the melt was set in the range of 50 to 300° C. above the melting temperature (higher processing temperatures are possible). The melt forms a flow of metal which wets the rotating wheel 3 and is rapidly cooled to form metal fibers 2 from the metal flow 5.

In FIG. 2a) to d) photographic images of copper metal fibers (FIG. 2a)), of cobalt metal fibers (FIG. 2b)), of $Al_{99}Si_1$-alloy metal fibers (FIG. 2c)) and of $Co_{66}Fe_4Mo_2B_{12}Si_{16}$-alloy metal fibers (FIG. 2d)) are shown after the metal fibers 2 were produced using the melt spinning device 1 as shown in FIG. 1a) and b) and collected. The metal fibers 2 form an entangled network of metal fibers 2 in which the metal fibers 2 are not fixed to one another so that single metal fibers 2 can easily be separated from the entangled network of metal fibers 2.

Further photographic images for $Co_{66}Fe_4Mo_2B_{12}Si_{16}$-alloy metal fibers 2 are shown in FIG. 3a) and b). The photographic images were taken from $Co_{66}Fe_4Mo_2B_{12}Si_{16}$-alloy metal fibers 2 produced with a wheel speed of 50 m/s and 25 m/s, respectively. From the corresponding thickness and width distribution also shown in FIG. 3a) and b) it can be seen that the higher wheel speed of 50 m/s (see FIG. 3a)) results in metal fibers 2 having a reduced thickness and width compared to metal fibers 2 produced with a wheel speed of 25 m/s (see FIG. 3b)).

The x-ray diffraction spectra shown in FIG. 4a) to c) were recorded using a Bruker D8 advance XRD in Bragg-Bretano mode with a cobalt-source with 30 mA and 40 kV anode current and acceleration voltage. The data were collected with a Bruker VANTEC-1 detector and the measurements were done in air. The sharp peaks 20 observable for copper metal fibers 2 (see FIG. 4a)) and for $Al_{99}Si_1$-alloy metal fibers 2 (see FIG. 4b)) at specific angles indicate that these metal fibers 2 are polycrystalline, whereas the peak 22 extending over a comparatively large angle range, i.e. the absence of such sharp peaks 20, for the $Co_{66}Fe_4Mo_2B_{12}Si_{16}$-alloy metal fibers 2 (see FIG. 4c)) indicates that these metal fibers 2 are amorphous.

Scanning electron micrographs of copper metal fibers 2 are shown in FIG. 5a) and b). The micrographs were recorded on a Zeiss Ultra 55 with an acceleration voltage of 3 kV. The scale bar in the lower left corner of FIG. 5a) indicates a length of 100 µm and the scale bar in the lower left corner of FIG. 5b) indicates a length of 2 µm. As can be seen from the micrograph of FIG. 5a), the metal fibers 2 are not fixed to one another and form an entangled network, in which the metal fibers 2 can be moved relative to one another so that single metal fibers 2 can easily be separated from the entangled network. It can also be recognized from the micrograph of FIG. 5a) that the metal fibers 2 have a substantially constant width over a length of millimeters. In fact, although not visible from FIG. 5a) and b), the width and thickness of the copper metal fibers is substantially constant also over a length of several centimeters. Further scanning electron micrographs shown in FIG. 5c) and d) were recorded in a similar manner as the scanning electron micrographs shown in FIG. 5a) and b) on $Al_{99}Si_1$-alloy metal fibers 2. The scale bar in the lower left corner of FIG. 5c) indicates a length of 100 µm and the scale bar in the lower left corner of FIG. 5d) indicates a length of 10 µm. It can be recognized that the $Al_{99}Si_1$-alloy metal fibers 2 form an entangled network with the metal fibers 2 not being fixed to one another. The thickness and width of these metal fibers 2 is also substantially constant over a length of millimeters. In fact, although not visible from FIG. 5c) and d), the width and thickness of the $Al_{99}Si_1$-alloy metal fibers 2 is substantially constant also over a length of several centimeters. FIG. 5e) shows a further scanning electron micrograph of an $Al_{99}Si_1$-alloy metal fiber 2. The scale bar in the lower left corner of FIG. 5e) indicates a length of 3 µm. In the micrograph shown in FIG. 5e) nanocrystalline domains can be recognized as grain structure. A scanning electron micrograph of a gold metal fiber 2 is shown in FIG. 5f). The scale bar in the lower left corner of FIG. 5f) indicates a length of 10 µm. In the micrograph shown in FIG. 5f) nanocrystalline domains can be recognized as grain structure. In FIG. 5g) a scanning electron micrograph of an $Cu_{92}Sn_8$-alloy metal fiber 2 is shown. The scale bar in the lower left corner of FIG. 5g) indicates a length of 1 µm. Also in the micrograph shown in FIG. 5g) nanocrystalline domains can be recognized. Nanocrystalline domains can also be found in $Cu_{96}Si_4$-alloy metal fibers 2 produced by melt spinning, as can be recognized from the grain structure visible in the scanning electron micrograph of such a fiber 2 which is shown FIG. 5h). The scale bar in the lower left corner of FIG. 5h) indicates a length of 1 µm.

Thicknesses and widths for 527 $Al_{99}Si_1$-alloy metal fibers 2 fabricated with a wheel-speed of 25 m/s are shown in the graph of FIG. 6a). The corresponding thickness and width distributions are shown in the graphs of FIGS. 6b) and 6c), respectively. It can be recognized from FIG. 6a) and b) that the $Al_{99}Si_1$-alloy metal fibers have a thickness in the range between 3 and 17 µm with a mean thickness of 8.5 µm. The thickness distribution follows a narrow Gaussian function, such as indicated by the line in FIG. 6b). The width of the metal fibers is in a range of 5 to 80 µm, wherein the mean width is 39.5 µm and the median width is 35.0 µm. FIG. 6d shows two DSC measurements. Curve I in FIG. 6d) was obtained from $CuSn_8$ microfibers directly after melt spinning and curve II in FIG. 6d) after thermal equilibration of the same microfibers. This demonstrates the exothermal process in case of heating melt spinned fibers in comparison to the equilibrated metal fibers.

A scanning electron micrograph of a network 6 of metal fibers 2 according to the invention is shown in FIG. 7. The scale bar in the lower left corner of FIG. 7 indicates a length of 20 µm. The metal fibers 2 in the network 6 of FIG. 7 are amorphous metal fibers 2 of the $Co_{66}Fe_4Mo_2B_{12}Si_{16}$-alloy. In contrast to the entangled networks of metal fibers 2 shown for example in the scanning electron micrographs of FIG. 5a) or c), in the network 6 of metal fibers 2 as shown in FIG. 7 the metal fibers 2 are fixed to one another at points of contact 7, where the metal fibers 2 are sintered with one another. As a result of the metal fibers being sintered to one another, the metal fibers 2 are fixed to one another, so that it is not possible to move these metal fibers 2 relative to one another and to separate one of the metal fibers 2 out of the network 6 without breaking the points of contact 7.

It can be seen from FIGS. 7 to 9 that the networks 6 of metal fibers 2 according to the invention have voids 9 in the form of pores between the metal fibers 2. For a better overview, only some of the metal fibers 2, points of contact 7 and voids 9 are indicated by reference signs in FIG. 7. Reference signs for the voids 9 and also the points of contact 7 were omitted in FIGS. 8 and 9 and also only some of the metal fibers 2 are indicated by reference signs.

In FIGS. 8 and 9 photographic images of another network 6 of amorphous metal fibers 2 of the $Co_{66}Fe_4Mo_2B_{12}Si_{16}$-alloy are shown. It can be seen from these photographic images, that the network 6 can be held with tweezers 8 without separating metal fibers 2 from the network 6 of metal fibers 2 and that the network 6 is an unordered network 6, i.e. the metal fibers 2 do not have a preferred orientation but are oriented randomly.

FIGS. 8 and 9 show photographic images of the same network 6 of metal fibers 2. In FIG. 8 the network 6 as obtained after production is held with tweezers 8. It can be recognized from FIG. 9 that the network 6 can be bent and that the metal fibers 2 are still fixed to one another and are not separated from the network 6 of metal fibers 2.

Moreover, it can be seen from FIGS. 8 and 9 that the network 6 of metal fibers 2 has a porous structure, with interconnected pores extending throughout the network of metal fibers. The points of contact 7 between the metal fibers 2 are distributed randomly throughout the network 6 of metal fibers 2.

Photographic images of networks 6 of metal fibers 2 of copper are shown in FIGS. 10 and 11. The production of the network 6 shown in FIG. 10 is described in the following as Example 9 and the production of the network 6 shown in FIG. 11 is described in the following as Example 10. Accordingly, the network 6 shown in FIG. 10 has been produced at a higher temperature compared to the network 6 shown in FIG. 11. While both networks 6 show voids 9 in the form of pores distributed throughout the complete network 6, in the network 6 shown in FIG. 10, the density of the pores, i.e. number of pores per surface area, is lower at the center of the network 6 and increases towards the edges of the network 6. For a better overview, reference signs for the metal fibers 2, points of contact 7 and voids 9 were omitted in FIGS. 10 and 11.

In the network 6 shown in FIG. 11 the distribution of voids 9 in the form of pores is more evenly throughout the network 6 of metal fibers 2 compared to the distribution of the voids 9 in the network 6 shown in FIG. 10. Probably due to the higher processing temperatures used for producing the network 6 shown in FIG. 10, fractions of the metal fibers 6 were transformed into a metal foil. This was almost completely avoided by reducing the processing temperature, as found for the network 6 shown in FIG. 11.

Scanning electron micrographs of the network shown in FIG. 11 are shown in FIGS. 12 and 13. Recording of the scanning electron micrographs was conducted similarly to the recording described above for the other scanning electron micrographs. The scale bar in the lower left corner of FIG. 12 indicates a length of 200 μm and the scale bar in the lower left corner of FIG. 13 indicates a length of 100 μm. It can be recognized from these scanning electron micrographs, that the structure of the copper metal fibers 2 was conserved, while the metal fibers 2 were sintered together at points of contact 7, so that they no longer form only an entangled network but are fixed to one another, so that it is no longer easily possible to separate single metal fibers 2 from the network 6 of metal fibers 2. It can also be recognized that voids 9 in the form of pores extend through the network 6 of metal fibers 2 and that the points of contact 7 are randomly distributed throughout the network 6. The stripes visible in the scanning electron micrographs of FIGS. 12 and 13 result from discs of thermax alloy used for producing the network 6 of metal fibers 2, as described below for the Examples. These discs of the thermax alloy were cut and as a result have very fine grooves (not shown) on their surfaces which were imprinted onto the network of metal fibers during production using a hot press 10 as schematically shown in FIG. 15.

A further photographic image of a network 6 of metal fibers 2 according to the invention is shown in FIG. 14a). In this network 6 of metal fibers 2 the metal fibers are made of a $Cu_{92}Sn_8$-alloy. The production of the network 6 shown in FIG. 14a) is described in the following as Example 11. In the networks 6 shown in FIG. 14a) voids 9 in the form of pores are distributed throughout the complete network 6. The network 6 is an unordered network 6, i.e. the metal fibers 2 do not have a preferred orientation but are oriented randomly, with the metal fibers 2 being fixed to one another at points of contact 7, where the metal fibers 2 are sintered to one another. For a better overview, reference signs for points of contact 7 and voids 9 were omitted in FIG. 14a) and only some of the metal fibers 2 are indicated by reference signs in FIG. 14a). The metal fibers 2, points of contact 7 and voids 9 can be recognized from the SEM images of FIGS. 14b) and 14c) which were taken from the network 6 shown in FIG. 14a). The scale bar in the lower left corner of FIG. 14b) indicates a length of 100 μm and the scale bar in the lower left corner of FIG. 14c) indicates a length of 20 μm. The enlarged view provided in FIG. 14c) demonstrates that at a point of contact 7 more than two metal fibers 2 can be sintered together, so that at a single point of contact 7 a plurality of metal fibers 2 can be fixed to one another due to sintering. For a better overview, only some of the metal fibers 2, points of contact 7 and voids 9 are indicated by reference signs in FIGS. 14b) and 14c).

A schematic illustration of a hot press 10 is shown in FIG. 15 which can be used for producing the network 6 of metal fibers 2 according to the invention. The hot press 10 is provided with upper and lower parts 11 which can exert a force onto discs 12 between which metal fibers 2 are placed. In the hot press the temperature at the site where the metal fibers 2 are located can be controlled. It is also possible to omit the discs 12 and to place the metal fibers 2 directly between the upper and lower parts 11. For producing the network 6 of metal fibers 2 from which the scanning electron micrographs are shown in FIGS. 12 and 13, the discs 12 were made of a thermax alloy having fine grooves (not shown) on their surfaces. These fine grooves have a width in the range of 30 to 60 μm.

Schematic drawings of a half-battery 13a according to the invention and of a battery 13b according to the prior art are shown in FIGS. 16a) and 16b), respectively. In both half-batteries 13a, 13b, a current collector 14 is provided as a first electrode. The current collector 14 is coated with an active electrode material 15. Lithium 16 is provided as electrolyte. In the half-batteries 13a and 13b an electrolyte is provided which impregnates all components of the batteries 13a and 13b and transports lithium ions. In the half-battery 13a schematically shown in FIG. 16a) the current collector 14 is a network 6 of metal fibers 2 according to the invention, whereas in the battery 13b schematically shown in FIG. 16b) the current collector 14 is a copper foil. The structure and composition of the batteries 13a and 13b are described in more detail below in the context of describing the Examples.

The results of capacity measurement of the half-batteries 13a and 13b are shown in FIG. 17. The battery according to the invention comprising the network of metal fibers has a capacity which is increased by around 50% compared to a reference battery comprising a copper foil instead of a network of metal fibers while keeping the composition and amount of active material constant for both half-batteries 13a and 13b.

A further electrode was prepared using a network of metal fibers consisting of the copper alloy $Cu_{96}Si_4$. The network was infiltrated with a dispersion of 90% graphite and 10% binder, as further described below. As reference electrode, a copper foil was coated with a 50 μm layer of the same dispersion using a doctor blade. FIGS. 18 and 19 show plots of discharge profile obtained by chronopotentiometry for the inventive electrode having the network of metal fibers and of the reference cell.

Figure 22:
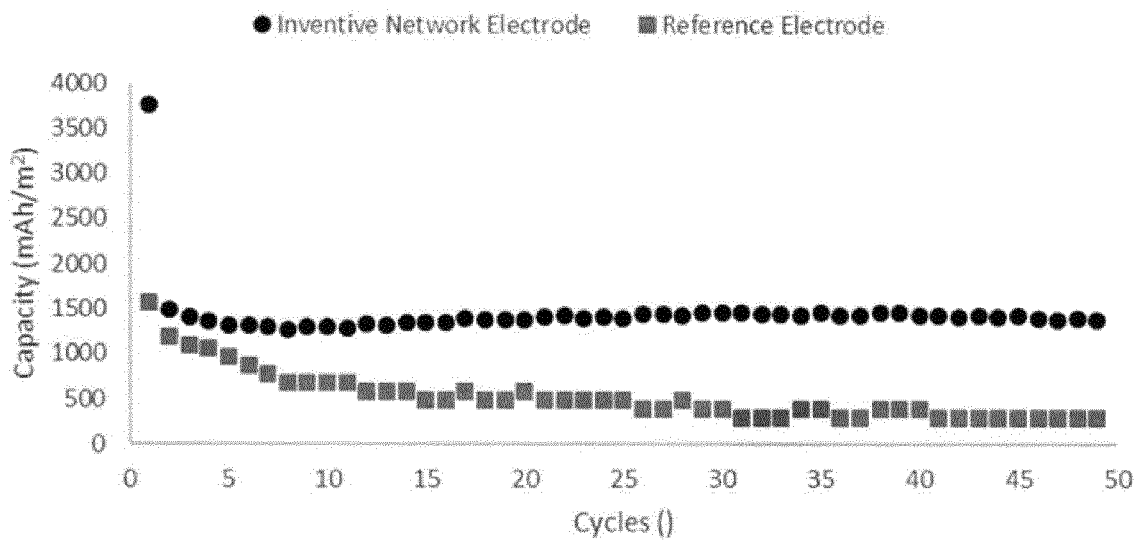

In FIG. 20a) the second and last charge discharge profile of the plot of FIG. 18 of the reference cell obtained by chronopotentiometry is shown and in FIG. 20b) the second and last charge discharge profile of the inventive network cell obtained by chronopotentiometry is shown. To better demonstrate the changes in the charge discharge profiled during cyclization FIG. 21a) shows a plot of charge discharge profile of an inventive network cell and of a reference cell obtained by chronopotentiometry with current normalized time. Enlarged views are provided in FIGS. 21b) and 21c). The development of the capacity over the number of cycles for the inventive electrode and for the reference electrode is shown in FIG. 22.

In FIG. 23a) a SEM image of the inventive electrode having a network of metal fibers consisting of the copper alloy $Cu_{96}Si_4$ is provided. It can be seen from the SEM image that graphite flakes are within the metal fiber network, i.e. between the metal fibers. FIG. 23b) shows an EDX mapping of copper for the inventive electrode shown in FIG. 23a) and FIG. 23c) shows an EDX mapping of carbon for the inventive electrode shown in FIG. 23a). The EDX mapping demonstrates that the graphite is between the metal fibers.

The following experiments were conducted:

Production of Metal Fibers:

A melt spinning device using a range of experimental parameters was used to form the metal fibers. On the one hand, the device was composed of a massive wheel 3 (copper-alloy) of diameter 200 mm placed in a chamber with Argon atmosphere at a pressure of 300 mbar (all typical experimental settings). On the other hand the wheel rotation-speed was increased up to 60 m/s. A pressure difference of up to 2000 mbar (or lower) between the crucible with nozzle and the surrounding chamber atmosphere triggered the ejection of the molten metal or metal alloy onto the rotating wheel-surface. As a result microdroplets of melt were formed and were shaped as metal fibers in the shape of microribbons by rapid quenching (see FIG. 1a) and b)) for micro droplets of different metal deposited on a spinning wheel). Details for the melt spinning device used are disclosed in EP19175749.1, WO2016/020493 A1 and in WO2017/042155 A1.

Each single microdroplet 5 was transformed into a single metal fiber 2 or multiple metal fibers 2. The deposition rate of the molten alloy onto the rotating wheel 3 was reduced to be in the range of 1.0 to 10.0 mg·s$^{-1}$ or even lower. With such deposition rate, metal fibers 2 in the form of microribbons were formed in large quantities of up to 90-95% of the initial mass of molten alloy in the crucible. Optical images of the produced metal fibers 2 are shown in FIG. 2a) to d) after rapid quenching and collection, the metal fibers 2 form an entangled network, wherein the metal fibers slide easily against each other so that it is easy to isolate one single metal fiber from this network.

A typical initial mass of melt was in the range of 5 to 12 g (but can be increase to 100 g). The distance between the nozzle 5 and the wheel surface was set in the range of 50 to 3000 μm, see FIG. 1b) which shows a photographic image isolated from a movie taken at 40000 fps of depositing a $Al_{99}Si_1$-alloy melt onto the rotating wheel. The temperature of the melt was set in the range of 50 to 300° C. above the melting temperature (higher processing temperatures are possible). The photographic images shown in FIG. 2a) to d) and in FIG. 3a) and b) were taken from correspondingly produced metal fibers.

Structure of the Metal Fibers:

Metal fibers 2 in the form of microribbons were produced of Co, Cu, Al as well as alloys of these elements with other elements such as $Co_{66}Fe_4Mo_2B_{12}Si_{16}$, $Al_{99}Si_1$ (none comprehensive list). The metal fibers 2 made with pure Cu or the alloy $Al_{99}Si_1$ had a polycrystalline structure of crystals with a maximum size up to 8 μm, as demonstrated by the X-ray diffraction spectra for the copper metal fibers 2 (FIG. 4a)) and for the $Al_{99}Si_1$-alloy metal fibers 2 (FIG. 4b)). The metal fibers 2 made with the $Co_{66}Fe_4Mo_2B_{12}Si_{16}$-alloy had the typical structure of glassy metal, i.e. these metal fibers 2 were amorphous metal fibers 2, as can be seen from the X-ray diffraction spectrum of the $Co_{66}Fe_4Mo_2B_{12}Si_{16}$-alloy metal fibers 2 depicted in FIG. 4c).

When using more complex Cu-alloys and Al-alloys, as well as adjusting the experimental parameters such as wheel speed and melt temperature, it is likely that metal fibers 2 mainly composed of Al or Cu can be fabricated with a nanocrystalline or glassy metal structure (as observed for the Co-alloy $Co_{66}Fe_4Mo_2B_{12}Si_{16}$).

Dimensions of Metal Fibers:

For the Co-alloy $Co_{66}Fe_4Mo_2B_{12}Si_{16}$, the metal fibers 2 had the following typical dimensions: a width of 2.0 to 25.0 μm, a thickness of 1.0 to 7.0 μm and a length of 2.0 to 100.0 mm (see FIGS. 3a) and 3b)). The ribbon-thickness distributions were narrow Gaussian distributions with a standard deviation as small as 0.4 μm, i.e. 68% (resp. 95%) of the metal fibers 2 had a thickness within an interval (centered on the mean thickness) as narrow as 0.8 μm (resp. 1.6 μm). With a wheel-speed of 25 m/s, the ribbon mean thickness is 5.80 μm (see FIG. 3b)). When the wheel speed is doubled, it decreases to 3.22 μm (see FIG. 3a)). The fiber-width distributions were either Gaussian or log-normal distributions. With a wheel-speed of 25 m/s, the fiber mean width is 14.2 μm and the median width is 13.2 μm, i.e. 50% of the fiber have a width below 13.2 μm. When the wheel speed is doubled, the mean and median widths decrease to 9.4 μm, i.e. 50% of the fibers have a width below 9.4 μm.

For the Al-alloy $Al_{99}Si_1$, the mean and median thicknesses are 8.5±0.1 μm, i.e. 68% (resp. 95%) for the fibers and the fibers 2 had a thickness between 6.6 and 10.4 (resp.

4.8 and 12.2) μm. The mean width was 39.5±1.0 μm and the median width was 35.0±1.0 μm, i.e. 50% of the fibers had a width below 35.0 μm (FIG. 6a) to c)). SEM images for the $Al_{99}Si_1$-alloy metal fibers 2 are shown in FIGS. 5c) and 5d), respectively.

The dimensions of the copper metal fibers 2 were similar to the ones of the Al-alloy metal fibers (or smaller). SEM images for the copper metal fibers 2 are shown in FIGS. 5a) and 5b). These SEM images demonstrate that the width of the metal fibers 2 remains constant over a length of at least 1 mm (this is even true for length over 1 cm). These ribbons have a crystalline structure: the observation of the top side, which was a liquid-gas interface before solidification upon rapid quenching, allows a direct visualization of the grains. The maximum size of the crystals is estimated to be in the range of 5-8 μm.

The metal fibers 2 were used to produce networks 6 of metal fibers 2.

Production of Networks of Metal Fibers:

Before producing networks 6 of metal fibers 2, it was determined by using differential scanning calorimetry (DSC) that the Co-alloy $Co_{66}Fe_4Mo_2B_{12}Si_{16}$ has a crystallization temperature of 560° C. and a melting temperature of 1021° C.

Example 1

Amorphous metal fibers 2 of $Co_{66}Fe_4Mo_2B_{12}Si_{16}$ produced by the melt spinning process described above were placed between two discs 12 of aluminum oxide with diameters of 45 mm. The staple of the discs 12 of aluminum oxide having a diameter of 45 mm and the metal fibers 2 was then placed into the 400° C. preheated hot press 10 and the fibers 2 were pressed at a predetermined pressure of 377 MPa for a predetermined time of 30 minutes, to avoid thermal expansion effects due to heating.

Example 2

The network 6 of Example 2 was prepared identical to the network 6 of Example 1, except that the pressure was reduced to 277 MPa. A SEM image of the network 6 of Example 2 is provided in FIG. 7, as can be seen, the metal fibers 2 are sintered together and form a stable network 6. The SEM image shows that apart from the contact faces with the aluminum oxide disc 12, the texture and appearance of the metal fibers 2 was conserved.

Example 3

The network 6 of Example 3 was prepared identical to the network 6 of Example 1, except that instead of discs 12 of aluminum oxide discs 12 of a Thermax high-temperature alloy having diameters of 60 mm were used. The pressure applied was 283 MPa.

Example 4

The network 6 of Example 4 was prepared identical to the network 6 of Example 3, except that the time was reduced to 20 minutes.

Example 5

The network 6 of Example 5 was prepared identical to the network 6 of Example 3, except that the time was reduced to 10 minutes.

Example 6

The network 6 of Example 6 was prepared identical to the network 6 of Example 3, except that the time was reduced to 5 minutes.

Example 7

The network 6 of Example 7 was prepared identical to the network 6 of Example 3, except that the temperature was reduced 300° C.

Comparative Example 1

For Comparative Example 1 amorphous metal fibers 2 of $Co_{66}Fe_4Mo_2B_{12}Si_{16}$ were placed in an oven and heated for 30 minutes to 600° C. without applying external pressure. The fibers crystallized but did not sinter together.

Comparative Example 2

The network of Comparative Example 2 was prepared identical to the network 6 of Example 1, except that the pressure was reduced to 157 MPa.

The network disintegrated when being removed from the hot press 10 which indicated that the metal fibers 2 were not sufficiently sintered together.

Comparative Example 3

The network of Comparative Example 3 was prepared identical to the network 6 of Example 3, except that the pressure was reduced to 177 MPa.

Comparative Example 4

The network of Comparative Example 4 was prepared identical to the network 6 of Example 4, except that the temperature was reduced to 100° C.

Comparative Example 5

The network of Comparative Example 5 was prepared identical to the network 6 of Example 4, except that the temperature was reduced to 200° C.

Table 1 summarizes the time, pressure and temperature used for the preparation of the networks of Examples 1 to 7 and Comparative Examples 1 to 5.

TABLE 1

| Parameter | Example 1 | Example 2 | Example 3 | Example 4 | Example 5 | Example 6 | Example 7 | Comp. Example 1 | Comp. Example 2 | Comp. Example 3 | Comp. Example 4 | Comp. Example 5 |
|---|---|---|---|---|---|---|---|---|---|---|---|---|
| time (min) | 30 | 30 | 30 | 20 | 10 | 5 | 20 | 30 | 30 | 30 | 20 | 20 |
| pressure (MPa) | 377 | 220 | 283 | 283 | 283 | 283 | 283 | ambient | 157 | 177 | 283 | 283 |
| temperature (° C.) | 400 | 400 | 400 | 400 | 400 | 400 | 300 | 600 | 400 | 400 | 100 | 200 |

TABLE 1-continued

| Parameter | Example 1 | Example 2 | Example 3 | Example 4 | Example 5 | Example 6 | Example 7 | Comp. Example 1 | Comp. Example 2 | Comp. Example 3 | Comp. Example 4 | Comp. Example 5 |
|---|---|---|---|---|---|---|---|---|---|---|---|---|
| network properties: | | | | | | | | | | | | |
| network stability | ++ | ++ | ++ | ++ | ++ | + | ++ | -- | -- | -- | -- | - |
| amorphous fibers | ++ | ++ | ++ | ++ | ++ | ++ | ++ | -- | ++ | ++ | ++ | ++ |

In Comparative Example 2 time and temperature were identical to Examples 1 and 2. However, the network of Comparative Example 2 disintegrated when being removed from the press 10. This indicates that the pressure was not sufficient for sintering the amorphous $Co_{66}Fe_4Mo_2B_{12}Si_{16}$-alloy metal fibers 2 to provide a fixation of the metal fibers 2 to one another. It can be concluded that the pressure is the driving force for the sintering of the metal fibers 2. Since amorphous materials have a lower density than crystalline materials, the atoms at the interphase are set into motion when pressure is applied. This causes these atoms to make a transition to an energetically preferred state in view of the pressure applied. As a result of the movement of the atoms, the metal fibers 2 are sintered together permanently.

The networks 6 of metal fibers of Examples 3 to 5 did not show substantial differences. When shortening the time to only 5 minutes in Example 6, the fibers 2 were not fixed to each other as strong as in Examples 3 to 5. This demonstrates that the process of fixing the metal fibers 2 of the $Co_{66}Fe_4Mo_2B_{12}Si_{16}$-alloy to one another has a certain time dependency but is finished within several minutes.

It can be seen that the process of sintering the metal fibers 2 together takes place although the temperature the metal fibers 2 are subjected to is only around 40% or 30%, respectively, of the melting temperature of the $Co_{66}Fe_4Mo_2B_{12}Si_{16}$-alloy, such as demonstrated by Examples 4 and 7 in which the temperature was 400° C. and 300° C., respectively. Comparative Examples 4 and 5 show that if the temperature is reduced to 100° C. or 200° C., respectively, the movement of the atoms is too low to provide for a fixation of the metal fibers 2 to one another by sintering.

Example 8

The network 6 of Example 8 was prepared identical to the network 6 of Example 3, however, the temperature was set to 500° C. and the time was set to 20 minutes. In addition, in the network 6 of Example 8 more fibers 2 were used to obtain a network 6 having a thickness of 0.7 mm. After 20 minutes at a temperature of 500° C. under a pressure of 283 MPa, the network 6 of Example 8 was completely sintered, i.e. the stability of network 6 was comparable to that of Example 3.

In FIG. 8 an image of the network 6 of Example 8 is shown before deformation and in FIG. 9 an image of the network 6 of Example 8 in a deformed state is shown. Accordingly, it can be recognized from FIG. 9 that even when the network 6 is highly deformed, no metal fibers 2 are separated from the network 6. This indicates the formation of a highly stable network 6 that is not easily damaged by deformation.

Example 9

The network 6 of Example 9 was prepared identical to the network 6 of Example 3, however, instead of amorphous metal fibers 2 of $Co_{66}Fe_4Mo_2B_{12}Si_{16}$, polycrystalline fibers 2 of copper (Cu) as described above were used, the time was set to 5 minutes, the pressure was set to 177 MPa and the temperature was set to 300° C.

Example 10

The network 6 of Example 10 was prepared identical to the network 6 of Example 9, however, the time was set to 5 minutes.

Comparative Example 6

The network 6 of Comparative Example 6 was prepared identical to the network of Example 9, however, the time was set to 30 minutes and the temperature was set to 500° C.

Table 2 summarizes the time, pressure and temperature used for the preparation of the networks of Examples 9 and 10 and for Comparative Example 6.

TABLE 2

| Parameter | Example 9 | Example 10 | Comp. Example 6 |
|---|---|---|---|
| time (min) | 5 | 3 | 30 |
| pressure (MPa) | 177 | 177 | 177 |
| temperature (° C.) | 300 | 300 | 500 |
| network properties: | | | |
| network stability | ++ | ++ | ++ |
| porosity | + | ++ | -- |

In Comparative Example 6 the metal fibers could not be recognized in the sintered product and the obtained product was a copper foil. If a light source is placed behind the copper foil, a certain inhomogeneity could be recognized. The networks 6 of Examples 9 and 10 have a thickness from 0.15 mm up to 0.25 mm.

For producing the network 6 of Example 9, time and temperature were reduced to 5 minutes and 300° C. while the pressure was identical to the one applied in Comparative Example 6. It was possible to recognize in the resulting product the metal fibers 2 and a porous structure, i.e. voids 9, could be observed at least in some areas. Consequently, for producing the network 6 of Example 10 the time was further reduced to 3 minutes, while time and pressure were kept at the same values as for Example 9. It was found that the porous structure, i.e. the voids 9, was present substantially homogeneously throughout the whole sample.

Images of the networks 6 of Examples 9 and 10 are shown in FIGS. 10 and 11, respectively. It can be seen from FIG. 10 that the network 6 of Example 9 has some areas in which the porosity is reduced. Particularly close to the edges of the network 6 of Example 9 many pores can be observed. By reducing the time from 5 to 3 minutes, the porosity was increased, as can be seen by the image of the network 6 of Example 10 provided in FIG. 11.

SEM images of the network 6 of Example 10 are shown in FIGS. 12 and 13. The SEM images show the porous structure of the network 6 and that the metal fibers 2 are sintered together. The stripes which can be seen in FIGS. 12 and 13 are produced by the surface of the discs 12 of Thermax high-temperature alloy used for pressing the metal fibers 2. The stripes in the discs of the Thermax high-temperature alloy are the result of cutting the Thermax high-temperature alloy.

Without being bound to a theory, it is assumed that the copper metal fibers 2 show an improved capability to be sintered as a result of the high energy which is stored as a result of the fast cooling rates resulting from the melt-spinning process used for preparing the fibers. The melt spinning process provides cooling rates of up to $10^6$ K·min$^{-1}$ which freezes the movement of atoms of a system before they can arrange into energetically favored states. Of course, also copper specific effects concerning atomic diffusion could play a role.

It is possible to bend the networks 6 of the Examples described above without permanently deforming them. If these networks 6 are folded, it is possible to provide them with a stable new shape.

Further experiments were conducted using metal fibers of the Cu-alloy $Cu_{92}Sn_8$. The metal fibers of the Cu-alloy $Cu_{92}Sn_8$ were prepared analogously to the other metal fibers described above. The metal fibers of Cu-alloy $Cu_{92}Sn_8$ were dispersed in 200 mL of demineralized water containing 50 mg of SDS (sodium dodecyl sulfate) and dried after vacuum filtration. In the entangled networks of metal fibers obtained this way, the metal fibers are distributed homogenously but are non-oriented.

Example 11

Polycrystalline metal fibers 2 of $Cu_{92}Sn_8$ produced by the melt spinning process described above and treated with an aqueous solution of SDS, as also described above, were placed between two discs 12 of thermax alloy with diameters of 60 mm. The staple of the discs 12 of thermax alloy having a diameter of 60 mm and the metal fibers 2 was then placed into the 300° C. preheated hot press 10 and the fibers 2 were pressed at a predetermined pressure of 78 MPa for a predetermined time of 3 minutes, to avoid thermal expansion effects due to heating. This way a stable network 6 of $Cu_{92}Sn_8$ metal fibers was obtained with similar stability to deformation as the networks 6 of Examples 1 to 10 described above. The network 6 of Example 11 has a thickness in the range from 0.15 mm up to 0.25 mm. A photographic image of the network 6 of $Cu_{92}Sn_8$ metal fibers is shown in FIG. 14*a*). SEM images of the network of $Cu_{92}Sn_8$ metal fibers are shown in FIG. 14*b*) and FIG. 14*c*).

Comparative Example 7

The network 6 of Comparative Example 7 was prepared identical to the network 6 of Example 11, however, the temperature was kept at room temperature, i.e. around 20° C. The metal fibers were not sintered together and only a weak mechanical stability was observed. The mechanical stability is a result of the metal fibers being deformed due to the applied pressure but not as a result of a sintering of the metal fibers.

Comparative Example 8

The network 6 of Comparative Example 8 was prepared identical to the network 6 of Example 11, however, only a weak pressure of around 2 kPa was applied. There was no fixation between the metal fibers to one another obtained.

It is demonstrated by Example 11 and Comparative Examples 7 and 8 that the combination of pressure and temperature is required to sinter the metal fibers to one another so that the metal fibers 2 are fixed to one another. Without being bound by a theory, it is likely that due to the pressure the metal fibers 2 are brought into close contact with each other and matching contact faces are formed between the metal fibers 2 due to mechanical deformation. The increased temperature promotes the atom movement in the direction of the pressure and therefore results in a sintering of the metal fibers 2 so that the metal fibers 2 are fixed to one another.

Example 12

Preparation of a Fleece by Carding

Carding is a mechanical process that disentangles, cleans and intermixes fibers 2 to produce a continuous fleece 26. A scheme of a carding machine 24 is shown in FIG. 24. The continuous fleece 26 is obtained by passing the fibers 3 between differentially moving surfaces, e.g. rotating drums 28, covered with card clothing 30. The carding cloth 30 breaks up locks and unorganized clumps of fiber 2 and then aligns the individual fibers 2 to be parallel with each other. While carding is well known for wool it has not been used for organizing metallic fibers 2 to form a fleece 26.

FIG. 25 shows examples of fleece after carding. Here, ca. 10 cm long, 30 µm wide and 2 µm thick fibers of brass as prepared by melt spinning are disentangled by a carding device. Two layers are formed which are stacked on top of each other. It may also stacked in between layers of cotton in order to form cotton/metallic hybrid fleece or tissue. Also combinations of cotton and metallic fiber nets can be disentangled by one carding step and form a cotton/metallic fiber hybrid fleece.

FIG. 25 shows photographic images of a manufacturing process according to the present invention. At first metallic fibers were disentangled by a carding device, as shown in the upper left image of FIG. 25. Reference signs are not shown in FIG. 25 for a better overview. Next layer 1 and layer 2 of differently oriented fibers, as shown by the two middle photographs in the upper line of FIG. 25 were stacked on top of each other to provide a bilayered fleece, as sown in the upper right image of FIG. 25. As a mediating material a cotton fleece such as the one shown in the lower right image of FIG. 25 can be integrated in metal fibers to provide a layered fleece, the upper side and underside of which are shown in the lower left and lower middle image in FIG. 25.

Example 13

Ultrasound welding was applied to mechanical fix all fibers 2 in a metal network 6 or just fibers 2 at different sites. In principle, longitudinal and vertical ultrasound welding is possible. Respective machines are commercially available. Vertical ultrasound is the preferred technique. Here, a hammer is moving up and down at high frequencies. In principle, this is also possible by hammering a suitable object onto the fleece made of metal fibers 2. An example of a copper based fleece is shown in FIG. 26. In FIG. 26 no reference signs are shown for a better overview. The left portion of FIG. 26 shows a photographic image of a network 6 of metal fibers 2 according to the present invention. The clearly visible square shaped portion in the middle of the photographic image on the left side is an area in which the metal fibers 2 are fixed to one another via ultrasound welding, as described above. Images numbered with 1 to 3 in FIG. 26 are enlarged views of the sections indicated in the photographic image on the left side of FIG. 26 by corresponding boxes and numbers. The image beneath enlarged view number 1 is a further enlarged view corresponding to the box indicated in enlarged view number 1 and shows fixation of the metal fibers 2 to one another due to the applied ultrasound welding.

Preparing Electrodes and Lithium Ion Batteries:

Inventive Electrode:

Circular discs having diameters of 6 mm were cut from the network 6 of Example 10 and infiltrated with a dispersion of 80% SnO, 10% carbon black and 10% binder. In this inventive electrode, the network 6 of sintered metal fibers 2 of copper acts as current collector 14.

Non-Inventive Electrode:

A copper foil was coated with a dispersion of 80% SnO, 10% carbon black and 10% binder to obtain a copper foil having a coated layer of active material on its surface. The thickness of the coating layer was adjusted to 50 μm by using tape casting. The copper foil acts as current collector 14.

The following materials were used to prepare the dispersion:

SnO: Tin (II) oxide, 99.9 wt %, trace metal basis (AlfaAesar (Art. Nr. 11569))

Carbon black: (Carbon Nanopowder <100 nm, Sigma Aldrich, P-Code: 633100-25)

Binder: Polyvinylidenfluorid (PVDF) (AlfaAesar (Art. Nr. 44080))

Batteries:

A half-cell 13*a* was assembled, as schematically shown in FIG. 16*a*) including electrodes 14 and 15, separator 17 and Li-foil 16. In this half-cell 13*a* the electrode described above as inventive electrode was used, i.e. the network 6 of Example 10 which is coated with an active electrode material 15.

As a reference, a further half-cell 13*b* was assembled, as schematically shown in FIG. 16*b*). In this half-cell 13*b*, the electrode described above as non-inventive electrode was used, i.e. a copper foil coated with 50 μm active electrode material as described above.

If the amount of active electrode material 15 is increased in the reference half-cell 13*b*, i.e. a layer thicker than 50 μm is tape casted, the capacity drops, since the electrons have to pass through a thicker layer of active electrode material. It was found that by using the assembly shown in 13*a*, the amount of active electrode material could be increased by incorporating it into a conductive network by a factor of 60 compared to the standard assembly shown in 13*b*. Furthermore, it was possible to obtain a homogenous charge distribution throughout the electrode by using a metal fiber network and it was further possible to significantly increase the capacity per mass unit.

A comparison of the capacity of these two half-cells 13*a*, 13*b* is provided in FIG. 17. As can be seen, the capacity for the half-cell 13*a* (according to the invention) is increased by almost 50% compared to the reference half-cell 13*b*.

The capacity measurements were conducted using a Metrohm M204 electrochemical measurement system run with the software NOVA Battery 1.0. The cell was assembled in a Swagelok™ type cell, using lithium foil (Sigma Aldrich (99.8 wt %) as counter electrode, separion polymer vließ (Sigma Aldrich, Whatman® glass microfiber filters, Grade 934-AH®) as separator and 1 M $LiClO_4$ (Sigma Aldrich) dissolved in 1:1 EC/DMC (Ethylcarbonate/Dimethylcarbonate (ALFA AESAR)) as electrolyte.

In order to measure the capacity of the half-cell, a constant current of 100 mAh/g was applied, normalized to the amount of active material used for the respective electrode. The potential was simultaneously measured and as vortex points for the potential 0.0125 V (lower vortex point) and 2.2 V (higher vortex point) were measured. The resulting set of data points includes values for the potential at any given point of time. Since a constant current is supplied, the capacity can then be calculated by multiplying the time between lower (completely discharged) and higher vortex point (completely charged) with the applied current.

In addition to the above mentioned half-cells 13*a* further electrodes were prepared and assembled together with a counter electrode, a separator and an electrolyte and analyzed. The details are the following:

Fibers from the copper alloy $Cu_{96}Si_4$ were dispersed, vacuum filtrated and afterwards pressed between two 60 mm diameter Thermax alloy with a pressure of 300 KN at 300° C. for 3 min. From the resulting sintered network (mechanical stable) a 10 mm diameter circular disc was punched out and infiltrated with a dispersion of 90% graphite and 10% binder. Here, the copper-alloy network acts as current collector. As reference, a copper foil was coated with a 50 μm layer of the same dispersion using a doctor blade.

The graphite and binder used were the following:

Graphite: powder, <20 μm, synthetic (SigmaAldrich (Art. Nr. 282863))

Binder: Polyvinylidenfluorid (PVDF) (AlfaAesar (Art. Nr. 44080))

The capacity measurements were conducted using a Metrohm M204 electrochemical measurement system run with the software NOVA Battery 1.0. The cell was assembled in a Swagelok™ type cell, using lithium foil (Sigma Aldrich (99.8 wt %) as counter electrode, glass fiber (Sigma Aldrich, Whatman® glass microfiber filters, Grade 934-AH®) as separator and EC: DMC (1M $LiPF_6$) as electrolyte (EC: ethylene carbonate; DMC: dimethyl carbonate).

In order to measure the capacity of the half-cell, a constant current of 382 mA/g was applied, normalized to the amount of active material used for the respective electrode. The potential was simultaneously measured and as vortex points for the potential 0.0125 V (lower vortex point) and 2.2 V (higher vortex point) were measured. The resulting set of data points includes values for the potential at any given point of time. Since a constant current is supplied, the capacity can then be calculated by multiplying the time between lower (completely discharged) and higher vortex point (completely charged) with the applied current.

For the reference cell with reference electrode, a decrease of 76% of the capacity (from 1183 $mAh/m^2$ to 289 $mAh/m^2$) was noticed after 50 cycles. For the cell with inventive network electrode, a decrease of only 9% of the capacity (from 1492 $mAh/m^2$ to 1381 $mAh/m^2$) was noticed. This demonstrates that the inventive network electrode is more electrochemically stable than the common reference electrode with a nearly constant capacity over 50 cycles whilst using the same active material. This is related to the 3D network of the inventive electrode, which supports the effective distribution of the stress formed within the active material due to swelling during ion intercalation. Upon intercalation of Lithium ions the active material undergoes swelling (up to 8 vol % for graphite), which leads to a decrease of capacity over cycling in the reference cell.

Furthermore, these results indicate that the electronic conductivity is improved by the inventive metal fiber network used as current collector. The network improves the electrode conductivity by shortening the electron conduction path compared to the reference electrode where the conductivity gradient is present through the electrode. Thus for the case of the inventive electrode, it was possible to charge and discharge the half-cell 50 times within 6 hours compared to the reference electrode, which was charged 50 times in 16 hours. In addition, as mentioned above the capacity for the inventive network electrode could be preserved (1492 mAh/m²→1381 mAh/m²), which was not the case for the reference electrode (1183 mAh/m²→289 mAh/m²).

FIGS. 18 and 19 present plots of charge discharge profiles of the reference cell and the inventive network cell respectively. FIGS. 20a) and 20b) presents the first and last cycle of the same measurement. FIGS. 21a) to 21c) present the charge discharge profiles with a current normalized time for a better view of the changes while the cyclization. FIG. 22 presents the capacity over the cycles.

For all calculations, the first cycle of each measurement was excluded.

FIG. 23a) presents a cross section SEM image of the inventive network electrode, which visualizes graphite flakes between the copper fibers. The same spot investigated by EDX (EDAX model ZEISS Ultra 55, 132-10) mapping is shown in FIGS. 23b) and 23c).

Microstructure of Metal Fibers:

To investigate the influence of the microstructure of the metal fibers in the network of metal fibers, fibers of CuSi4, Al99Si1, Cu92Sn8, $Co_{66}Fe_4Mo_2B_{12}Si_{16}$ and FeNiB were produced using the above described method. The alloys listed in Table 3 were thermally pretreated with the parameters also listed in Table 3 in order to reduce the stored defect energy, but without causing a change in the grain structure caused by recrystallization. The amorphous/nanocrystalline fibers were additionally thermally treated above the crystallization temperature to investigate the difference in the microstructural state.

TABLE 3

| material | defect removal (thermal pretreatment) | | crystallization | |
|---|---|---|---|---|
| | Temperature [° C.] | Duration [h] | Temperature [°C] | Duration [h] |
| $CuSi_4$ | 300 | 1 | — | — |
| $Al_{99}Si_1$ | 200 | 1 | — | — |
| $Cu_{92}Sn_8$ | 300 | 1 | — | — |
| $Co_{66}Fe_4Mo_2B_{12}Si_{16}$ | 300 | 1 | 600 | 1 |
| $Fe_{40}Ni_{40}B_{20}$ | 300 | 1 | 450 | 1 |

Parts of the fibres in each state (before thermal pretreatment, after thermal pretreatment and after crystallization) were melted twice with a Netzsch STA 449 F3 under argon atmosphere. Thermal pretreatment was performed using the parameters described in Table 3 using also the Netzsch STA 449 F3. All samples were heated at a constant heating and cooling rate of 10 K/min from 30° C. to 1200° C. or 900° C., respectively, in the case of $Al_{99}Si_1$, and then cooled down again to 30° C. The samples were then heated to 1200° C. or 900° C., respectively. The temperature was kept at 30° C. for 1 h between the individual melting steps or where applicable between thermal treatment and melting. By subtracting the second from the first hating cycle, the measurement could be adjusted so that only the pure energy quantity of the fibers was measured. The difference of the area integrals between the measurements with and without thermal pretreatment corresponds to the stored defect energy or crystallization energy. The amount of stored energy is shown in Table 4 as defective energy and crystallization energy. No energy could be determined for $CuSi_4$ because during thermal pretreatment the fibers were transferred into a thermodynamically stable phase with a two-phase structure. Due to the resulting two-phase structure, a correct measurement of the stored defect energy is not possible.

TABLE 4

| material | Defective energy [kJ/g] | Crystallization energy [kJ/g] |
|---|---|---|
| $Cu_{96}Si_4$ | — | — |
| $Al_{99}Si_1$ | 1.7 | — |
| $Cu_{92}Sn_8$ | 1.8 | — |
| $Co_{66}Fe_4Mo_2B_{12}Si_{16}$ | 0.1 | 2.6 |
| $Fe_{40}Ni_{40}B_{20}$ | 2.8 | 3.8 |

It can be seen from the results of table 4 that metal fibers obtained by melt spinning, as described above, have a significant amount of stored energy in form of defective energy and/or crystallization energy, i.e. these fibers are not in their thermodynamic equilibrium. Even though no values are indicated for the alloy $Cu_{96}Si_4$, it is noted that also metal fibers of this alloy have a significant amount of defective energy; however, it is not possible to make a meaningful quantification thereof, since the material is transferred into a state of thermodynamic equilibrium when subjected to the thermal pretreatment conditions specified in table 3. The combined amount of defective energy and crystallization energy for $Cu_{96}Si_4$ is estimated to be around 2.3 KJ/g.

The fibers were then weighed against the values given in Table 5 and wet laid to form uniform non-woven structures thereof. These were then sintered using pressure-induced low-temperature sintering as described above for Example 1 with the parameters also listed in Table 5. Before sintering, the electrical conductivity of the non-woven structures of the copper and aluminium alloy fibres was determined by means of a 4-point measurement and an impedance measurement. These measurements were repeated after sintering. The measured values before and after sintering are listed in Table 6.

TABLE 5

Initial weights and pressure sintering parameters.

| material | Weights [g] | Temperature [° C.] | Pressure [MPa] | Duration [min] |
|---|---|---|---|---|
| $Cu_{96}Si_4$ | 1 | 300 | 35 | 5 |
| $Al_{99}Si_1$ | 0.7 | 200 | 35 | 5 |
| $Cu_{92}Sn_8$ | 1 | 300 | 35 | 5 |
| $Co_{66}Fe_4Mo_2B_{12}Si_{16}$ | 1 | 400 | 140 | 5 |
| $Fe_{40}Ni_{40}B_{20}$ | 0.7 | 400 | 140 | 5 |

TABLE 6

Electrical conductivities.

| material | Loose fibers (before sintering) | | Sintered network (after sintering) | |
|---|---|---|---|---|
| | 4-point [Ohm/m] | Impedance [Ohm/m] | 4-point [Ohm/m] | Impedance [Ohm/m] |
| $Cu_{96}Si_4$ | 57.14 | 45.71 | 2.48 | 2.39 |
| $Al_{99}Si_1$ | 230.77 | 538.46 | 2.71 | 2.7 |
| $Cu_{92}Sn_8$ | 300 | 1000 | 5.45 | 3.61 |

It can be clearly seen that the conductivity of the sintered samples is many times higher than that of the unsintered samples. It is worth mentioning that the distance between the contacts which was used to measure the material's conductivity was only a 5 mm in the case of the loose fibers (before sintering). Increasing the distance between these contacts increased the resistance to more than 100 fold. This results from the non-sintered fibers which do not form a stable conductivity in between fibers. Contrary, while increasing the distance between contacts in case of sintered networks the conductivity was barely depending on the distance. This is because of the high conductivity in between fibers due to sintering.

In order to investigate the mechanical stability of the samples, 10 mm wide strips were cut from each of the samples and examined by means of a tensile test at a tensile rate of 0.01 mm/s. The results of the tensile measurements are presented in Table 7. The same number of fibres per cross section was chosen for the standardization of the samples, as all samples were made of homogeneous fibres from the same production with the same basis weight. Accordingly, a sample from a network of metal fibers with the fibers being subjected to thermal pretreatment as described in table 3 had the same density of fibers compared to a sample from a network of metal fibers with the fibers not being subjected to such a thermal pretreatment.

TABLE 7

Mechanical stability of sintered fiber networks

| | Untreated fibers, as obtained from the melt spinning process | | Fibers subjected to conditions in table 3 before sintering | |
|---|---|---|---|---|
| material | Tensile strength [N] | Young's modulus [N] | Tensile strength [N] | Young's modulus [N] |
| $CuSi_4$ | 12.5 | 1741 | 8.1 | 1151 |
| $Al_{99}Si_1$ | 7.1 | 1118 | 0.4 | 2.3 |
| $Cu_{92}Sn_8$ | 17.6 | 5288 | 9.9 | 1754 |
| $Co_{66}Fe_4Mo_2B_{12}Si_{16}$ | 7.1 | 858 | — | — |
| $Fe_{40}Ni_{40}B_{20}$ | 10.7 | 1894 | 6.3 | 913 |

It can be clearly seen that by thermal treatment of the samples and the associated degradation of stored defect the mechanical properties of the sintered networks are negatively influenced. In other words, using metal fibers with structures that are not in thermodynamic equilibrium the strength of the resulting sintered network is improved. This becomes particularly clear with the $Co_{66}Fe_4Mo_2B_{12}Si_{16}$ samples subjected to thermal pretreatment. The thermally pretreated $Co_{66}Fe_4Mo_2B_{12}Si_{16}$ samples could not be sintered at all, in contrast to the untreated ones. The crystallized samples of the amorphous/nanocrystalline alloys $Co_{66}Fe_4Mo_2B_{12}Si_{16}$ and $Fe_{40}Ni_{40}B_{20}$ could not be sintered at all; samples where annealed before sintering process. They disintegrated during pressing into fine fiber particles without any mechanical cohesion.

It can be summarized that only fibers produced by melt spinning can be mechanically firmly bonded to each other via pressure-induced low-temperature sintering in case the samples are not annealed before sintering. The results presented here show how large the influence of the defect energy introduced by the manufacturing process is on the degree of sintering and thus on the mechanical and electrical properties of the 3D meshes. For the use of 3D nets as current collectors, it is essential that the fibers are firmly connected to each other to ensure a constant electrical conductivity across the entire battery electrode. Nevertheless, it is required that the structure of the fibres is maintained during the sintering, i.e. the fibers are not pressed to a metal foil without open pores.

In the following, the present invention is further described in regard to a process of producing a battery. The Battery production consists of 7 process steps:
1. Production of metal fibers (step 1 in FIG. 27)
2. Carding of fiber nets for laying fiber fleece (step 2, b1, in FIG. 27); alternatively depositing fibers by liquid dispersion or air flow (step 2, b2, in FIG. 27).
3. Sintering of metal fibers for the formation of a metal fiber net electrode (step 3 in FIG. 27); in a hot press (c1, c2), by ultrasound welding (c3) or hammering (c4).
4. Formation of anode and cathode by loading the metal fiber net with electrode active material (step 4 in FIG. 27)
5. Calendering of electrodes (step 5 in FIG. 27)
6. Ultrasound welding of conductive wire on electrode as connector (step 6 in FIG. 27)
7. Assembly of battery (step 7 in FIG. 27)

A schematic representation for these process steps is provided in FIG. 27, wherein step 1 shows production of metal fibers, step 2 shows arranging of fiber nets for layer fiber fleece, step 3 shows different sintering methods of metal fibers for the formation of a mechanically stable metal fiber network. Sintering can be performed by pressure induced low temperature sintering (part c1) or by thermal sintering (part c2), ultrasound welding (part c3) or hammering (part c4). In part d the anode and cathode are formed by loading the metal fiber network with active material (step 4). The electrodes are densified in part e using calendering (step 5). As a next step, a conductive foil is attached onto the network of metal fibers in step 6. Battery assembly is shown in step 7 of FIG. 27. These process steps are also described in the following.

Step 1. Production of Metal Fibers

Metal fibers are produced by melt spinning. Two principal different melt spinning technologies can be used to produce metal fibers: a) vertical melt spinner, b) horizontal melt spinner; the vertical melt spinner has technical limitations which makes the product more expensive and less efficient compared to production using a horizontal melt spinner. Therefore, the horizontal melt spinner is preferably used in the present invention.

Step 2. Laying Fiber Fleece

The metallic fibers are treated much like cotton for textiles—the reason why the resulting net can be referred to as a metallic textile. First, the metallic "wool" is disentangled and the fibers aligned by carding, such as schematically shown in FIG. 24. This step requires microfibers of substantial length. By using melt spinning as described herein, it is possible to produce fibers having a length of several centimeters; no liquid dispersion step is necessary or possible due to the substantial length of the fibers. This process produces a 3-dimensional fiber net for subsequent processing. In step 2, b1, the fibers are carded by a carding comb, as known in the art of cotton treatment, to obtain a homogenous fiber network structure and such ordered layers are stacked on top of each one. To do that, the fibers preferably have a length of 5-18 cm and have no connections between them before carding. In this step no liquid dispersion step is necessary. Avoiding liquid dispersions is possible due to the long extension of the fibers.

Alternatively, non-ordered fiber nets are produced by deposition from liquid dispersions or from air flow (step 2, b2).

Step 3. Sintering of Metal Fibers for the Formation of a 3D Metal Fiber Nets

The uniform fiber network structure can be sintered between two heating plates (distance adjustable between 0.2-1 mm, here 0.5 mm; $Al_{99}Si_1$ at 650° C. for 1.5 h; $Cu_{96}Si_4$ at 950° C. for 2 h), such as schematically shown in steb 3, c2 of FIG. 27.

This leads to strong mechanical connections between fibers at their crossing points. The electrical conductivity increases substantially once the metal fibers are mechanically connected and sintered.

Alternatively, the 3D metal fiber net is pressure-sintered between 2 thermo plates. For this, the fibers are placed on two polished thermo plates and pressed 1 min with an pressure of 10 GPa at 150° C. for $Al_{99}Si_1$ and 300° C. for $Cu_{96}Si_4$ in a preheated uniaxial press, such as schematically shown in step 3, c1 of FIG. 27. After this, the mechanical stable 3D fiber-network can be easily zipped off from the substrate.

Alternatively, metal fibers are locally fixed by ultrasound welding (FIG. 27, step 3, c3) or hammering (FIG. 27, step 3, c4).

Step 4. Formation of Anode and Cathode by Loading the 3D Metal Fiber Net with Electrode Active Material The active material used in the examples is commercially available from Custom Cells as a slurry. Graphite was used for the Anode side and NMC_111 for the cathode side.

Next, utilizing a standard doctor blading process (from doctor blade; Rakelprozess) the 3D metal fiber net was loaded with a slurry of active material, such as illustrated in FIG. 27, step 4, d. A siliconized PMMA foil was placed onto the plate, wetted before with ethanol/acetone. After flattening the foil, the sintered fiber network was placed onto the foil. Then, the rather liquid slurry of active material was drop-casted onto the 3D metal fiber net. The 3D metal fiber net structure offers capillary forces which pulled the slurry into the network and coated it homogenously. The, more viscous slurry was poured onto the network and the gap doctor blade was used to remove residual slurry (height 0.650 mm). Subsequently, the samples were dried (Anode at RT and Cathode at 30° C.).

The 3D metal fiber network was formed without being in contact with active material, i.e. the active materials were applied onto the networks of metal fibers after sintering of these networks was completed.

Lamination/Post-Processing of the Electrodes

Step 5. Calendering of Electrodes

After drying the electrodes, they were laminated using a gap of 0.2 mm and a weight limited calendaring process of 40 kg per roller. Additional experiments with the following parameters were also conducted:

0.4 mm gap, 40 kg no gap, 40 kg no gap, 120 kg no gap, 112 kg, 160° C.

A schematic illustration of such a calendering process is illustrated in FIG. 27, step 5, e.

Step 6. Ultrasound Welding of Conductive Foil on Electrode

Finally, a Ni foil was attached to the side of an electrode by ultrasound welding. These Ni foils were the contact electrodes of the battery. Ultrasound welding of contact electrodes to the network 6 is schematically illustrated in FIG. 27, step 6, f.

Step 7. Assembly of Battery

The packaging of the 3D metal fiber networks started with punching out the active material loaded electrodes in the desired dimension/geometry. The samples were placed into a uniaxial press and punched out in the desired form. Subsequently, the samples were glued using PVDF Binder in acetone onto the respective sides of a separator (PP/PE stretched), which was punched out beforehand with an overlap of 1-2 mm in order to avoid internal shorting of the electrodes. Then, they were placed into the laminated pouch and dried at 110° C. for 48 h in a furnace. After 48 h the samples were transferred into a glovebox, filled with electrolyte (EC/DMC, 1 M $LIPF_6$) and sealed in order to ensure an airtight packaging. After wetting the sample for 3 h, the surplus of electrolyte was removed using a syringe and a vacuum pump with a liquid filter and sealed again tightly directly below the electrode.

Results:

The battery according to the invention which was obtained by the process described above was compared to a comparative battery not containing the network of metal fibers as current collector but a planar foil. The results are provided below in tables 8 and 9.

TABLE 8 values for gravimetric capacity and gravimetric energy density

|  | Inventive battery | comparative battery |
|---|---|---|
| gravimetric capacity | 140 Ah/kg (0.1 C) | 63 Ah/kg (0.1 C) |
|  | 135 Ah/kg (0.5 C) | 52 Ah/kg (0.5 C) |
|  | 67 Ah/kg (1 C) | 29 Ah/kg (1 C) |
| gravimetric energy density | 519 Wh/kg (0.1 C) | 233 Wh/kg (0.1 C) |
|  | 499 Wh/kg (0.5 C) | 196 Wh/kg (0.5 C) |
|  | 249 Wh/kg (1 C) | 107 Wh/kg (1 C) |

TABLE 9

| values for volumetric capacity and volumetric energy density | | |
|---|---|---|
| | Inventive battery | comparative battery |
| volumetric capacity | 87 Ah/l (0.1 C) | 28 Ah/l (0.1 C) |
| | 81 Ah/l (0.5 C) | 24 Ah/l (0.5 C) |
| | 41 Ah/l (1 C) | 18 Ah/l (1 C) |
| volumetric energy density | 320 Wh/l (0.1 C) | 106 Wh/l (0.1 C) |
| | 301 Wh/l (0.5 C) | 89 Wh/l (0.5 C) |
| | 150 Wh/l (1 C) | 67 Wh/l (1 C) |

In above tables 8 and 9 the c-rate used for determining values for gravimetric and volumetric capacities and energy densities are indicated as 0.10, 0.5C and 1C, respectively.

REFERENCE SIGNS 1 melt spinning device
2 metal fibers
3 rotating wheel
4 microstructured nozzle
5 drop
6 network
7 point of contact
8 tweezers
9 voids
10 hot press
11 upper and lower parts
12 disc
13a battery
13b prior art battery
14 current collector
15 active electrode material
16 lithium
17 separator
20 sharp peak
22 peak
24 carding machine
26 fleece
28 rotating drums
30 carding cloth

What is claimed is:

1. A network of metal fibers, comprising:
a plurality of entangled metal fibers being entangled with one another and in a metastable condition and not in thermodynamic equilibrium at ambient temperatures;
wherein the plurality of entangled metal fibers are subjected to a temperature of between 10 to 95% of a melting point of a material of the plurality of entangled metal fibers to fix the plurality of entangled metal fibers to one another and establish a network of fixed metal fibers;
wherein the fixed metal fibers in the network of fixed metal fibers have a length of 1.0 mm or more, a width of 100 µm or less and a thickness of 50 µm or less.

2. The network according to claim 1, wherein the fixed metal fibers are in electrical contact with one another.

3. The network according to claim 1, wherein at least one or more of the entangled metal fibers of the plurality of entangled metal fibers are amorphous.

4. The network according to claim 1, wherein at least two or more of the fixed metal fibers in the network of fixed metal fibers are sintered to one another.

5. The network according to claim 1, wherein the plurality of entangled metal fibers are obtainable by subjecting molten material of the plurality of entangled metal fibers to a cooling rate of 102 K·min-1 or higher by melt spinning.

6. The network according to claim 1, wherein each of the fixed metal fibers is in contact with one or more other fixed metal fibers in the network of fixed metal fibers.

7. The network according to claim 1, wherein the network is an unordered network.

8. The network according to claim 1, wherein the network of fixed metal fibers has open pores between the fixed metal fibers in the network of fixed metal fibers.

9. The network according to claim 1, wherein at least one or more of the fixed metal fibers of the network of fixed metal fibers are at least partially coated.

10. The network according to claim 1, wherein points of contact between the fixed metal fibers are distributed in an unordered or ordered manner throughout a three-dimensional structure of the network of fixed metal fibers.

11. The network according to claim 1, wherein at least some of the metal fibers of the plurality of metal fibers are nanocrystalline.

12. The network according to claim 1, wherein the network of fixed metal fibers is an ordered network of fixed metal fibers.

* * * * *